United States Patent [19]

Yamada et al.

[11] Patent Number: 5,791,426

[45] Date of Patent: Aug. 11, 1998

[54] POWER OUTPUT APPARATUS AND METHOD OF CONTROLLING THE SAME

[75] Inventors: Eiji Yamada, Owariasahi; Yasutomo Kawabata, Aichi-ken; Ryuji Toh, Toyota, all of Japan

[73] Assignee: Toyota Jidosha Kabushiki Kaisha, Toyota, Japan

[21] Appl. No.: 724,244

[22] Filed: Sep. 30, 1996

[30] Foreign Application Priority Data

Nov. 6, 1995 [JP] Japan .................................. 7-313624

[51] Int. Cl.$^6$ ............................................... B60K 1/00
[52] U.S. Cl. ........................... 180/65.2; 140/65.4
[58] Field of Search ........................ 180/65.2, 65.3, 180/65.4; 318/139, 696; 290/9, 10, 11, 12, 14, 15, 16

[56] References Cited

U.S. PATENT DOCUMENTS

| | | |
|---|---|---|
| 3,623,568 | 11/1971 | Mori . |
| 3,683,249 | 8/1972 | Shibata . |
| 3,789,281 | 1/1974 | Shibata . |
| 5,264,764 | 11/1993 | Kuang . |

FOREIGN PATENT DOCUMENTS

| | | |
|---|---|---|
| A1-0-645-278 | 3/1995 | European Pat. Off. . |
| A1-0-725-474 | 8/1996 | European Pat. Off. . |
| A1-30-25-756 | 1/1982 | Germany . |
| WO 82/00928 | 3/1982 | Germany . |
| A-49-43311 | 4/1974 | Japan . |
| A-51-22132 | 7/1976 | Japan . |
| A-53-133814 | 11/1978 | Japan . |
| A-55-103100 | 8/1980 | Japan . |
| A-2-267-364 | 12/1993 | United Kingdom . |

*Primary Examiner*—Richard M. Camby
*Attorney, Agent, or Firm*—Oliff & Berridge, PLC

[57] ABSTRACT

In a power output apparatus (20) of the present invention, a controller (80) controls a clutch motor (30) and an assist motor (40), thereby converting energy output from an engine (50) and expressed by the product of the revolving speed and the torque of a crankshaft (56) of the engine (50) to energy expressed by the product of the revolving speed and the torque of a drive shaft (22) and outputting the converted energy to the drive shaft (22). When the remaining charge of a battery (94) is less than a predetermined range, the battery (94) is charged with electric power, which is regenerated from part of the energy output from the engine (50) by either the clutch motor (30) and the assist motor (40). When the remaining charge of the battery (94) exceeds the predetermined range, on the other hand, part of electric power consumed by either the clutch motor (30) or the assist motor (40) is supplied by electric power released from the battery (94). These procedures enable the remaining charge of the battery (94) to be kept within the predetermined range.

45 Claims, 43 Drawing Sheets

POWER OUTPUT APPARATUS AND METHOD OF CONTROLLING THE SAME

BACKGROUND OF THE INVENTION

1. Field of the Invention

The present invention generally relates to a power output apparatus and a method of controlling the same. More specifically, the invention pertains to a power output apparatus for outputting power generated by an engine to a drive shaft at a high efficiency and a method of controlling such a power output apparatus.

2. Description of the Prior Art

In known power output apparatuses mounted on a vehicle, an output shaft of an engine is electromagnetically linked with a drive shaft which connects with a rotor of a motor, by means of an electromagnetic coupling, so that power of the engine is transmitted to the drive shaft (as disclosed in, for example, JAPANESE PATENT LAYING-OPEN GAZETTE No. 49-43311). The electromagnetic coupling of the power output apparatus transmits part of the power output from the engine as a torque to the drive shaft via electromagnetic connection, and supplies electric power regenerated by sliding motions of the electromagnetic coupling to the motor and secondary cells, which are connected in parallel with the electromagnetic coupling. When the torque transmitted to the drive shaft by means of the electromagnetic coupling is insufficient, the motor applies an additional torque to the drive shaft with the electric power regenerated by the electromagnetic coupling or the electric power released from the secondary cells. The motor works as a generator when a braking force is applied to the drive shaft, so as to regenerate the energy of rotation of the drive shaft as electrical energy and store the regenerated electrical energy in the secondary cells.

In the conventional power output apparatus, the secondary cells are charged with the electric power regenerated by the electromagnetic coupling or the electric power regenerated by the motor. The electric power used for driving the motor is supplied by the electric power released from the secondary cells, according to the requirements. The charge and discharge of the secondary cells is, however, carried out not according to the condition of the secondary cells but according to the required output of the drive shaft. This may result in excessively charging or discharging the secondary cells and significantly shortening the life of the secondary cells.

SUMMARY OF THE INVENTION

One object of the present invention is thus to provide a power output apparatus for outputting power generated by an engine to a drive shaft at a high efficiency and a method of controlling such a power output apparatus.

Another object of the invention is to maintain secondary cells in an appropriate state.

Still another object of the invention is to charge and discharge the secondary cells according to the requirements.

At least part of the above and the other related objects are realized by a first power output apparatus of the present invention. The first power output apparatus comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via an electromagnetic coupling of the first rotor with the second rotor; a first motor-driving circuit for controlling the degree of electromagnetic coupling of the first rotor with the second rotor in the first motor and regulating the rotation of the second rotor relative to the first rotor; a second motor connected with the drive shaft; a second motor-driving circuit for driving and controlling the second motor; storage battery means being charged with electric power regenerated by the first motor via the first motor-driving circuit, being charged with electric power regenerated by the second motor via the second motor-driving circuit, being discharged to release electric power required to drive the first motor via the first motor-driving circuit, and being discharged to release electric power required to drive the second motor via the second motor-driving circuit; remaining charge measuring means for measuring a remaining charge of the storage battery means; and control means for controlling the first and the second motors via the first and second motor-driving circuits based on the remaining charge of the storage battery means measured by the remaining charge measuring means, in order to set the remaining charge of the storage battery means within a predetermined range. The first power output apparatus of the present invention enables the remaining charge of the storage battery means to be kept in the predetermined range. This effectively protects the storage battery means from excessive charging and discharging, thereby preventing the life of the storage battery means from being unduly shortened.

In accordance with one aspect of the first power output apparatus, the control means further comprises charging-process control means for controlling the first and second motors via the first and second motor-driving circuits, in order to enable the storage battery means to be charged with at least part of electric power regenerated by at least one of the first motor and the second motor, when the remaining charge of the storage battery means measured by the remaining charge measuring means is less than the predetermined range. In accordance with another aspect of the first power output apparatus, the control means further comprises discharging-process control means for controlling the first and second motors via the first and second motor-driving circuits, in order to enable at least part of electric power consumed by at least one of the first motor and the second motor to be supplied by electric power released from the storage battery means, when the remaining charge of the storage battery means measured by the remaining charge measuring means is greater than the predetermined range. These structure enables the remaining charge of the storage battery means to be kept in the predetermined range by means of the charging-process control means when the remaining charge of the storage battery means is less than the predetermined range and by means of the discharging-process control means when the remaining charge of the storage battery means is greater than the predetermined range.

In accordance with another aspect of the first power output apparatus, the first power output apparatus further comprises: driving state measuring means for measuring driving states of the engine and the drive shaft, wherein the control means further comprises means for controlling the first motor and second motors based on the driving states measured by the driving state measuring means. The first motor and the second motor are controlled to maintain the remaining charge of the storage battery means in the predetermined range, based on the driving conditions of the engine and the drive shaft. In this structure, driving state measuring means further comprises: engine speed measuring means for measuring a revolving speed of the output shaft of the engine; and driving shaft speed measuring means for measuring a revolving speed of the drive shaft. This structure (structure (a)), enables the first motor and the second motor to be controlled according to the revolving speed of the output shaft of the engine as well as the revolving speed of the drive shaft.

In accordance with one aspect of the structure (a), the control means further comprises means for controlling the first and second motors via the first and second motor-driving circuits, in order to enable the storage battery means to be charged with at least part of electric power regenerated by at least one of the first motor and the second motor, when the revolving speed of the output shaft of the engine measured by the engine speed measuring means is greater than the revolving speed of the drive shaft measured by the driving shaft speed measuring means. When the revolving speed of the output shaft of the engine is greater than the revolving speed of the drive shaft, the storage battery means can be charged with at least part of the electric power regenerated by at least one of the first motor and the second motor.

In accordance with another aspect of the structure (a), the control means further comprises means for controlling the second motor via the second motor-driving circuit, in order to enable the storage battery means to be charged with at least part of electric power regenerated by the second motor, when the revolving speed of the output shaft of the engine measured by the engine speed measuring means is equal to or less than the revolving speed of the drive shaft measured by the driving shaft speed measuring means. When the revolving speed of the output shaft of the engine is equal to or less than the revolving speed of the drive shaft, the storage battery means can be charged with at least part of the electric power regenerated by the second motor.

In accordance with still another aspect of the structure (a), the control means further comprises means for controlling the second motor via the second motor-driving circuit, in order to enable at least part of electric power consumed by the second motor to be supplied by electric power released from the storage battery means, when the revolving speed of the output shaft of the engine measured by the engine speed measuring means is equal to or greater than the revolving speed of the drive shaft measured by the driving shaft speed measuring means. When the revolving speed of the output shaft of the engine is equal to or greater than the revolving speed of the drive shaft, at least part of the electric power consumed by the second motor can be supplied by the electric power released from the storage battery means.

In accordance with still another aspect of the structure (a), the control means further comprises means for controlling the first motor and the second motor via the first motor-driving circuit and the second motor-driving circuit, in order to enable at least part of electric power consumed by at least one of the first motor and the second motor to be supplied by electric power released from the storage battery means, when the revolving speed of the output shaft of the engine measured by the engine speed measuring means is less than the revolving speed of the drive shaft measured by the driving shaft speed measuring means. When the revolving speed of the output shaft of the engine is less than the revolving speed of the drive shaft, at least part of the electric power consumed by at least one of the first motor and the second motor can be supplied by the electric power released from the storage battery means.

The above and other related objects are also realized at least partly by a second power output apparatus of the invention. The second power output apparatus comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first and second rotors constituting a first motor, whereby power is transmitted between the output shaft of the engine and the drive shaft via an electromagnetic coupling of the first rotor with the second rotor, while the second rotor and the stator constituting a second motor for transmitting and receiving power to and from the drive shaft; a first motor-driving circuit for driving and controlling the first motor in the complex motor; a second motor-driving circuit for driving and controlling the second motor in the complex motor; storage battery means being charged with electric power regenerated by the first motor of the complex motor via the first motor-driving circuit, being charged with electric power regenerated by the second motor of the complex motor via the second motor-driving circuit, being discharged to release electric power required to drive the first motor of the complex motor via the first motor-driving circuit, and being discharged to release electric power required to drive the second motor of the complex motor via the second motor-driving circuit; remaining charge measuring means for measuring a remaining charge of the storage battery means; and control means for controlling the first and second motors of the complex motor via the first and second motor-driving circuits based on the remaining charge of the storage battery means measured by the remaining charge measuring means, in order to set the remaining charge of the storage battery means within a predetermined range. The second power output apparatus of the present invention enables the remaining charge of the storage battery means to be kept in the predetermined range. This effectively protects the storage battery means from excessive charging and discharging, thereby preventing the life of the storage battery means from being unduly shortened. The complex motor, in which the first motor and the second motor are combined with each other, reduces the size of the whole power output apparatus.

In accordance with one aspect of the second power output apparatus, the control means further comprises charging-process control means for controlling the first and second motors via the first and second motor-driving circuits, in order to enable the storage battery means to be charged with at least part of electric power regenerated by at least one of the first motor and the second motor, when the remaining charge of the storage battery means measured by the remaining charge measuring means is less than the predetermined range. In accordance with another aspect of the second power output apparatus, the control means further comprises discharging-process control means for controlling the first and second motors via the first and second motor-driving circuits, in order to enable at least part of electric power consumed by at least one of the first motor and the second motor to be supplied by electric power released from the storage battery means, when the remaining charge of the storage battery means measured by the remaining charge measuring means is greater than the predetermined range. These structure enables the remaining charge of the storage battery means to be kept in the predetermined range by means of the charging-process control means when the remaining charge of the storage battery means is less than the predetermined range and by means of the discharging-process control means when the remaining charge of the storage battery means is greater than the predetermined range.

The invention is also directed to a third power output apparatus. The third power output apparatus comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via an electromagnetic coupling of the first rotor with the second rotor; a first motor-driving circuit for controlling the degree of electromagnetic coupling of the first rotor with the second rotor in the first motor and regulating the rotation of the second rotor relative to the first rotor; a second motor connected with the output shaft of the engine; a second motor-driving circuit for driving and controlling the second motor; storage battery means being charged with electric power regenerated by the first motor via the first motor-driving circuit, being charged with electric power regenerated by the second motor via the second motor-driving circuit, being discharged to release electric power required to drive the first motor via the first motor-driving circuit, and being discharged to release electric power required to drive the second motor via the second motor-driving circuit; remaining charge measuring means for measuring a remaining charge of the storage battery means; and control means for controlling the first and the second motors via the first and second motor-driving circuits based on the remaining charge of the storage battery means measured by the remaining charge measuring means, in order to set the remaining charge of the storage battery means within a predetermined range. The third power output apparatus of the present invention enables the remaining charge of the storage battery means to be kept in the predetermined range. This effectively protects the storage battery means from excessive charging and discharging, thereby preventing the life of the storage battery means from being unduly shortened.

In accordance with one aspect of the third power output apparatus, the control means further comprises charging-process control means for controlling the first and second motors via the first and second motor-driving circuits, in order to enable the storage battery means to be charged with at least part of electric power regenerated by at least one of the first motor and the second motor, when the remaining charge of the storage battery means measured by the remaining charge measuring means is less than the predetermined range. In accordance with another aspect of the third power output apparatus, the control means further comprises discharging-process control means for controlling the first and second motors via the first and second motor-driving circuits, in order to enable at least part of electric power consumed by at least one of the first motor and the second motor to be supplied by electric power released from the storage battery means, when the remaining charge of the storage battery means measured by the remaining charge measuring means is greater than the predetermined range. These structure enables the remaining charge of the storage battery means to be kept in the predetermined range by means of the charging-process control means when the remaining charge of the storage battery means is less than the predetermined range and by means of the discharging-process control means when the remaining charge of the storage battery means is greater than the predetermined range.

A fourth power output apparatus of the invention comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first and second rotors constituting a first motor, whereby power is transmitted between the output shaft of the engine and the drive shaft via an electromagnetic coupling of the first rotor with the second rotor, while the first rotor and the stator constituting a second motor for transmitting and receiving power to and from the output shaft of the engine; a first motor-driving circuit for driving and controlling the first motor in the complex motor; a second motor-driving circuit for driving and controlling the second motor in the complex motor; storage battery means being charged with electric power regenerated by the first motor of the complex motor via the first motor-driving circuit, being charged with electric power regenerated by the second motor of the complex motor via the second motor-driving circuit, being discharged to release electric power required to drive the first motor of the complex motor via the first motor-driving circuit, and being discharged to release electric power required to drive the second motor of the complex motor via the second motor-driving circuit; remaining charge measuring means for measuring a remaining charge of the storage battery means; and control means for controlling the first and second motors of the complex motor via the first and second motor-driving circuits based on the remaining charge of the storage battery means measured by the remaining charge measuring means, in order to set the remaining charge of the storage battery means within a predetermined range. The fourth power output apparatus of the present invention enables the remaining charge of the storage battery means to be kept in the predetermined range. This effectively protects the storage battery means from excessive charging and discharging, thereby preventing the life of the storage battery means from being unduly shortened. The complex motor, in which the first motor and the second motor are combined with each other, reduces the size of the whole power output apparatus.

In accordance with one aspect of the fourth power output apparatus, the control means further comprises charging-process control means for controlling the first and second motors via the first and second motor-driving circuits, in order to enable the storage battery means to be charged with at least part of electric power regenerated by at least one of the first motor and the second motor, when the remaining charge of the storage battery means measured by the remaining charge measuring means is less than the predetermined range. In accordance with another aspect of the fourth power output apparatus, the control means further comprises discharging-process control means for controlling the first and second motors via the first and second motor-driving circuits, in order to enable at least part of electric power consumed by at least one of the first motor and the second motor to be supplied by electric power released from the storage battery means, when the remaining charge of the storage battery means measured by the remaining charge measuring means is greater than the predetermined range. These structure enables the remaining charge of the storage battery means to be kept in the predetermined range by means of the charging-process control means when the remaining charge of the storage battery means is less than the predetermined range and by means of the discharging-process control means when the remaining charge of the storage battery means is greater than the predetermined range.

A fifth power output apparatus of the invention comprises: an engine having an output shaft; a first motor comprising a first rotor connected with the output shaft of the engine and a second rotor connected with the drive shaft, the second rotor being coaxial to and rotatable relative to the first rotor, the first and second motors being electromagnetically connected with each other, whereby power is transmitted between the output shaft of the engine and the drive shaft via an electromagnetic coupling of the first rotor with the second rotor; a first motor-driving circuit for controlling the degree of electromagnetic coupling of the first rotor with the second rotor in the first motor and regulating the rotation of the second rotor relative to the first rotor; a second motor connected with the drive shaft; a second motor-driving circuit for driving and controlling the second motor; storage battery means being charged with electric power regenerated by the first motor via the first motor-driving circuit, being charged with electric power regenerated by the second motor via the second motor-driving circuit, being discharged to release electric power required to drive the first motor via the first motor-driving circuit, and being discharged to release electric power required to drive the second motor via the second motor-driving circuit; remaining charge measuring means for measuring a remaining charge of the storage battery means; target power specifying means for specifying a target power to be output to the drive shaft, based on an instruction given by an operator; and control means for controlling the first and second motors via the first and second motor-driving circuits as well as for controlling operation of the engine, based on the target power specified by the target power specifying means and the remaining charge of the storage battery means measured by the remaining charge measuring means, in order to set the remaining charge of the storage battery means within a predetermined range and enable the target power to be output to the drive shaft. The fifth power output apparatus of the present invention outputs the target power, which is specified based on the instruction of the operator, to the drive shaft while enabling the remaining charge of the storage battery means to be kept in the predetermined range. This structure can keep the power output to the drive shaft free from a variation due to the charging or discharging process of the storage battery means but make the output power substantially identical with the target power, which is specified based on the instruction of the operator. Like the other power output apparatuses of the present invention discussed above, this structure also effectively protects the storage battery means from excessive charging and discharging, thereby preventing the life of the storage battery means from being unduly shortened.

In accordance with one aspect of the fifth power output apparatus, the control means further comprises: charging-state engine control means for controlling operation of the engine, in order to enable the engine to output a power corresponding to energy which is greater than energy corresponding to the target power, when the remaining charge of the storage battery means measured by the remaining charge measuring means is less than the predetermined range; and charging-state motor control means for controlling the first and second motors, in order to enable part of the power generated by the engine controlled by the charging-state engine control means to undergo energy conversion and to be output as the target power to the drive shaft, as well as to enable the storage battery means to be charged with electric power regenerated from the residual power output from the engine. When the remaining charge of the storage batter means is less than the predetermined range, part of the power generated by the engine is subjected to the energy conversion and output to the drive shaft as the target power, while the storage battery means is charged with the electric power regenerated from the residual power from the engine. This structure can keep the power output to the drive shaft free from a decrease due to the charging process of the storage battery means but make the output power substantially identical with the target power, which is specified based on the instruction of the operator. In this structure, the charging-state engine control means further comprises: means for specifying a charging energy used for charging the storage battery means, based on the remaining charge of the storage battery means measured by the remaining charge measuring means; and means for controlling operation of the engine, in order to enable the engine to output a power corresponding to the sum of the charging energy thus specified and the energy corresponding to the target power. This structure enables the storage battery means to be charged with electric power corresponding to the charging energy which is specified according to the remaining charge of the storage battery means.

In accordance with another aspect of the fifth power output apparatus, the control means further comprises: discharging-state engine control means for controlling operation of the engine, in order to enable the engine to output a power corresponding to energy which is smaller than energy corresponding to the target power, when the remaining charge of the storage battery means measured by the remaining charge measuring means is greater than the predetermined range; and discharging-state motor control means for controlling the first and second motors, in order to enable the sum of the power generated by the engine controlled by the discharging-state engine control means and electric power released from the storage battery means to undergo energy conversion and to be output as the target power to the drive shaft. When the remaining charge of the storage battery means is greater than the predetermined range, the sum of the power generated by the engine and the electric power released from the storage battery means is subjected to the energy conversion and output to the drive shaft as the target power. This structure can keep the power output to the drive shaft free from an increase due to the discharging process of the storage battery means but make the output power substantially identical with the target power, which is specified based on the instruction of the operator. In this structure, the discharging-state engine control means further comprises: means for specifying a discharging energy released from the storage battery means, based on the remaining charge of the storage battery means measured by the remaining charge measuring means; and means for controlling operation of the engine, in order to enable the engine to output a power corresponding to the difference between the energy corresponding to the target power and the discharging energy thus specified. This structure discharges the storage battery means, which consequently releases electric power corresponding to the discharging energy, which is specified according to the remaining charge of the storage battery means.

In accordance with still another aspect of the fifth power output apparatus, the fifth power output apparatus further comprises: driving state measuring means for measuring driving states of the engine and the drive shaft, wherein the control means further comprises means for controlling the first motor and second motors based on the driving states measured by the driving state measuring means. The first motor and the second motor are controlled to maintain the remaining charge of the storage battery means in the predetermined range, based on the driving conditions of the engine and the drive shaft. In this structure, driving state measuring means further comprises: engine speed measuring means for measuring a revolving speed of the output shaft of the engine; and driving shaft speed measuring means for measuring a revolving speed of the drive shaft. This structure (structure (b)), enables the first motor and the second motor to be controlled according to the revolving speed of the output shaft of the engine as well as the revolving speed of the drive shaft.

In accordance with one aspect of the structure (b), the control means further comprises means for controlling the first and second motors via the first and second motor-driving circuits, in order to enable the storage battery means to be charged with at least part of electric power regenerated by at least one of the first motor and the second motor, when the revolving speed of the output shaft of the engine measured by the engine speed measuring means is greater than the revolving speed of the drive shaft measured by the driving shaft speed measuring means. When the revolving speed of the output shaft of the engine is greater than the revolving speed of the drive shaft, the storage battery means can be charged with at least part of the electric power regenerated by at least one of the first motor and the second motor.

In accordance with another aspect of the structure (b), the control means further comprises means for controlling the second motor via the second motor-driving circuit, in order to enable the storage battery means to be charged with at least part of electric power regenerated by the second motor, when the revolving speed of the output shaft of the engine measured by the engine speed measuring means is equal to or less than the revolving speed of the drive shaft measured by the driving shaft speed measuring means. When the revolving speed of the output shaft of the engine is equal to or less than the revolving speed of the drive shaft, the storage battery means can be charged with at least part of the electric power regenerated by the second motor.

In accordance with still another aspect of the structure (b), the control means further comprises means for controlling the second motor via the second motor-driving circuit, in order to enable at least part of electric power consumed by the second motor to be supplied by electric power released from the storage battery means, when the revolving speed of the output shaft of the engine measured by the engine speed measuring means is equal to or greater than the revolving speed of the drive shaft measured by the driving shaft speed measuring means. When the revolving speed of the output shaft of the engine is equal to or greater than the revolving speed of the drive shaft, at least part of the electric power consumed by the second motor can be supplied by the electric power released from the storage battery means.

In accordance with still another aspect of the structure (b), the control means further comprises means for controlling the first motor and the second motor via the first motor-driving circuit and the second motor-driving circuit, in order to enable at least part of electric power consumed by at least one of the first motor and the second motor to be supplied by electric power released from the storage battery means, when the revolving speed of the output shaft of the engine measured by the engine speed measuring means is less than the revolving speed of the drive shaft measured by the driving shaft speed measuring means. When the revolving speed of the output shaft of the engine is less than the revolving speed of the drive shaft, at least part of the electric power consumed by at least one of the first motor and the second motor can be supplied by the electric power released from the storage battery means.

In accordance with another aspect of the fifth power output apparatus, the control means further comprises means for controlling the first and second motors, in order to prevent the storage battery means from being charged by the first and second motors when energy corresponding to the target power specified by the target power specifying means is equal to or greater than a predetermined level, even if the remaining charge of the storage battery means measured by the remaining charge measuring means is less than the predetermined range. This structure enables a greater part of the power generated by the engine to be output to the drive shaft.

A sixth power output apparatus of the invention comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first and second rotors constituting a first motor, whereby power is transmitted between the output shaft of the engine and the drive shaft via an electromagnetic coupling of the first rotor with the second rotor, while the second rotor and the stator constituting a second motor for transmitting and receiving power to and from the drive shaft; a first motor-driving circuit for driving and controlling the first motor in the complex motor; a second motor-driving circuit for driving and controlling the second motor in the complex motor; storage battery means being charged with electric power regenerated by the first motor of the complex motor via the first motor-driving circuit, being charged with electric power regenerated by the second motor of the complex motor via the second motor-driving circuit, being discharged to release electric power required to drive the first motor of the complex motor via the first motor-driving circuit, and being discharged to release electric power required to drive the second motor of the complex motor via the second motor-driving circuit; remaining charge measuring means for measuring a remaining charge of the storage battery means; target power specifying means for specifying a target power to be output to the drive shaft, based on an instruction given by an operator; and control means for controlling the first and second motors of the complex motor via the first and second motor-driving circuits as well as for controlling operation of the engine, based on the target power specified by the target power specifying means and the remaining charge of the storage battery means measured by the remaining charge measuring means, in order to set the remaining charge of the storage battery means within a predetermined range and enable the target power to be output to the drive shaft. The sixth power output apparatus of the present invention outputs the target power, which is specified based on the instruction of the operator, to the drive shaft while enabling the remaining charge of the storage battery means to be kept in the predetermined range. This structure can keep the power output to the drive shaft free from a variation due to the charging or discharging process of the storage battery means but make the output power substantially identical with the target power, which is specified based on the instruction of the operator. The complex motor, in which the first motor and the second motor are combined with each other, reduces the size of the whole power output apparatus. Like the other power output apparatuses of the present invention discussed above, this structure also effectively protects the storage battery means from excessive charging and discharging, thereby preventing the life of the storage battery means from being unduly shortened.

In accordance with one aspect of the sixth power output apparatus, the control means further comprises: charging-state engine control means for controlling operation of the engine, in order to enable the engine to output a power corresponding to energy which is greater than energy corresponding to the target power, when the remaining charge of the storage battery means measured by the remaining charge measuring means is less than the predetermined range; and charging-state motor control means for controlling the first and second motors of the complex motor, in order to enable part of the power generated by the engine controlled by the charging-state engine control means to undergo energy conversion and to be output as the target power to the drive shaft, as well as to enable the storage battery means to be charged with electric power regenerated from the residual power output from the engine. When the remaining charge of the storage batter means is less than the predetermined range, part of the power generated by the engine is subjected to the energy conversion and output to the drive shaft as the target power, while the storage battery means is charged with the electric power regenerated from the residual power from the engine. This structure can keep the power output to the drive shaft free from a decrease due to the charging process of the storage battery means but make the output power substantially identical with the target power, which is specified based on the instruction of the operator.

In accordance with another aspect of the sixth power output apparatus, the control means further comprises: discharging-state engine control means for controlling operation of the engine, in order to enable the engine to output a power corresponding to energy which is smaller than energy corresponding to the target power, when the remaining charge of the storage battery means measured by the remaining charge measuring means is greater than the predetermined range; and discharging-state motor control means for controlling the first and second motors of the complex motor, in order to enable the sum of the power generated by the engine controlled by the discharging-state engine control means and electric power released from the storage battery means to undergo energy conversion and to be output as the target power to the drive shaft. When the remaining charge of the storage battery means is greater than the predetermined range, the sum of the power generated by the engine and the electric power released from the storage battery means is subjected to the energy conversion and output to the drive shaft as the target power. This structure can keep the power output to the drive shaft free from an increase due to the discharging process of the storage battery means but make the output power substantially identical with the target power, which is specified based on the instruction of the operator.

A seventh power output apparatus of the invention comprises: an engine having an output shaft; a first motor comprising a first rotor connected with the output shaft of the engine and a second rotor connected with the drive shaft, the second rotor being coaxial to and rotatable relative to the first rotor, the first and second motors being electromagnetically connected with each other, whereby power is transmitted between the output shaft of the engine and the drive shaft via an electromagnetic coupling of the first rotor with the second rotor; a first motor-driving circuit for controlling the degree of electromagnetic coupling of the first rotor with the second rotor in the first motor and regulating the rotation of the second rotor relative to the first rotor; a second motor connected with the output shaft of the engine; a second motor-driving circuit for driving and controlling the second motor; storage battery means being charged with electric power regenerated by the first motor via the first motor-driving circuit, being charged with electric power regenerated by the second motor via the second motor-driving circuit, being discharged to release electric power required to drive the first motor via the first motor-driving circuit, and being discharged to release electric power required to drive the second motor via the second motor-driving circuit; remaining charge measuring means for measuring a remaining charge of the storage battery means; target power specifying means for specifying a target power to be output to the drive shaft, based on an instruction given by an operator; and control means for controlling the first and second motors via the first and second motor-driving circuits as well as for controlling operation of the engine, based on the target power specified by the target power specifying means and the remaining charge of the storage battery means measured by the remaining charge measuring means, in order to set the remaining charge of the storage battery means within a predetermined range and enable the target power to be output to the drive shaft. The seventh power output apparatus of the present invention outputs the target power, which is specified based on the instruction of the operator, to the drive shaft while enabling the remaining charge of the storage battery means to be kept in the predetermined range. This structure can keep the power output to the drive shaft free from a variation due to the charging or discharging process of the storage battery means but make the output power substantially identical with the target power, which is specified based on the instruction of the operator. Like the other power output apparatuses of the present invention discussed above, this structure also effectively protects the storage battery means from excessive charging and discharging, thereby preventing the life of the storage battery means from being unduly shortened.

In accordance with one aspect of the seventh power output apparatus, the control means further comprises: charging-state engine control means for controlling operation of the engine, in order to enable the engine to output a power corresponding to energy which is greater than energy corresponding to the target power, when the remaining charge of the storage battery means measured by the remaining charge measuring means is less than the predetermined range; and charging-state motor control means for controlling the first and second motors, in order to enable part of the power generated by the engine controlled by the charging-state engine control means to undergo energy conversion and to be output as the target power to the drive shaft, as well as to enable the storage battery means to be charged with electric power regenerated from the residual power output from the engine. When the remaining charge of the storage batter means is less than the predetermined range, part of the power generated by the engine is subjected to the energy conversion and output to the drive shaft as the target power, while the storage battery means is charged with the electric power regenerated from the residual power from the engine. This structure can keep the power output to the drive shaft free from a decrease due to the charging process of the storage battery means but make the output power substantially identical with the target power, which is specified based on the instruction of the operator.

In accordance with another aspect of the seventh power output apparatus, the control means further comprises: discharging-state engine control means for controlling operation of the engine, in order to enable the engine to output a power corresponding to energy which is smaller than energy corresponding to the target power, when the remaining charge of the storage battery means measured by the remaining charge measuring means is greater than the predetermined range; and discharging-state motor control means for controlling the first and second motors, in order to enable the sum of the power generated by the engine controlled by the discharging-state engine control means and electric power released from the storage battery means to undergo energy conversion and to be output as the target power to the drive shaft. When the remaining charge of the storage battery means is greater than the predetermined range, the sum of the power generated by the engine and the electric power released from the storage battery means is subjected to the energy conversion and output to the drive shaft as the target power. This structure can keep the power output to the drive shaft free from an increase due to the discharging process of the storage battery means but make the output power substantially identical with the target power, which is specified based on the instruction of the operator.

A eighth power output apparatus of the invention comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first and second rotors constituting a first motor, whereby power is transmitted between the output shaft of the engine and the drive shaft via an electromagnetic coupling of the first rotor with the second rotor, while the first rotor and the stator constituting a second motor for transmitting and receiving power to and from the output shaft of the engine; a first motor-driving circuit for driving and controlling the first motor in the complex motor; a second motor-driving circuit for driving and controlling the second motor in the complex motor; storage battery means being charged with electric power regenerated by the first motor of the complex motor via the first motor-driving circuit, being charged with electric power regenerated by the second motor of the complex motor via the second motor-driving circuit, being discharged to release electric power required to drive the first motor of the complex motor via the first motor-driving circuit, and being discharged to release electric power required to drive the second motor of the complex motor via the second motor-driving circuit; remaining charge measuring means for measuring a remaining charge of the storage battery means; target power specifying means for specifying a target power to be output to the drive shaft, based on an instruction given by an operator; and control means for controlling the first and second motors of the complex motor via the first and second motor-driving circuits as well as for controlling operation of the engine, based on the target power specified by the target power specifying means and the remaining charge of the storage battery means measured by the remaining charge measuring means, in order to set the remaining charge of the storage battery means within a predetermined range and enable the target power to be output to the drive shaft. The eighth power output apparatus of the present invention outputs the target power, which is specified based on the instruction of the operator, to the drive shaft while enabling the remaining charge of the storage battery means to be kept in the predetermined range. This structure can keep the power output to the drive shaft free from a variation due to the charging or discharging process of the storage battery means but make the output power substantially identical with the target power, which is specified based on the instruction of the operator. The complex motor, in which the first motor and the second motor are combined with each other, reduces the size of the whole power output apparatus. Like the other power output apparatuses of the present invention discussed above, this structure also effectively protects the storage battery means from excessive charging and discharging, thereby preventing the life of the storage battery means from being unduly shortened.

In accordance with one aspect of the eighth power output apparatus, the control means further comprises: charging-state engine control means for controlling operation of the engine, in order to enable the engine to output a power corresponding to energy which is greater than energy corresponding to the target power, when the remaining charge of the storage battery means measured by the remaining charge measuring means is less than the predetermined range; and charging-state motor control means for controlling the first and second motors of the complex motor, in order to enable part of the power generated by the engine controlled by the charging-state engine control means to undergo energy conversion and to be output as the target power to the drive shaft, as well as to enable the storage battery means to be charged with electric power regenerated from the residual power output from the engine. When the remaining charge of the storage batter means is less than the predetermined range, part of the power generated by the engine is subjected to the energy conversion and output to the drive shaft as the target power, while the storage battery means is charged with the electric power regenerated from the residual power from the engine. This structure can keep the power output to the drive shaft free from a decrease due to the charging process of the storage battery means but make the output power substantially identical with the target power, which is specified based on the instruction of the operator.

In accordance with another aspect of the eighth power output apparatus, the control means further comprises: discharging-state engine control means for controlling operation of the engine, in order to enable the engine to output a power corresponding to energy which is smaller than energy corresponding to the target power, when the remaining charge of the storage battery means measured by the remaining charge measuring means is greater than the predetermined range; and discharging-state motor control means for controlling the first and second motors of the complex motor, in order to enable the sum of the power generated by the engine controlled by the discharging-state engine control means and electric power released from the storage battery means to undergo energy conversion and to be output as the target power to the drive shaft. When the remaining charge of the storage battery means is greater than the predetermined range, the sum of the power generated by the engine and the electric power released from the storage battery means is subjected to the energy conversion and output to the drive shaft as the target power. This structure can keep the power output to the drive shaft free from an increase due to the discharging process of the storage battery means but make the output power substantially identical with the target power, which is specified based on the instruction of the operator.

The invention is also directed to a first method of controlling a apparatus. The first method comprises the steps of: (a) providing an engine having an output shaft; a first motor comprising a first rotor connected with the output shaft of the engine and a second rotor connected with the drive shaft, the second rotor being coaxial to and rotatable relative to the first rotor, the first and second motors being electromagnetically connected with each other, whereby power is transmitted between the output shaft of the engine and the drive shaft via an electromagnetic coupling of the first rotor with the second rotor; a second motor connected with the drive shaft; storage battery means being charged with electric power regenerated by the first motor, being charged with electric power regenerated by the second motor, being discharged to release electric power required to drive the first motor, and being discharged to release electric power required to drive the second motor; (b) measuring a remaining charge of the storage battery means; and (c) controlling the first and second motors based on the remaining charge of the storage battery means measured in the step (b), in order to set the remaining charge of the storage battery means within a predetermined range. The first method of the present invention enables the remaining charge of the storage battery means to be kept in the predetermined range. This effectively protects the storage battery means from excessive charging and discharging, thereby preventing the life of the storage battery means from being unduly shortened.

In accordance with one aspect of the first method, the step (c) further comprises the step of (d) controlling the first and second motors, in order to enable the storage battery means to be charged with at least part of electric power regenerated by at least one of the first motor and the second motor, when the remaining charge of the storage battery means is less than the predetermined range.

In accordance with another aspect of the first method, the step (c) further comprises the step of (e) controlling the first and second motors, in order to enable at least part of electric power consumed by at least one of the first motor and the second motor to be supplied by electric power released from the storage battery means, when the remaining charge of the storage battery means is greater than the predetermined range.

A second method of controlling a apparatus comprises the steps of: (a) providing an engine having an output shaft; a first motor comprising a first rotor connected with the output shaft of the engine and a second rotor connected with the drive shaft, the second rotor being coaxial to and rotatable relative to the first rotor, the first and second motors being electromagnetically connected with each other, whereby power is transmitted between the output shaft of the engine and the drive shaft via an electromagnetic coupling of the first rotor with the second rotor; a second motor connected with the drive shaft; storage battery means being charged with electric power regenerated by the first motor, being charged with electric power regenerated by the second motor, being discharged to release electric power required to drive the first motor, and being discharged to release electric power required to drive the second motor; (b) measuring a remaining charge of the storage battery means; (c) specifying a target power to be output to the drive shaft, based on an instruction given by an operator; and (d) controlling the first and second motors concurrently with controlling operation of the engine, based on the target power specified in the step (c) and the remaining charge of the storage battery means measured in the step (b), in order to set the remaining charge of the storage battery means within a predetermined range and enable the target power to be output to the drive shaft. The second method of the invention outputs the target power, which is specified based on the instruction of the operator, to the drive shaft while enabling the remaining charge of the storage battery means to be kept in the predetermined range. This method can keep the power output to the drive shaft free from a variation due to the charging or discharging process of the storage battery means but make the output power substantially identical with the target power, which is specified based on the instruction of the operator.

In accordance with one aspect of the second method, the step (d) further comprises the steps of: (e) controlling operation of the engine, in order to enable the engine to output a power corresponding to energy which is greater than energy corresponding to the target power, when the remaining charge of the storage battery means is less than the predetermined range; and (f) controlling the first and second motors, in order to enable part of the power generated by the engine controlled in the step (e) to undergo energy conversion and to be output as the target power to the drive shaft, as well as to enable the storage battery means to be charged with electric power regenerated from the residual power output from the engine.

In accordance with another aspect of the second method, the step (d) further comprises the steps of: (g) controlling operation of the engine, in order to enable the engine to output a power corresponding to energy which is smaller than energy corresponding to the target power, when the remaining charge of the storage battery means is greater than the predetermined range; and (h) controlling the first and second motors, in order to enable the sum of the power generated by the engine controlled in the step (g) and electric power released from the storage battery means to undergo energy conversion and to be output as the target power to the drive shaft.

19

Figure 1:
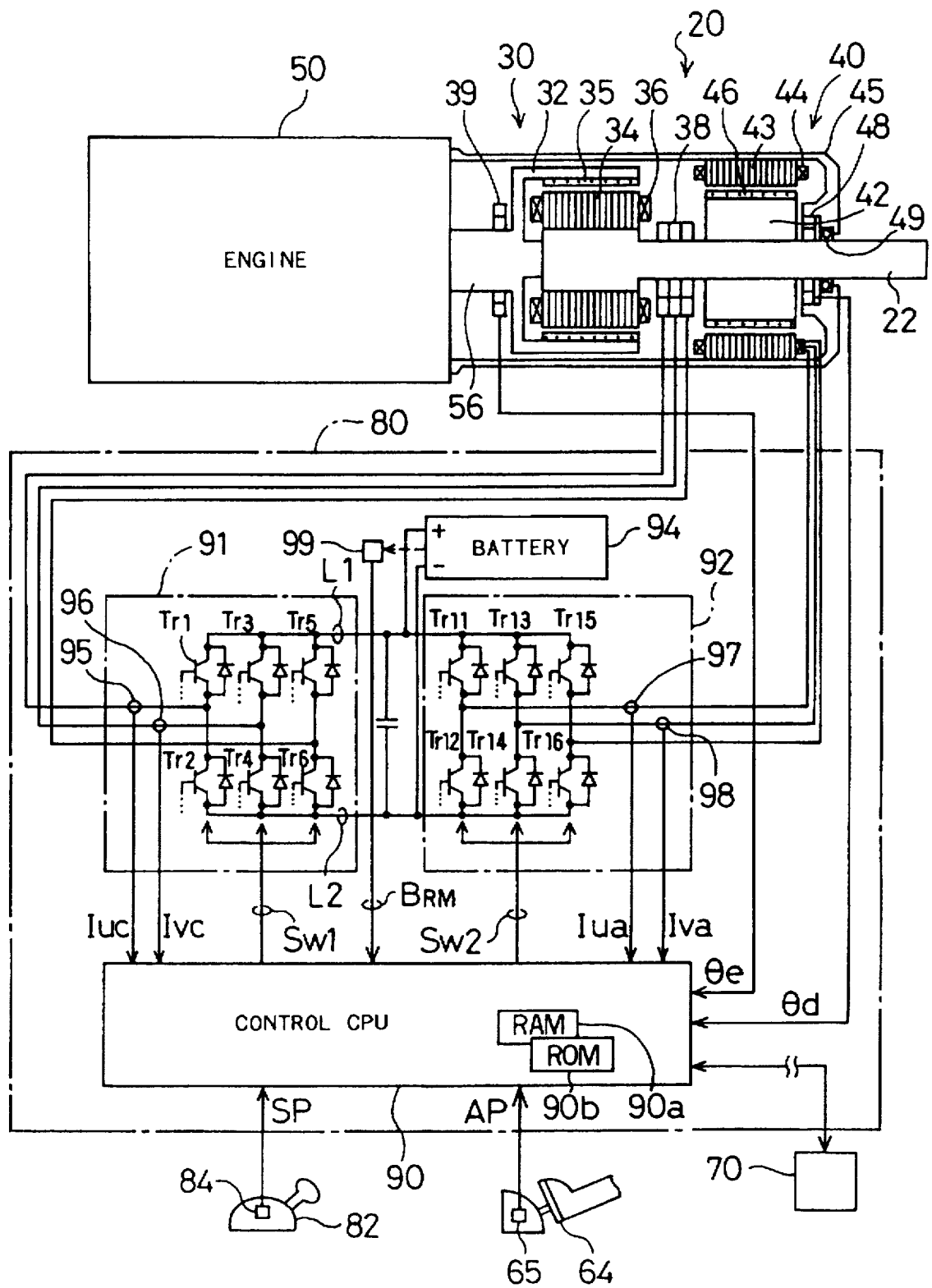
FIG. 1 is a schematic view illustrating structure of a power output apparatus 20 as a first embodiment according to the present invention.
Figure 62:
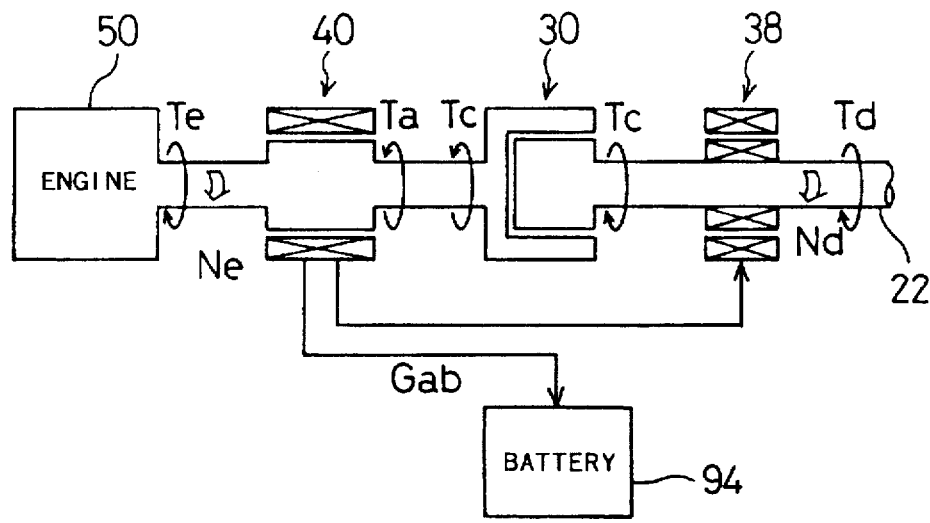
Figure 63:
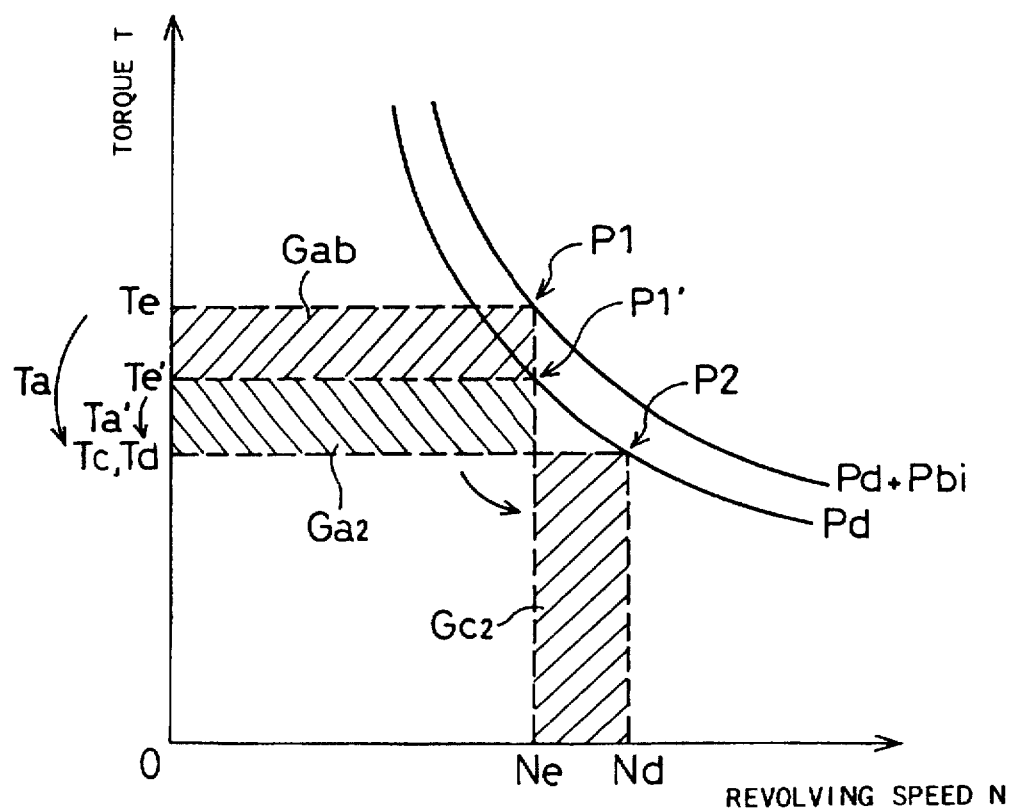
Figure 64:
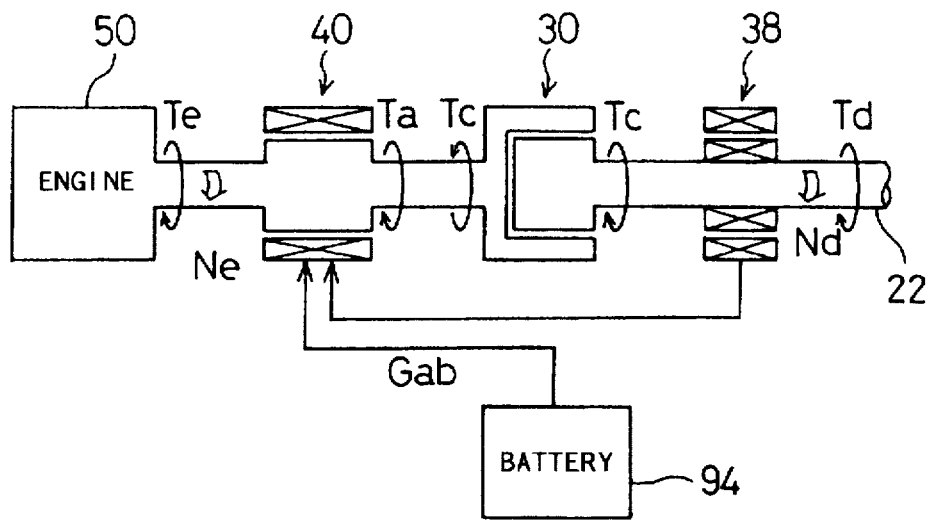
Figure 65:
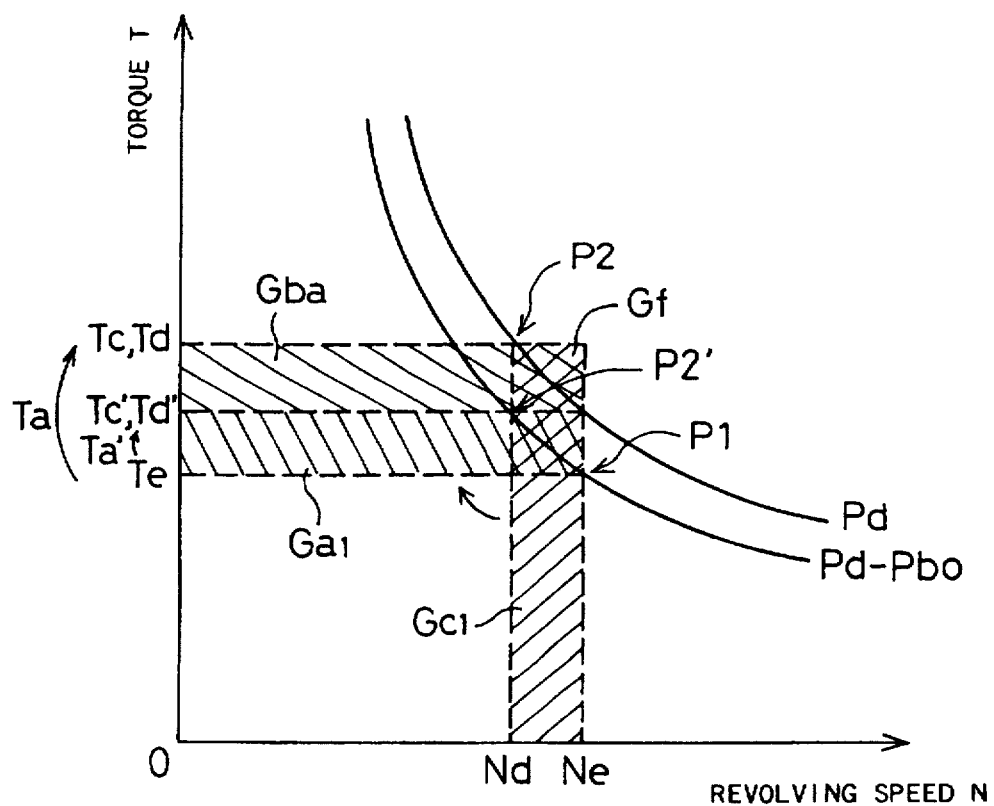
Figure 66:
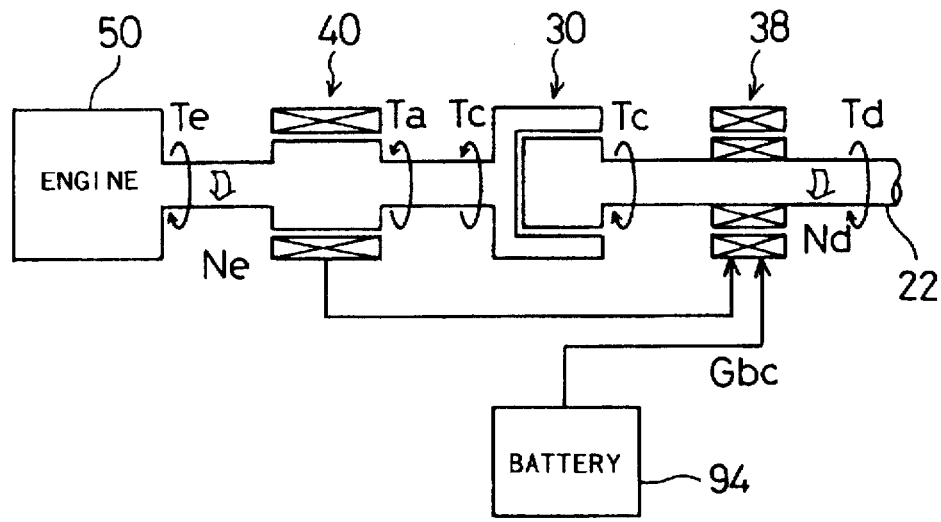
Figure 67:
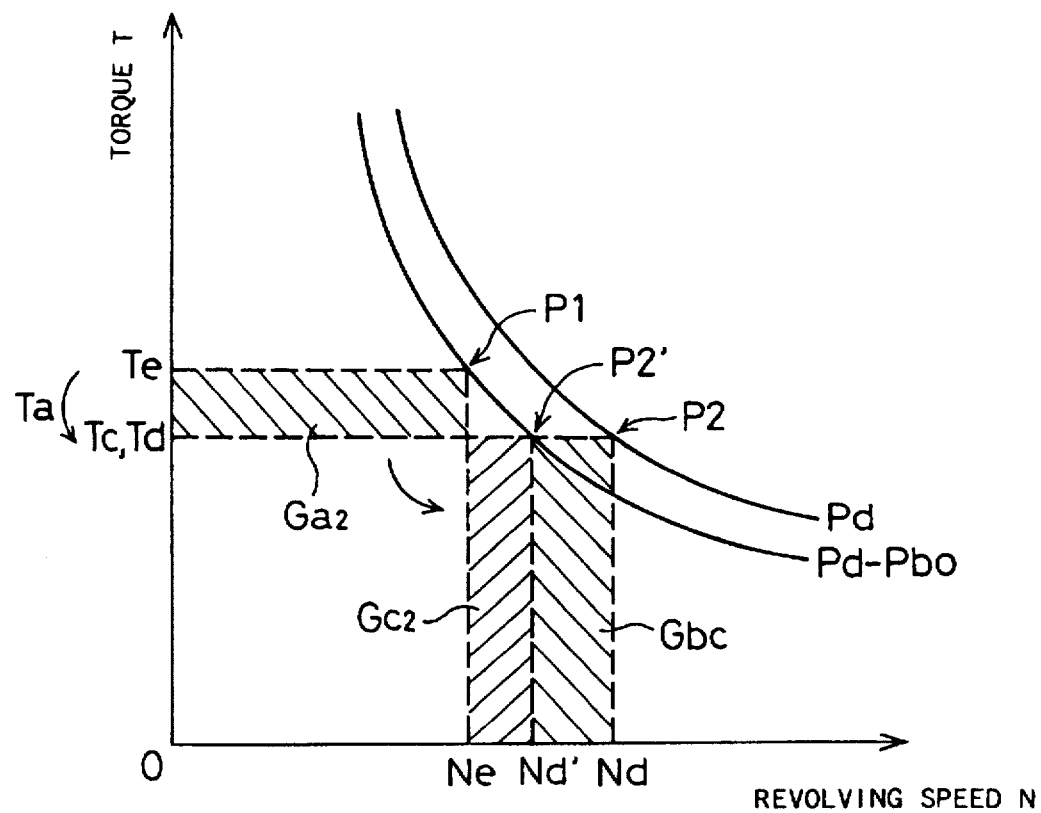
Figure 68:
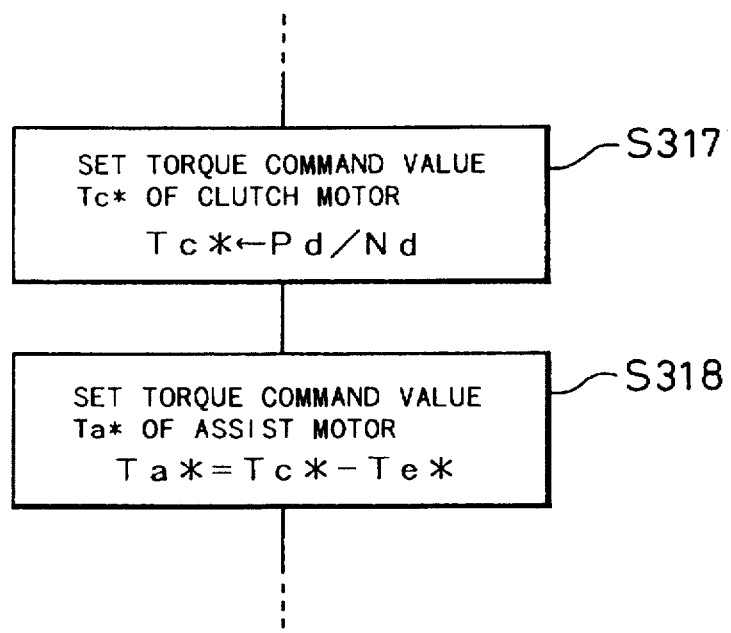
Figure 69:
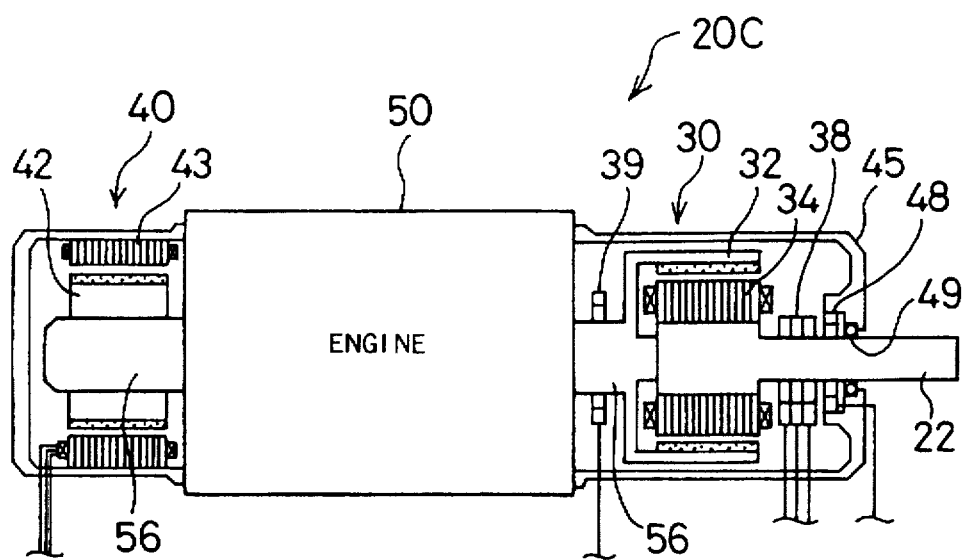
Figure 70:
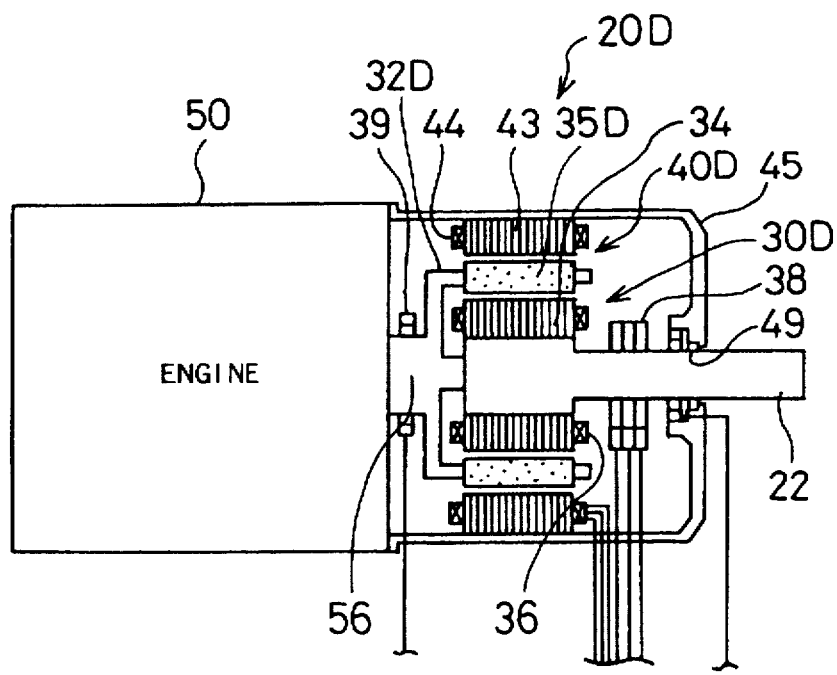
Figure 71:
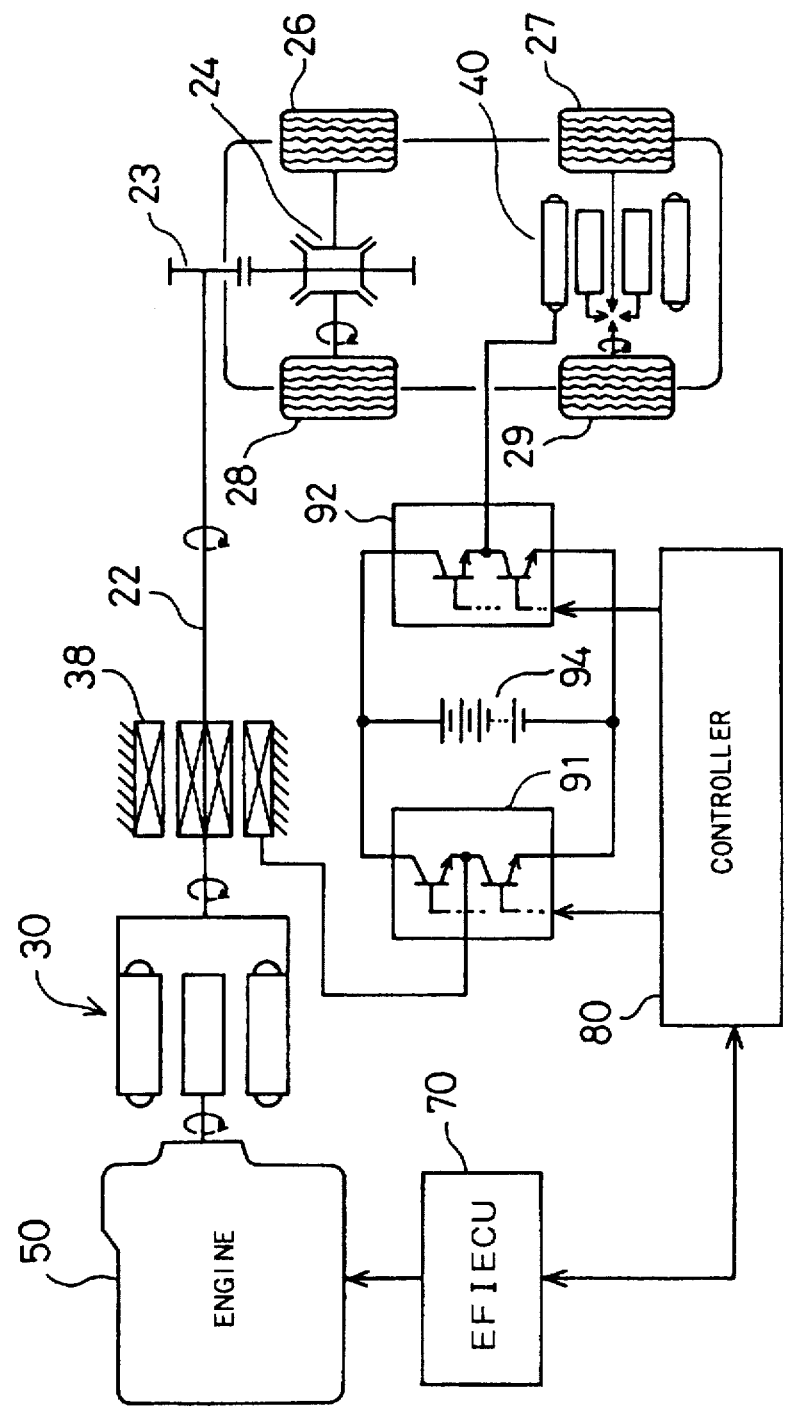

FIG. 62 illustrates the acting state of torque and the charging state of the battery 94 when the revolving speed Ne is less than the revolving speed Nd in the power output apparatus 20B of the second embodiment;

FIG. 63 is a graph showing the state of torque conversion under the condition of FIG. 62;

FIG. 64 illustrates the acting state of torque and the discharging state of the battery 94 when the revolving speed Ne is greater than the revolving speed Nd in the power output apparatus 20B of the second embodiment;

FIG. 65 is a graph showing the state of torque conversion under the condition of FIG. 64;

FIG. 66 illustrates the acting state of torque and the discharging state of the battery 94 when the revolving speed Ne is less than the revolving speed Nd in the power output apparatus 20B of the second embodiment;

FIG. 67 is a graph showing the state of torque conversion under the condition of FIG. 66;

FIG. 68 is a flowchart showing part of the power assist control routine executed in the second embodiment by the control CPU 90 of the controller 80;

FIG. 69 illustrates structure of another power output apparatus 20C given as a modified example of the power output apparatus 20B of the second embodiment;

FIG. 70 illustrates structure of still another power output apparatus 20D given as another modified example of the power output apparatus 20B he second embodiment; and FIG. 71 shows structure of a vehicle with a four-wheel drive, to which the power output apparatus of the first embodiment shown in FIG. 1 is applied.

DESCRIPTION OF THE PREFERRED EMBODIMENTS

Figure 2:
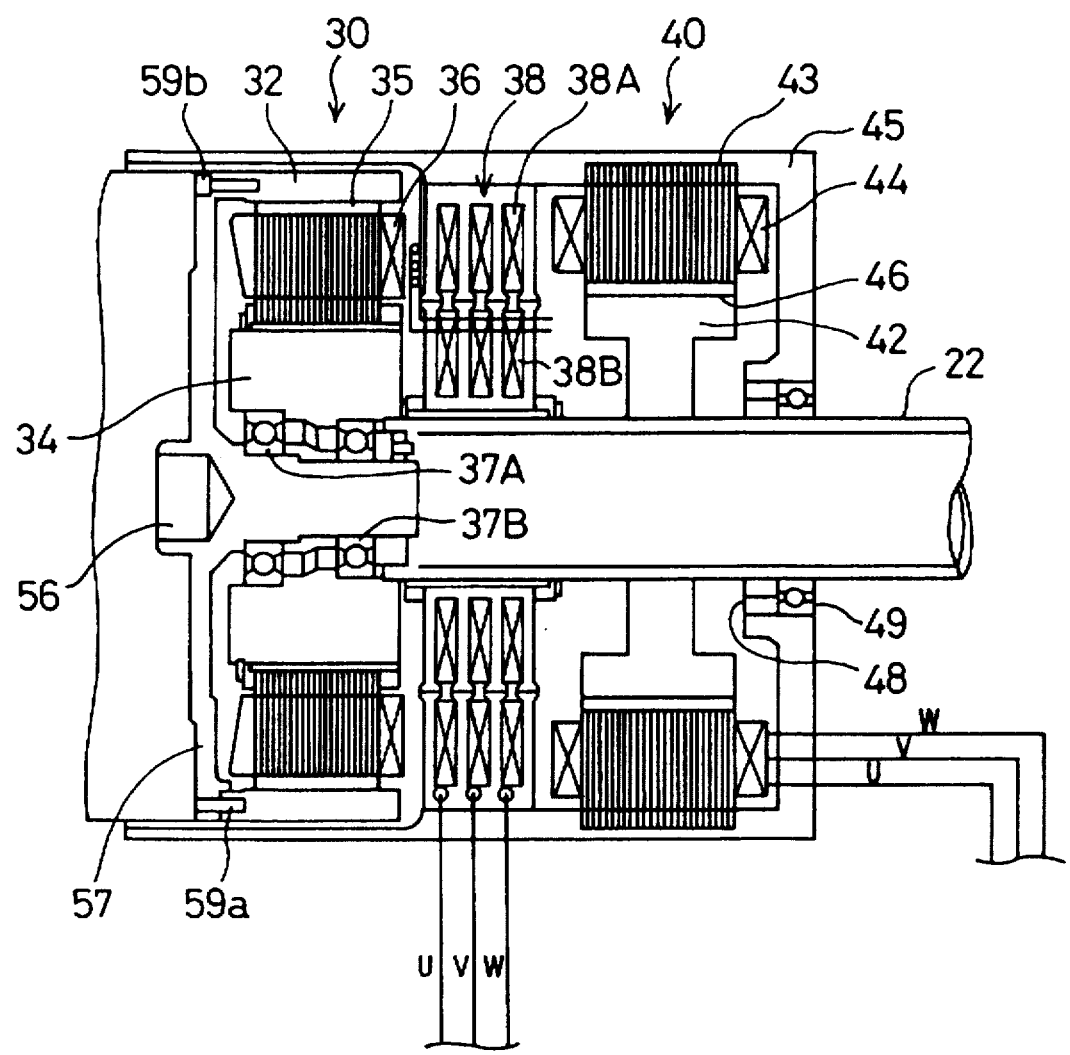
FIG. 2 is a cross sectional view illustrating detailed structure of a clutch motor 30 and an assist motor 40 included in the power output apparatus 20 of FIG. 1.
Figure 3:
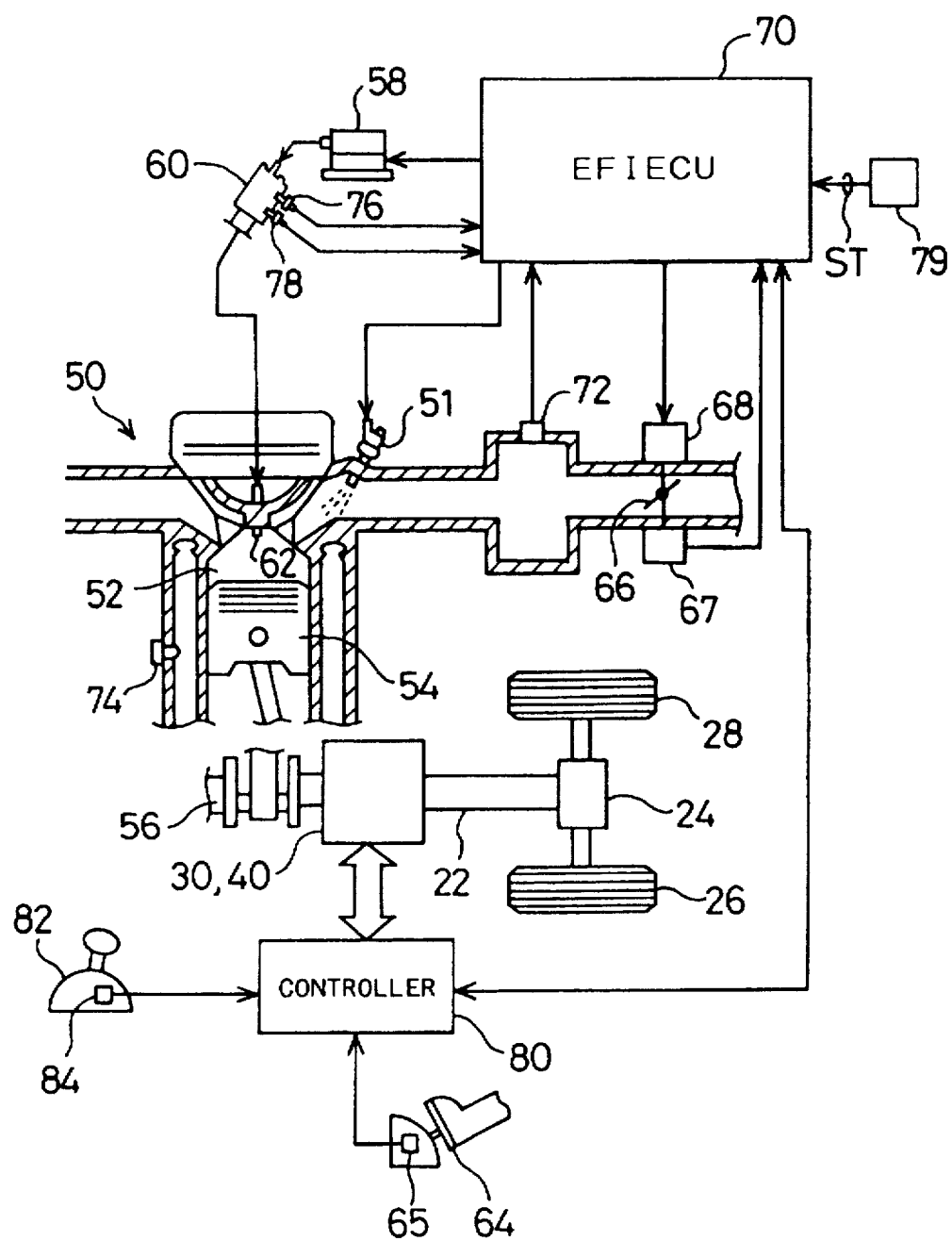
FIG. 3 is a schematic view illustrating general structure of a vehicle with the power output apparatus 20 of FIG. 1 incorporated therein.

Preferable modes for embodying the present invention are described hereafter. FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first for the convenience of description.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position BP of the throttle valve 66, a manifold vacuum sensor 72 for measuring a load applied to the engine 50, a water temperature sensor 74 for measuring

20 the temperature of cooling water in the engine 50, and a speed sensor 76 and an angle sensor 78 mounted on the distributor 60 for measuring the revolving speed and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the engine 50, whereas the inner rotor 34 thereof is mechanically linked with the rotor 42 of the assist motor 40.

Structures of the clutch motor 30 and the assist motor 40 are described briefly. As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. Laminated sheets of non-directional electromagnetic steel are used to form teeth and slots for the three-phase coils 36 in the inner rotor 34. A resolver 39 for measuring a rotational angle θ e of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42. The rotor 42 is mechanically linked with the drive shaft 22 working as the torque output shaft of the power output apparatus 20. A resolver 48 for measuring a rotational angle θ d of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. The rotation and axial torque of the crankshaft 56 of the engine 50 are accordingly transmitted via the outer rotor 32 and the inner rotor 34 of the clutch motor 30 to the drive shaft 22 while the rotation and torque of the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 mounted thereon and the inner rotor 34 with the three-phase coils 36 attached thereto. The detailed structure of the clutch motor 30 is described according to the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30 and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38A fixed to the casing 45 and secondary windings 38B attached to the drive shaft 22 coupled with the inner rotor 34. Electromagnetic induction enables electric power to be transmitted from the primary windings 38A to the secondary windings 38B or vice versa. The rotary transformer 38 has windings for the three phases, that is, U, V, and W phases, to allow for the transmission of three-phase electric currents.

Interaction between a magnetic field formed by one adjoining pair of permanent magnets 35 and a revolving magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (the number of revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later, based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input/output port. The input data include a rotational angle $\theta$e of the crankshaft 56 of the engine 50 measured by the resolver 39, a rotational angle $\theta$d of the drive shaft 22 measured by the resolver 48, an accelerator pedal position AP (step-on amount of the accelerator pedal 64) output from the accelerator position sensor 65, a gearshift position SP output from the gearshift position sensor 84, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured by a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines L1 and L2. The three-phase coils (U,V,W) 36 of the clutch motor 30 are connected via the rotary transformer 38 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output apparatus 20 thus constructed works in accordance with the operation principles discussed below, especially with the principle of torque conversion. By way of example, it is assumed that the crankshaft 56 of the engine 50 driven by the EFIECU 70 rotates at a revolving speed Ne, which is equal to a predetermined value N1. In the description below, the revolving speed Ne of the crankshaft 56 is also referred to as the revolving speed Ne of the engine 50. While the transistors Tr1 through Tr6 in the first driving circuit 91 are in OFF position, the controller 80 does not supply any electric current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current flows through the three-phase coils 36 of the clutch motor 30, based on the difference between the revolving speed Ne of the engine 50 and a revolving speed Nd of the drive shaft 22 (in other words, a difference Nc (=Ne−Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the engine 50. In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
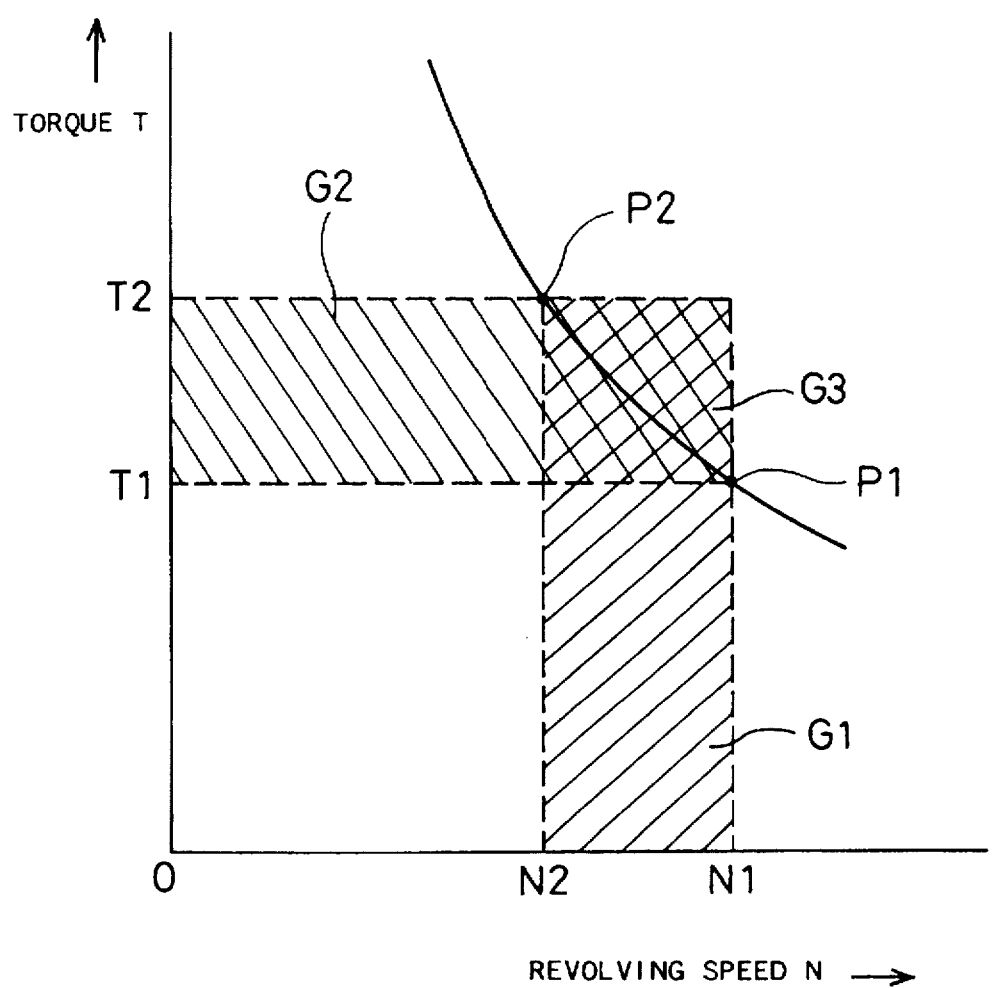
FIG. 4 is a graph showing the operation principle of the power output apparatus 20.

Referring to FIG. 4, in the power output apparatus 20, when the engine 50 is driven at a first driving point P1, where the engine speed Ne is equal to a predetermined revolving speed N1 and an engine torque Te is equal to a predetermined value T1, the clutch motor 30 carries out the regenerative operation to produce an energy defined by a first area G1. The energy of the first area G1 is supplied to the assist motor 40 as an energy defined by a second area G2. The drive shaft 22 is accordingly driven at a second driving point P2, where the drive shaft speed Nd is equal to a predetermined revolving speed N2 and a drive shaft torque Td is equal to a predetermined value T2. The torque conversion is carried out in the manner discussed above, and the energy corresponding to the slip in the clutch motor 30 or the revolving speed difference NC (=Ne−Nd) is consequently given as a torque to the drive shaft 22.

In accordance with another example, it is assumed that the engine 50 is driven at the second driving point P2, where the engine speed Ne is equal to the predetermined revolving speed N2 and the engine torque Te is equal to the predetermined value T2, while the revolving speed Nd of the drive shaft 22 is equal to the predetermined revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). The clutch motor 30 accordingly functions as a normal motor and consumes electric power to supply the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using electric power stored in the battery 94.

Referring back to FIG. 4, when the engine 50 is driven at the second driving point P2, where the revolving speed Ne=N2 and the torque Te=T2, the assist motor 40 regenerates an energy corresponding to the sum of the second area G2 and a third area G3. The energy of the areas G2 and G3 is supplied to the clutch motor 30 as an energy defined by the sum of the first area G1 and the third area G3. The drive shaft 22 is accordingly driven at the first driving point P1, where the revolving speed Nd=N1 and the torque Td=T1.

Other than the torque conversion discussed above, the power output apparatus 20 of the embodiment can charge the battery 94 with an excess of electrical energy or discharge the battery 94 to supplement the electrical energy. This is implemented by controlling the mechanical energy output from the engine 50 (that is, the product of the torque Te and the revolving speed Ne), the electrical energy regenerated or consumed by the clutch motor 30, and the electrical energy consumed or regenerated by the assist motor 40. The power (energy) output from the engine 50 can thus be transmitted to the drive shaft 22 at a higher efficiency.

Figure 5:
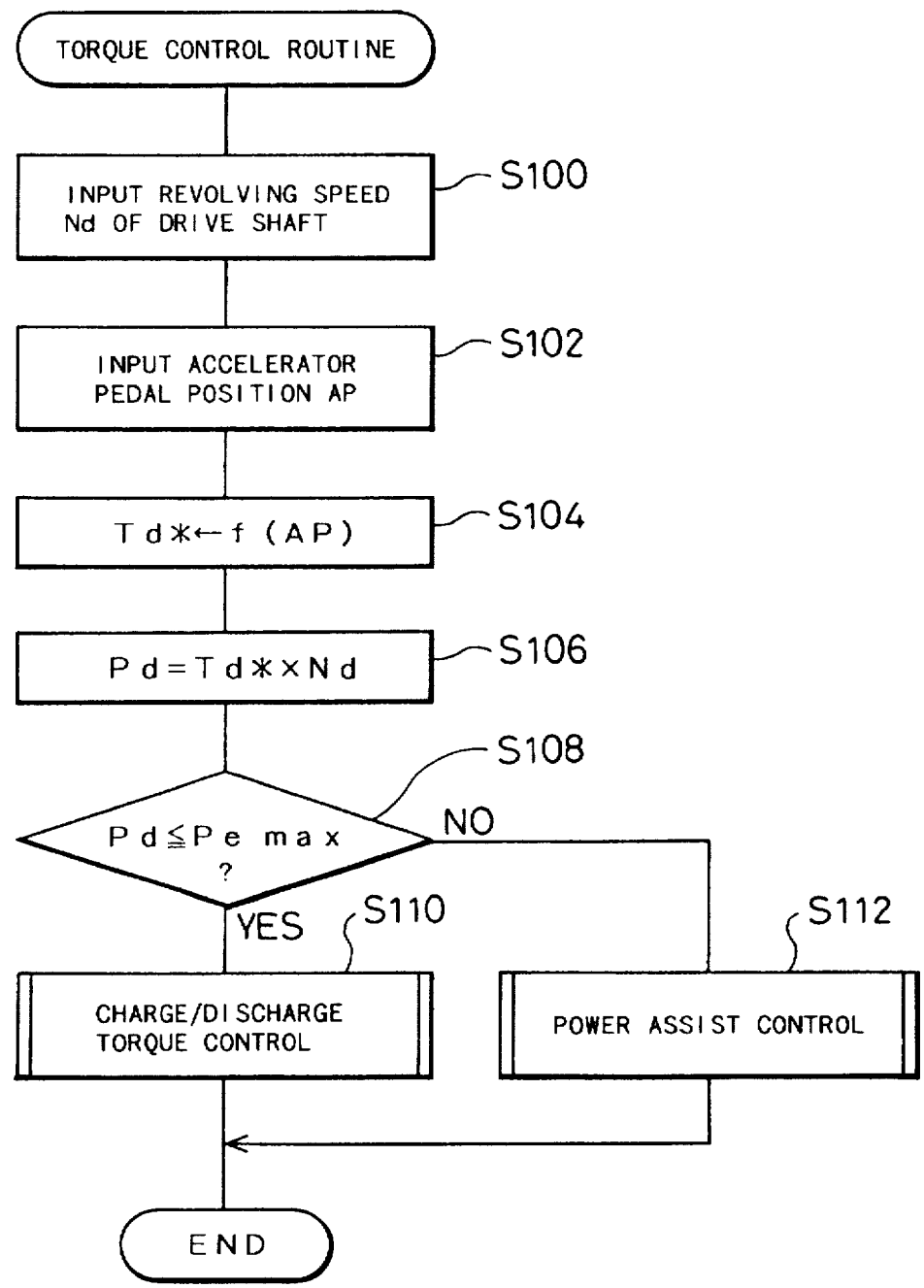
FIG. 5 is a flowchart showing a torque control routine executed in the first embodiment by the control CPU of the controller 80.

The concrete procedure of torque conversion executed by the power output apparatus 20 is described according to a torque control routine shown in the flowchart of FIG. 5. The torque control routine is executed repeatedly at predetermined time intervals after the driver has started the vehicle.

When the program enters the torque control routine, the control CPU 90 of the controller 80 first receives data of revolving speed Nd of the drive shaft 22 at step S100. The revolving speed Nd of the drive shaft 22 can be computed from the rotational angle θ d of the drive shaft 22 read from the resolver 48. At subsequent step S102, the control CPU 90 reads the accelerator pedal position AP detected by the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S104 at which the control CPU 90 computes a target output torque Td* corresponding to the input accelerator pedal position AP. The target output torque Td* implies a target torque to be output to the drive shaft 22 and is hereinafter referred to as the 'output torque command value'. In this embodiment, output torque command values Td* corresponding to the respective accelerator pedal positions AP have been set in advance and stored in the ROM 90b. In response to an input of the accelerator pedal position AP, the output torque command value Td* corresponding to the input accelerator pedal position AP is extracted from the output torque command values Td* stored in the ROM 90b.

Figure 6:
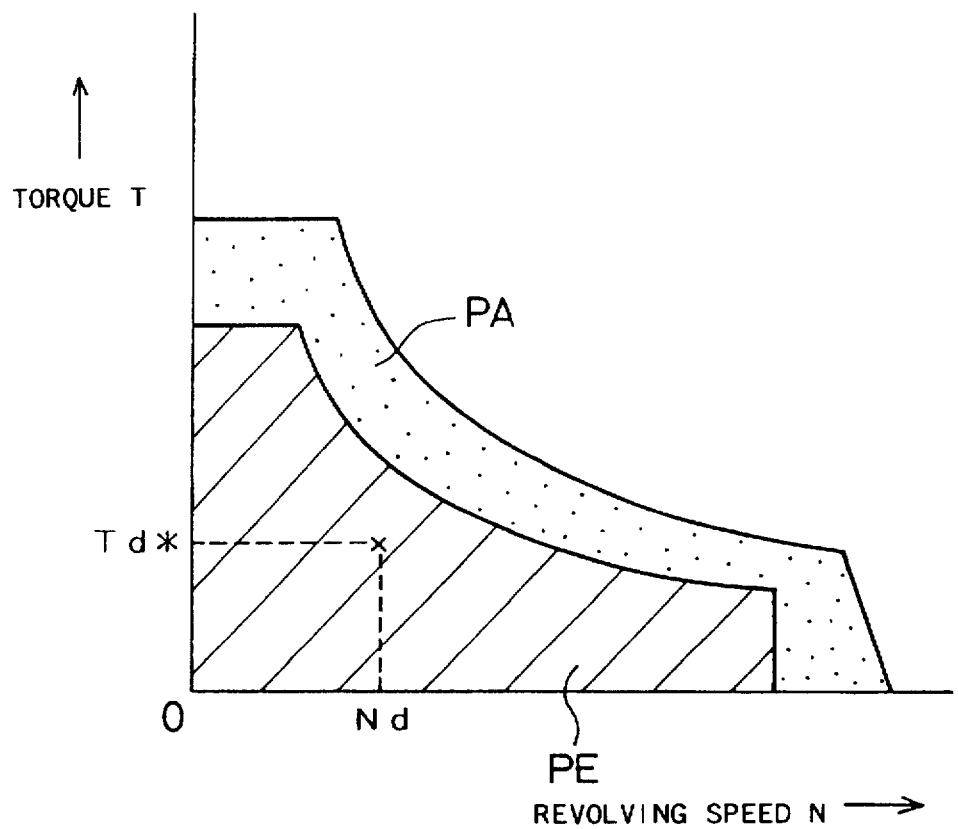
FIG. 6 is a graph showing a possible output range of energy from the engine 50 and the same from the power output apparatus 20.

At step S106, an amount of energy Pd (target energy) to be output to the drive shaft 22 is calculated from the extracted output torque command value Td* and the input revolving speed Nd of the drive shaft 22 according to the expression Pd=Td*×Nd. The program then proceeds to step S108 at which the output energy Pd thus calculated is compared with a maximum energy Pemax. The maximum energy Pemax is defined as a largest amount of energy which can be output from the engine 50. FIG. 6 shows a possible output range of energy from the engine 50 and the same from the power output apparatus 20, with the torque of the drive shaft 22 as ordinate and the revolving speed of the drive shaft 22 as abscissa. An area PE represents a range of energy which can be output from the engine 50, whereas another area PA represents a possible range of total output energy defined as the total of maximum energy from the engine 50 and energy from the battery 94. The boundary curve of the area PE accordingly represents the maximum energy Pemax, and that of the area PA shows the maximum energy which can be output from the power output apparatus 20. The result of comparison between the output energy Pd and the maximum energy Pemax determines whether the output energy Pd is within the possible output range of energy from the engine 50.

When the output energy Pd is equal to or less than the maximum energy Pemax at step S108, the program determines that the amount of required energy is within the possible output range of energy from the engine 50 and proceeds to step S110 to execute a charge/discharge torque control as discussed below. When the output energy Pd is greater than the maximum energy Pemax at step S108, on the contrary, the program determines that the amount of required energy exceeds the possible output range of energy from the engine 50 and proceeds to step S112 to execute a power assist control as discussed later. After the processing of either step S110 or S112, the program exits from the torque control routine.

A. Charge/Discharge Torque Control Routine

Figure 7:
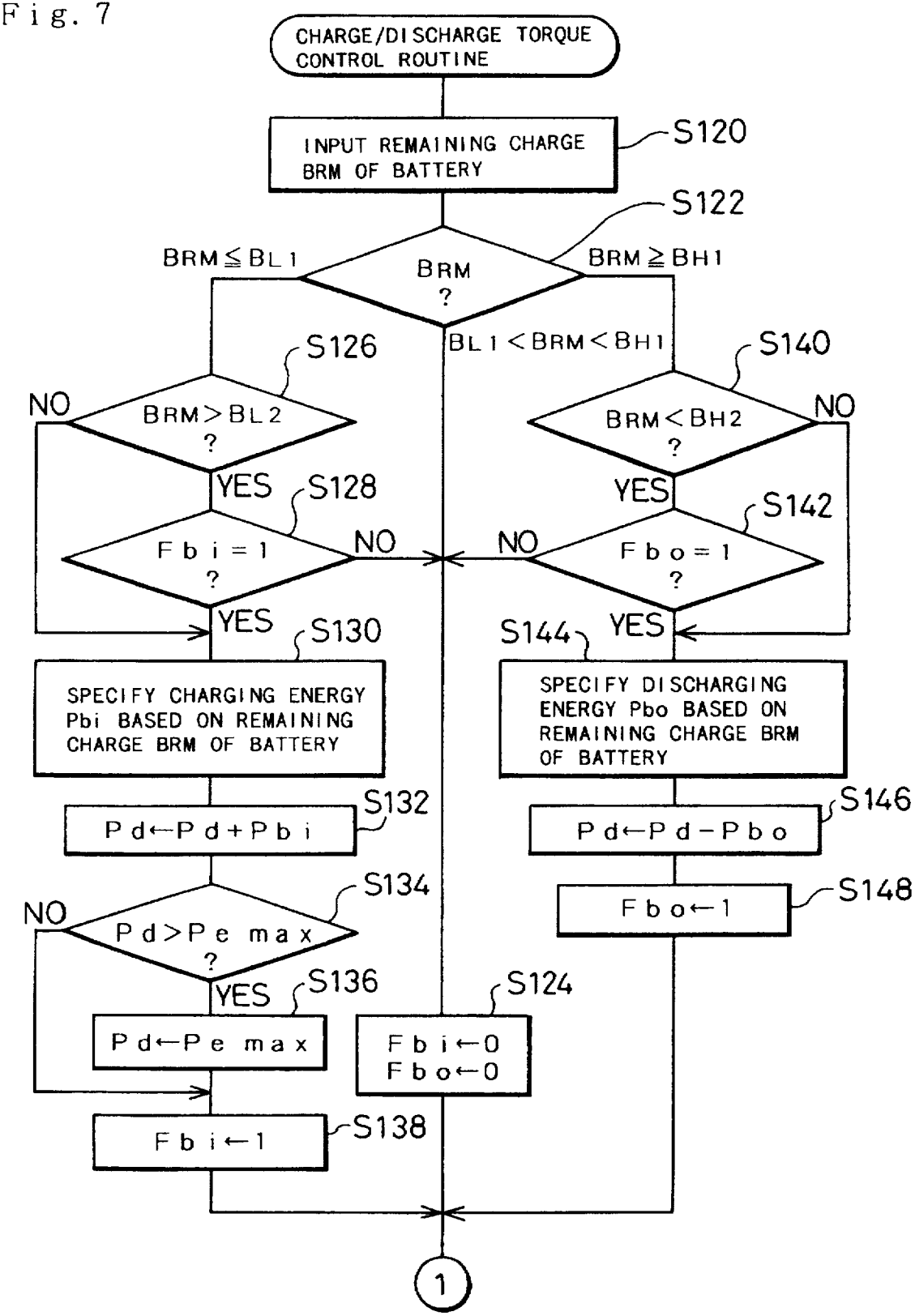
FIGS. 7 and 8 are flowcharts showing a charge/discharge torque control routine executed at step S110 in the flowchart of FIG. 5 by the control CPU 90 of the controller 80.
Figure 8:
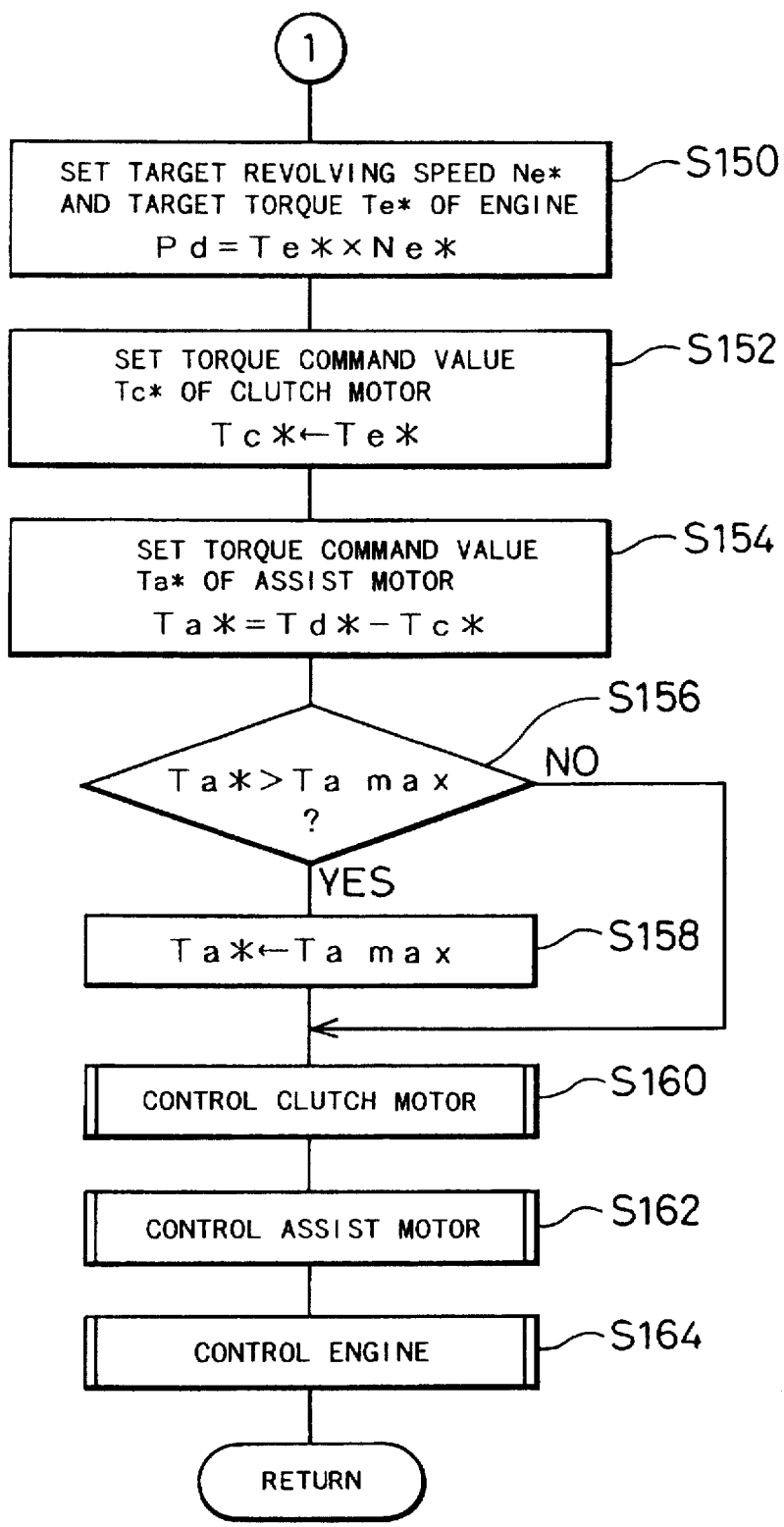

The charge/discharge torque control of step S110 (FIG. 5) is executed according to a charge/discharge torque control routine illustrated in the flowcharts of FIGS. 7 and 8, when it is determined that the amount of required energy is within the possible output range of energy from the engine 50.

When the program enters the charge/discharge torque control routine, the control CPU 90 first reads data of remaining charge BRM of the battery 94 at step S120 and compares the input remaining charge BRM with threshold values BL1 and BH1 at step S122. The threshold values BL1 and BH1 as well as threshold values BL2 and BH2 used in subsequent steps are defined as follows. The threshold value BL2 is defined as an amount of remaining charge at which the process of charging the battery 94 is to be started, and is determined by taking into account the minimum remaining charge required for discharging the battery 94 for a predetermined time period in the power-assist control described later and the remaining charge required for activating the engine 50. The threshold value BL1 is defined as an amount of remaining charge at which the process of charging the battery 94 is to be stopped, and is set to be greater than the threshold value BL2. When the threshold value BL1 is set to be identical with the threshold value BL2 or to be only a little greater than the threshold value BL2, the process of charging the battery 94 repeatedly starts and stops at very short time intervals. The threshold value BL1 should accordingly be determined by taking into account the capacity of the battery 94, in order to prevent frequent start and stop of the process of charging the battery 94. The threshold value BH2 is defined as an amount of remaining charge at which the process of discharging the battery 94 is to be started, and is determined to enable the battery 94 to hold a vacant capacity for storing electric power regenerated by either the clutch motor 30 or the assist motor 40 in the process of braking the rotating drive shaft 22. The threshold value BH1 is defined as an amount of remaining charge at which the process of discharging the battery 94 is to be stopped, and is set to be smaller than the threshold value BH2. The threshold value BH1 should also be determined by taking into account the capacity of the battery 94, in order to prevent the process of discharging the battery 94 from repeatedly starting and stopping at very short time intervals.

When the remaining charge BRM of the battery 94 is greater than the threshold value BL1 but smaller than the threshold value BH1 at step S122, the program determines that neither charging nor discharging the battery 94 is required and executes the processing of step S124 before proceeding to steps S150 through S164 in the flowchart of FIG. 8. When the remaining charge BRM of the battery 94 is equal to or smaller than the threshold value BL1, on the other hand, the program determines that charging the battery 94 is required and executes the processing of steps S126 through S138 to charge the battery 94 before proceeding to steps S150 through S164 in the flowchart of FIG. 8. When the remaining charge BRM of the battery 94 is equal to or greater than the threshold value BH1, on the other hand, the program determines that discharging the batter 94 is required and executes the processing of steps S140 through S148 to discharge the battery 94 before proceeding to steps S150 through S164 in the flowchart of FIG. 8. The processing steps including those shown in the flowchart of FIG. 8 executed when neither charging nor discharging the battery 94 is required (that is, when the remaining charge BRM of the battery 94 is greater than the threshold value BL1 but smaller than the threshold value BH1) are discussed first, prior to the description of the process of charging the battery 94 (the processing of steps S126 through S138) and the process of discharging the battery 94 (the processing of steps S140 through S148).

(1) Process with Neither Charging nor Discharging the Battery 94

At step S124, both a charging execution flag Fbi and a discharging execution flag Fbo are set equal to zero. The charging execution flag Fbi is set to determine whether charging the battery 94 is being carried out, and the discharging execution flag Fbo is set to determine whether discharging the battery 94 is being carried out. Since step S124 is executed when neither charging nor discharging the battery 94 is required, both the charging execution flag Fbi and the discharging execution flag Fbo are set equal to the value '0', which shows that neither charging nor discharging is carried out.

Referring to the flowchart of FIG. 8, at step S150, the control CPU 90 sets a target torque Te* and a target revolving speed Ne* of the engine 50, based on the output energy Pd obtained at step S106 of the torque control routine shown in the flowchart of FIG. 5. Since the energy supplied from the engine 50 is equal to the product of the torque Te and the revolving speed Ne of the engine 50, the relationship between the output energy Pd and the target torque Te* and the target revolving speed Ne* of the engine 50 can be expressed as Pd=Te*×Ne*. There are, however, numerous combinations of the target torque Te* and the target revolving speed Ne* of the engine 50 satisfying the above relationship. In this embodiment, an optimal combination of the target torque Te* and the target revolving speed Ne* of the engine 50 is selected in order to realize operation of the engine 50 at the highest possible efficiency.

At subsequent step S152, the control CPU 90 determines a torque command value Tc* of the clutch motor 30, based on the target engine torque Te* set at step S150. In order to keep the revolving speed Ne of the engine 50 at a substantially constant level, it is required to make the torque Tc of the clutch motor 30 balance with the torque Te of the engine 50. The processing of step S152 accordingly sets the torque command value Tc* of the clutch motor 30 equal to the target torque Te* of the engine 50.

The program then goes to step S154, at which a torque command value Ta* of the assist motor 40 is calculated by subtracting the torque command value Tc* of the clutch motor 30 from the output torque command value Td*. The torque command value Ta* of the assist motor 40 is computed in this manner since the sum of the torque transmitted from the clutch motor 30 to the drive shaft 22 (torque command value Tc*) and the torque applied from the assist motor 40 to the drive shaft 22 (torque command value Ta*) represents the desired torque eventually acting on the drive shaft 22 (output torque command value Td*). The torque command value Ta* thus computed is compared with a maximum possible torque Tamax applied by the assist motor 40 at step S156. When the torque command value Ta* exceeds the maximum torque Tamax, the program proceeds to step S158, at which the torque command value Ta* is limited to the maximum torque Tamax.

After setting the torque command value Tc* of the clutch motor 30, the torque command value Ta* of the assist motor 40, and the target torque Te* and the target revolving speed Ne* of the engine 50, the program proceeds to steps S160, S162, and S164 to control the clutch motor 30, the assist motor 40, and the engine 50, respectively. As a matter of convenience of illustration, the control operations of the clutch motor 30, the assist motor 40, and the engine 50 are shown as separate steps. In the actual procedure, however, these control operations are carried out concurrently. For example, the control CPU 90 simultaneously controls the clutch motor 30 and the assist motor 40 by interrupt processing, while transmitting an instruction to the EFIECU 70 through communication to control the engine 50 concurrently.

Figure 9:
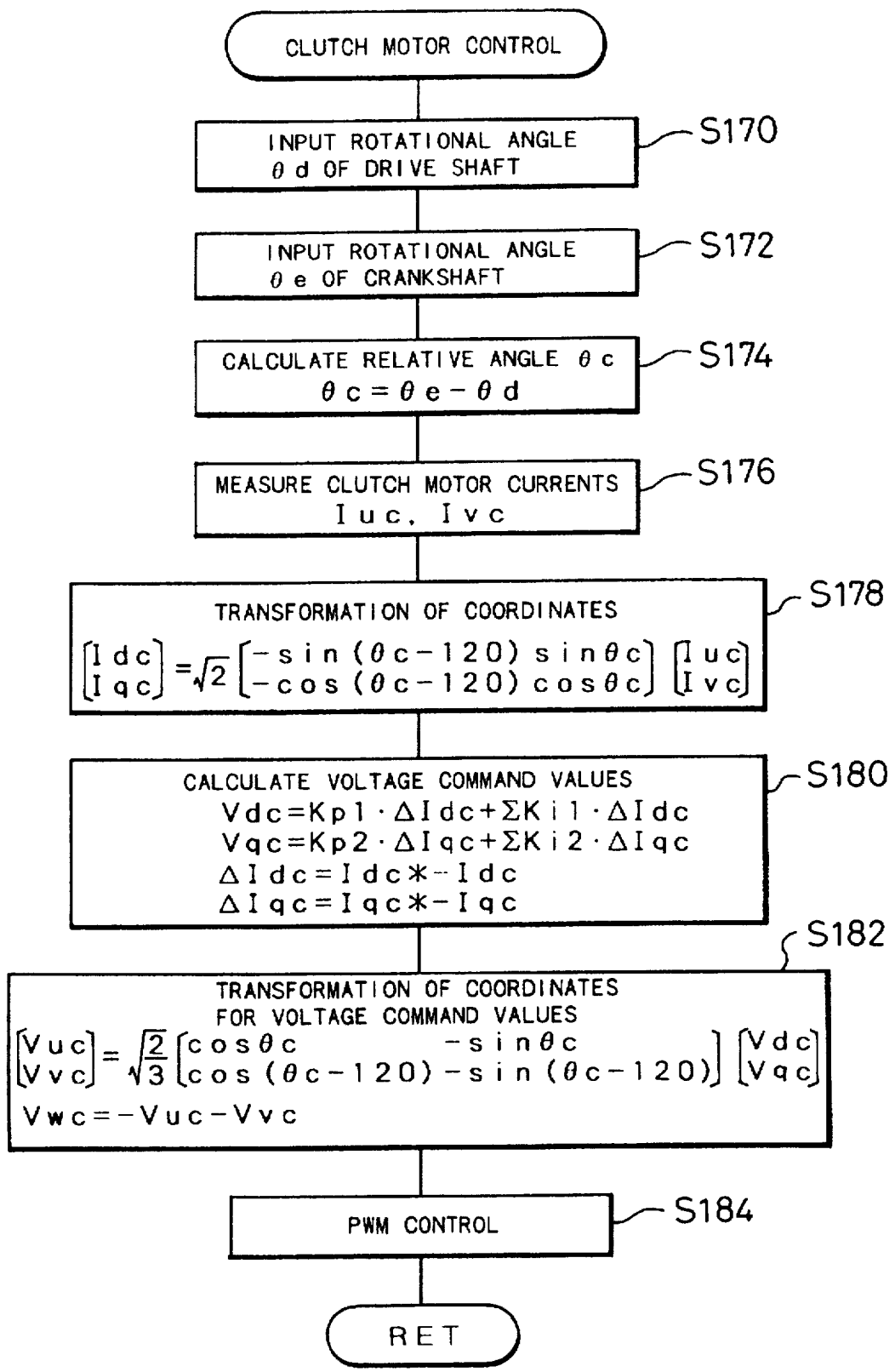
FIG. 9 is a flowchart showing a fundamental control routine of the clutch motor 30 executed at step S160 in the flowchart of FIG. 8 by the controller 80.

FIG. 9 is a flowchart showing details of the control process of the clutch motor 30 executed at step S160 in the flowchart of FIG. 8. When the program enters the clutch motor control routine, the control CPU 90 of the controller 80 first reads the rotational angle θ d of the drive shaft 22 from the resolver 48 at step S170 and the rotational angle θ e of the crankshaft 56 of the engine 50 from the resolver 39 at step S172. The control CPU 90 then computes a relative angle θ c of the drive shaft 22 to the crankshaft 56 by the equation θc=θe−θd at step S174.

The program proceeds to step S176, at which the control CPU 90 reads the clutch motor currents Iuc and Ivc, which respectively flow through the U phase and V phase of the three-phase coils 36 in the clutch motor 30 and are measured by the ammeters 95 and 96. Although the currents naturally flow through all the three phases U, V, and W, measurement is required only for the currents passing through the two phases since the sum of the currents is equal to zero. At subsequent step S178, the control CPU 90 executes transformation of coordinates (three-phase to two-phase transformation) using the values of currents flowing through the three phases obtained at step S176. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and subsequently determines voltage command values Vdc and Vqc with respect to the d and q axes at step S180. In accordance with a concrete procedure, the control CPU 90 executes operations of Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

Each voltage command value Vdc (vqc) includes a part in proportion to the deviation Δ I from the current command value I* (first term in right side of Equation (3)) and a summation of historical data of the deviations Δ I for 'i' times (second term in right side). The control CPU 90 then re-transforms the coordinates of the voltage command values thus obtained (two-phase to three-phase transformation) at step S182. This corresponds to an inverse of the transformation executed at step S178. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (4)$$

$$Vwc = -Vuc - Vvc$$

The actual voltage control is accomplished by on-off operation of the transistors Tr1 through Tr6 in the first driving circuit 91. At step S184, the on- and off-time of the transistors Tr1 through Tr6 in the first driving circuit 91 is PWM (pulse width modulation) controlled in order to attain the voltage command values Vuc, Vvc, and Vwc determined by Equations (4) above.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne−Nd) is positive, the clutch motor 30 is controlled to carry out the regenerative operation and produce a regenerative current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the revolving magnetic field generated by the currents flowing through the three-phase coils 36 mounted on the inner rotor 34 of the clutch motor 30. The identical switching control is executed for both the regenerative operation and the power operation of the clutch motor 30 as long as the sign of the torque command value Tc* is not changed. The clutch motor control routine of FIG. 9 is thus applicable to both the regenerative operation and the power operation. Under the condition of braking the drive shaft 22 or moving the vehicle in reverse, the torque command value Tc* has the negative sign. The clutch motor control routine of FIG. 9 is also applicable to the control procedure under such conditions, when the relative angle θc is varied in the reverse direction at step S174.

Figure 10:
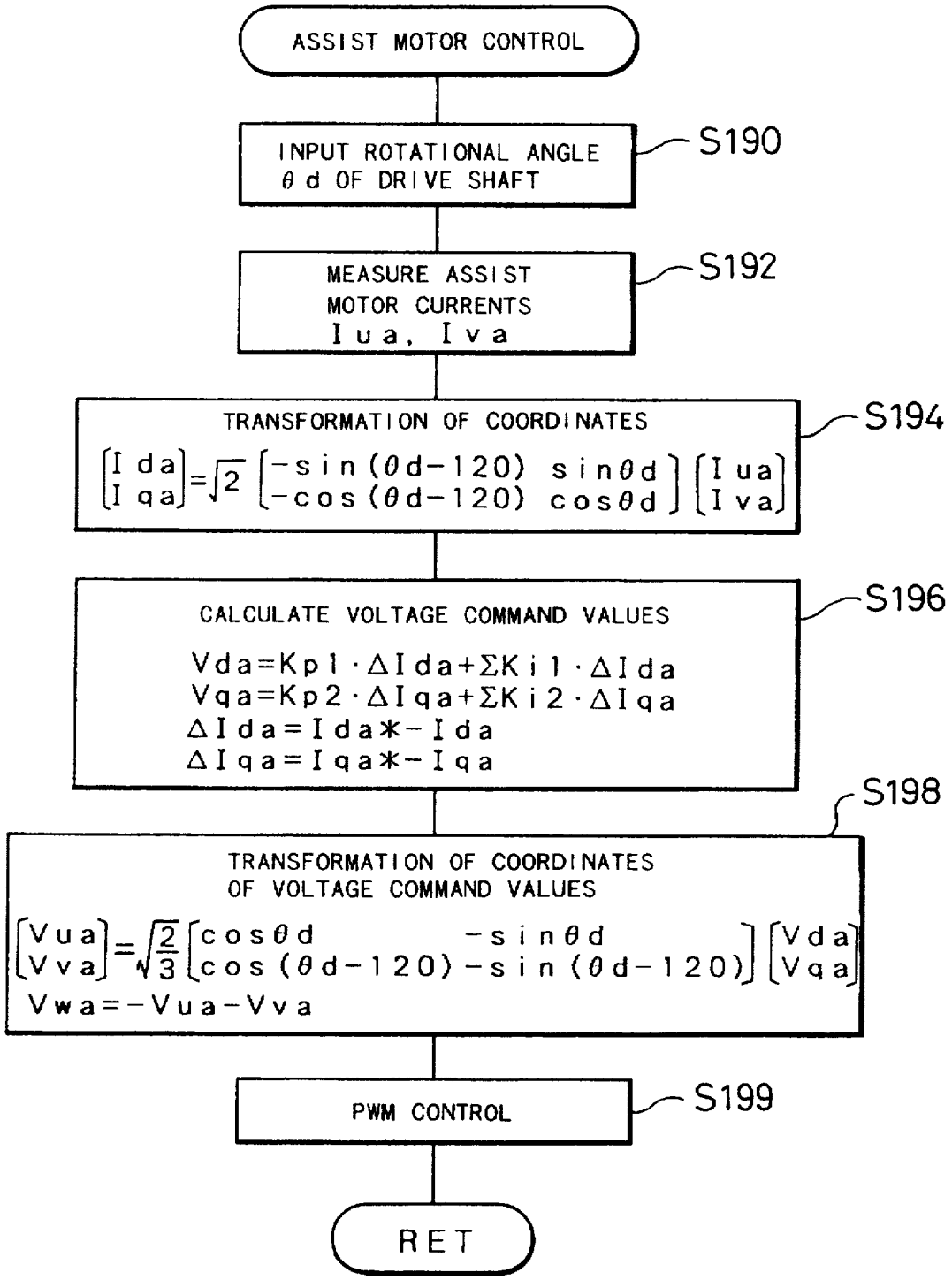
FIG. 10 is a flowchart showing a fundamental control routine of the assist motor 40 executed at step S162 in the flowchart of FIG. 8 by the controller 80.

FIG. 10 is a flowchart showing details of the torque control process of the assist motor 40 executed at step S162 in the flowchart of FIG. 8. When the program enters the assist motor control routine, the control CPU 90 first reads the rotational angle θd of the drive shaft 22 from the resolver 48 at step S190, and receives data of assist motor currents Iua and Iva at step S192, which respectively flow through the U phase and V phase of the three-phase coils 44 in the assist motor 40 and are measured by the ammeters 97 and 98. The control CPU 90 then executes transformation of coordinates for the currents of the three phases at step S194, computes voltage command values Vda and Vqa at step S196, and executes inverse transformation of coordinates for the voltage command values at step S198. At subsequent step S199, the control CPU 90 determines the on- and off-time of the transistors Tr11 through Tr16 in the second driving circuit 92 for PWM (pulse width modulation) control. The processing executed at steps S194 through S199 is similar to that executed at steps S178 through S184 of the clutch motor control routine shown in the flowchart of FIG. 9.

As discussed above, the torque command value Ta* of the assist motor 40 is obtained by subtracting the torque command value Tc* of the clutch motor 30 from the output torque command value Td* at step S154 in the flowchart of FIG. 8. On the assumption that the drive shaft 22 rotates in the direction of rotation of the crankshaft 56, when the torque command value Tc* is smaller than the output torque command value Td*, a positive value is set to the torque command value Ta* for the power operation. When the torque command value Tc* is greater than the output torque command value Td*, on the contrary, a negative value is set to the torque command value Ta* for the regenerative operation. Like the power operation and the regenerative operation of the clutch motor 30, the assist motor control routine of FIG. 10 is applicable to both the power operation and the regenerative operation of the assist motor 40. This is also true when the drive shaft 22 rotates in reverse of the rotation of the crankshaft 56. The torque command value Ta* of the assist motor 40 is positive when a positive torque is applied to the drive shaft 22 in the direction of rotation of the crankshaft 56.

The control of the engine 50 (step S164 in the flowchart of FIG. 8) is executed in the following manner. In order to attain stationary driving at a specific driving point defined by the target engine torque Te* and the target engine speed Ne* (set at step S150 in FIG. 8), the control CPU 90 regulates the torque Te and the revolving speed Ne of the engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the engine 50 gradually approach the target engine torque Te* and the target engine speed Ne*.

The processing discussed above enables the output energy Pd of the engine 50 to be converted by the clutch motor 30 and the assist motor 40 and eventually given to the drive shaft 22. The acting state of the torque applied by the clutch motor 30 and the assist motor 40 as well as the state of torque conversion is described below under the opposite conditions, that is, when the target revolving speed Ne* of the engine 50 is set to be greater than the revolving speed Nd of the drive shaft 22 and when the target engine speed Ne* is set to be less than the revolving speed Nd.

Figure 11:
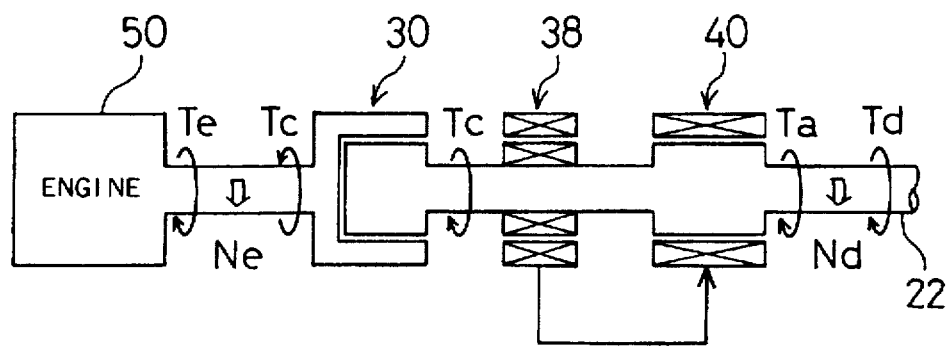
FIG. 11 illustrates the acting state of torque when the revolving speed Ne is greater than the revolving speed Nd in the process with neither charging nor discharging the battery 94.
Figure 12:
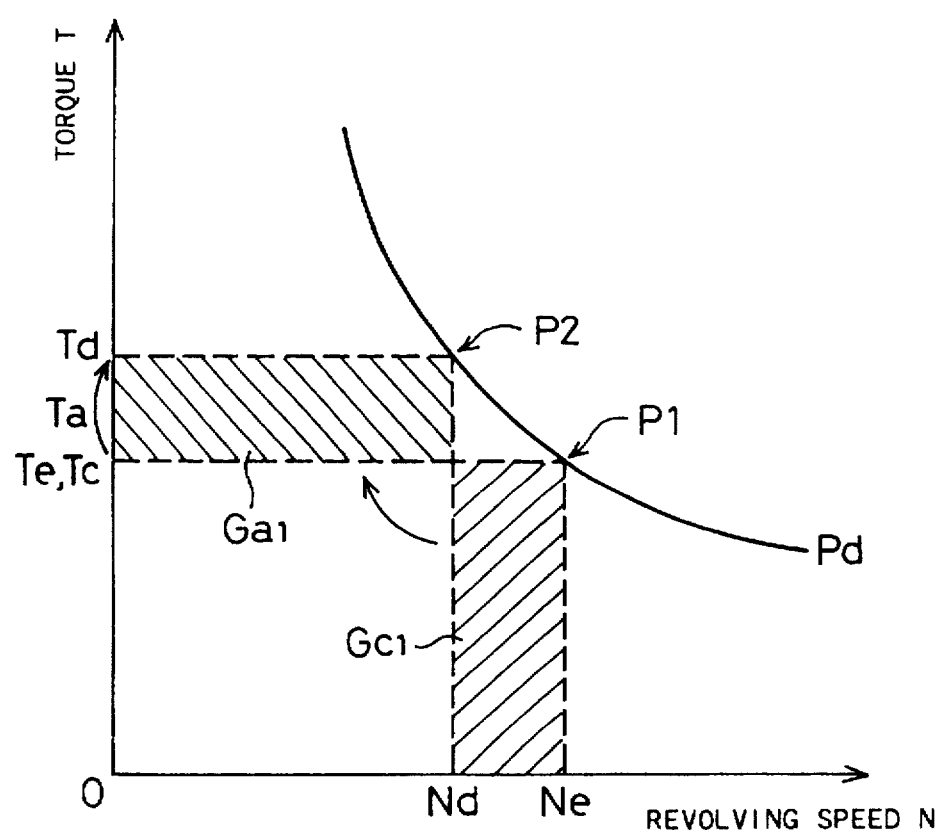
FIG. 12 is a graph showing the state of torque conversion under the condition of FIG. 11.

When the target revolving speed Ne* of the engine 50 is set to be greater than the revolving speed Nd of the drive shaft 22, the torque of the clutch motor 30 and the assist motor 40 under a stationary driving condition act in the manner shown in FIG. 11, where the revolving speed Ne of the engine 50 is greater than the revolving speed Nd of the drive shaft 22. FIG. 12 shows the state of torque conversion under such conditions. Referring to FIG. 12, there exists a positive revolving speed difference Nc (=Ne−Nd) between the revolving speed Ne of the engine 50 and the revolving speed Nd of the drive shaft 22 in this state. The transistors Tr1 through Tr6 in the first driving circuit 91 are accordingly controlled and switched on and off, in order to make the torque Tc of the clutch motor 30 act as the torque Te of the engine 50 and allow the torque Te of the engine 50 to be transmitted to the drive shaft 22. This enables the clutch motor 30 to carry out the regenerative operation and regenerate energy of an area Gc1 corresponding to the revolving speed difference Nc. There also exists a positive difference defined as a positive torque Ta between the output torque Td and the torque Tc of the clutch motor 30. The transistors Tr11 through Tr16 in the second driving circuit 92 are accordingly controlled and switched on and off, in order to allow the assist motor 40 to be driven at the torque Ta. This enables energy of an area Ga1 corresponding to the torque Ta to be supplied to the drive shaft 22. The output torque Td, which is the sum of the torque Ta applied by the assist motor 40 and the torque Tc transmitted from the clutch motor 30, thus acts on the drive shaft 22.

A driving point P1 (torque Te and revolving speed Ne) of the engine 50 and a driving point P2 (output torque Td and revolving speed Nd) of the drive shaft 22 exist on an identical energy curve (Pd=constant). The energy of the area Gc1 is hence identical with the energy of the area Ga1. The energy of the area Gc1 regenerated by the clutch motor 30 is supplied to the assist motor 40 and eventually given to the drive shaft 22 by the assist motor 40 as the energy of the area Ga1. This means that the energy expressed by the product of the torque Te and the revolving speed Ne of the engine 50 (that is, the energy of the driving point P1) is converted to the energy expressed by the product of the output torque Td and the revolving speed Nd (that is, the energy of the driving point P2) and transmitted to the drive shaft 22.

In the embodiment, the torque command value Ta* is computed by subtracting the torque command value Tc* from the output torque command value Td* at step S154 in the flowchart of FIG. 8. This calculation is effective only on the assumption that an efficiency Ksc of the regenerative operation of the clutch motor 30 is equal to 100%. In the actual state, however, the efficiency Ksc is generally lower than 100% and the energy regenerated by the clutch motor 30 is consequently less than the energy of the area Gc1. When the energy of the area Ga1 is to be supplied to the drive shaft 22 by the assist motor 40, the energy regenerated by the clutch motor 30 thus does not fulfill the requirement sufficiently. The electric power stored in the battery 94 is then used to supplement the insufficient energy. In order to prevent discharge of the battery 94, the torque command value Ta* of the assist motor 40 should be calculated by dividing an energy Pc1 (Pc1=Ksc×Tc×Nc) regenerated by the clutch motor 30 by the revolving speed Nd as expressed by Equation (5) given below. When the torque command value Ta* of the assist motor 40 is determined in this manner, the energy given to the drive shaft 22 by the assist motor 40 becomes identical with the energy regenerated by the clutch motor 30, that is, the product of the energy of the area Gc1 and the efficiency Ksc. In this state, the energy actually supplied by the assist motor 40 to the drive shaft 22 is a little less than the energy of the area Ga1 shown in FIG. 12, and the actual output torque Td accordingly becomes a little smaller than the value shown in FIG. 12.

$$Ta^* = Pc1/Nd \qquad (5)$$

Figure 13:
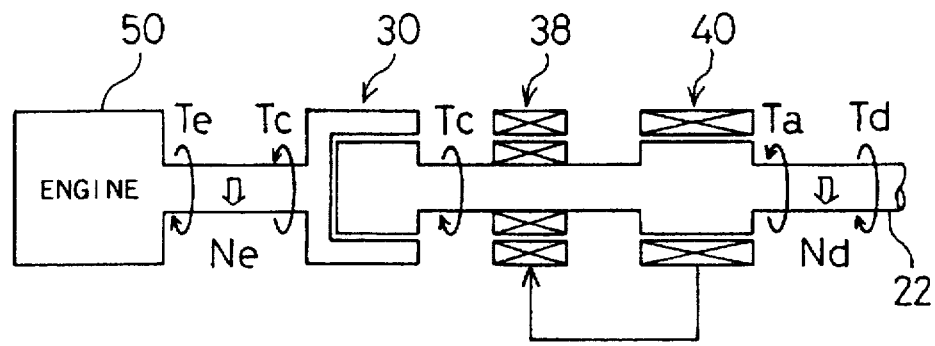
FIG. 13 illustrates the acting state of torque when the revolving speed Ne is less than the revolving speed Nd in the process with neither charging nor discharging the battery 94.
Figure 14:
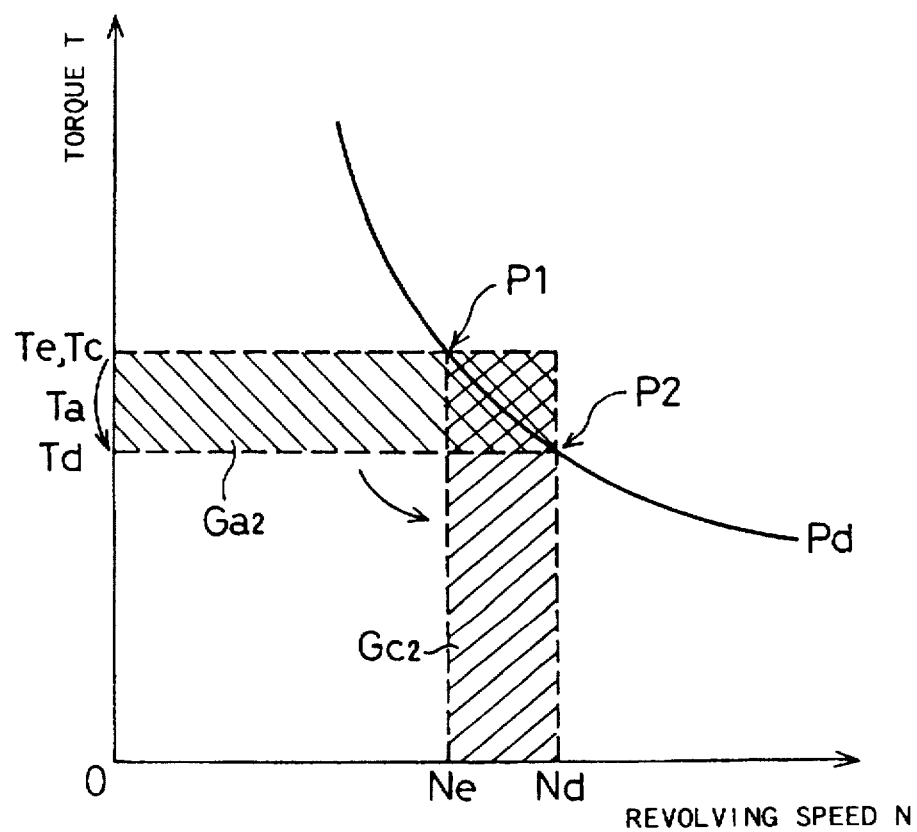
FIG. 14 is a graph showing the state of torque conversion under the condition of FIG. 13.

When the target revolving speed Ne* of the engine 50 is set to be less than the revolving speed Nd of the drive shaft 22, on the other hand, the torque of the clutch motor 30 and the assist motor 40 under a stationary driving condition act in the manner shown in FIG. 13, where the revolving speed Ne of the engine 50 is lower than the revolving speed Nd of the drive shaft 22. FIG. 14 shows the state of torque conversion under such conditions. Referring to FIG. 14, there exists a negative revolving speed difference Nc (=Ne−Nd) between the revolving speed Ne of the engine 50 and the revolving speed Nd of the drive shaft 22 in this state. The clutch motor 30 accordingly carries out the power operation to rotate relative to the crankshaft 56 in the direction of rotation of the engine 50 at a revolving speed defined by the absolute value of the revolving speed difference Nc, and supplies energy of an area Gc2 corresponding to the revolving speed difference Nc to the drive shaft 22. There also exists a negative difference defined by a negative torque Ta between the output torque Td and the torque Tc of the clutch motor 30. The transistors Tr11 through Tr16 in the second driving circuit 92 are accordingly controlled and switched on and off, in order to allow the assist motor 40 to be driven at the torque Ta. This enables the assist motor 40 to carry out the regenerative operation and regenerate energy of an area Ga2 corresponding to the torque Ta.

A driving point P1 (torque Te and revolving speed Ne) of the engine 50 and a driving point P2 (output torque Td and revolving speed Nd) of the drive shaft 22 exist on an identical energy curve (Pd=constant). The energy of the area Gc2 is hence identical with the energy of the area Ga2. The energy of the area Gc2 to be given by the clutch motor 30 to the drive shaft 22 can thus be supplied by the energy of the area Ga2 regenerated by the assist motor 40. Under such conditions, the energy expressed by the product of the torque Te and the revolving speed Ne of the engine 50 (that is, the energy of the driving point P1) is also converted to the energy expressed by the product of the output torque Td and the revolving speed Nd (that is, the energy of the driving point P2) and transmitted to the drive shaft 22.

As discussed above, the torque command value Ta* is computed by subtracting the torque command value TC* from the output torque command value Td* at step S154 in the flowchart of FIG. 8 in the embodiment. This calculation is effective only on the assumption that an efficiency Ksa of the regenerative operation of the assist motor 40 is equal to 100%. In the actual state, however, the efficiency Ksa is generally lower than 100% and the energy regenerated by the assist motor 40 is consequently less than the energy of the area Ga2. When the energy of the area Gc2 is to be supplied to the drive shaft 22 by the clutch motor 30, the energy regenerated by the assist motor 40 thus does not fulfill the requirement sufficiently. The electric power stored in the battery 94 is then used to supplement the insufficient energy. In order to prevent discharge of the battery 94, the torque command value Ta* of the assist motor 40 should be calculated by dividing an energy Pc2 (Pc2=Tc×Nc) of the area Gc2 consumed by the clutch motor 30 by the revolving speed Nd and the efficiency Ksa as expressed by Equation (6) given below. When the torque command value Ta* of the assist motor 40 is determined in this manner, the energy regenerated by the assist motor 40 becomes identical with the energy of the area Gc2 given to the drive shaft 22 by the clutch motor 30. In this state, the energy actually regenerated by the assist motor 40 is a little greater than the energy of the area Ga2 shown in FIG. 14, and the actual output torque Td accordingly becomes a little smaller than the value shown in FIG. 14.

$$Ta^* = Pc2/Nd/Ksa \qquad (6)$$

Figure 15:
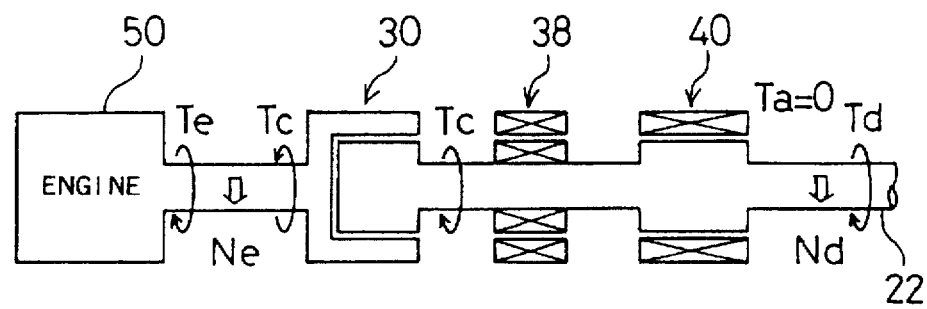
FIG. 15 illustrates the acting state of torque when the revolving speed Ne is equal to the revolving speed Nd in the process with neither charging nor discharging the battery 94.
Figure 16:
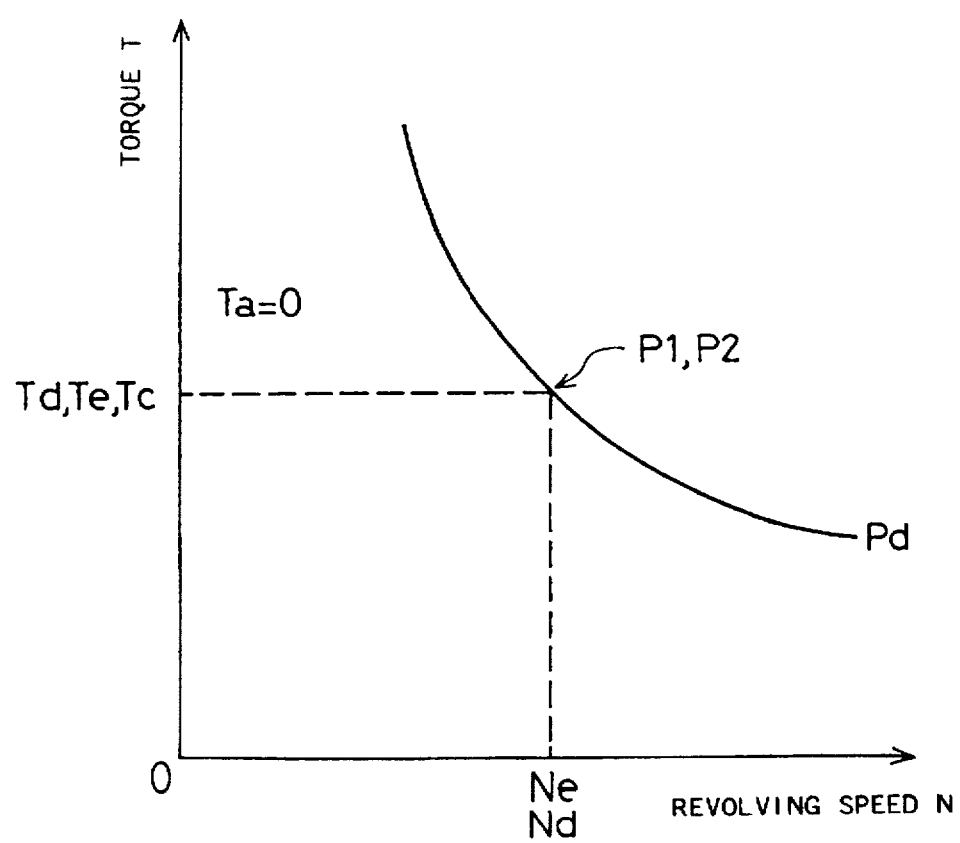
FIG. 16 is a graph showing the state of torque conversion under the condition of FIG. 15.

The target revolving speed Ne* of the engine 50 temporarily becomes coincident with the revolving speed Nd of the drive shaft 22 in the process of varying the target revolving speed Ne* from the value less than the revolving speed Nd to the value greater than the revolving speed Nd or alternatively from the value greater than the revolving speed Nd to the value less than the revolving speed Nd. When the target engine speed Ne* temporarily becomes coincides with the revolving speed Nd, the torque of the clutch motor 30 and the assist motor 40 act in the manner shown in FIG. 15, where the revolving speed Ne of the engine 50 is identical with the revolving speed Nd of the drive shaft 22. FIG. 16 shows the state of torque conversion under such conditions. In this case, since a driving point P1 (torque Te and revolving speed Ne) of the engine 50 coincides with a driving point P2 (output torque Td and revolving speed Nd) of the drive shaft 22, the torque Te and the revolving speed Ne of the engine 50 can be transmitted directly to the drive shaft 22. The torque Tc of the clutch motor 30 accordingly acts as the torque Te of the engine 50, while the torque Ta of the assist motor 40 is equal to zero. This represents the state as if the crankshaft 56 were mechanically linked with the drive shaft 22 via the clutch motor 30. Under this condition, the clutch motor 30 is controlled to make a constant current computed by an operation flow through the three-phase coils 36, whereas the assist motor 40 is controlled to switch off all the transistors Tr11 through Tr16 in the second driving circuit 92.

(2) Process of Charging the Battery 94

The following describes the processing executed when it is determined that the remaining charge BRM of the battery 94 is equal to or less than the threshold value BL1 at step S122 in the flowchart of FIG. 7 (that is, the process of charging the battery 94). When the remaining charge BRM of the battery 94 is determined to be not greater than the threshold value BL1, the program proceeds to step S126, at which the remaining charge BRM of the battery 94 is compared with the threshold value BL2. When the remaining charge BRM is equal to or less than the threshold value BL2, the program determines that charging the battery 94 is required and proceeds to step S130. When the remaining charge BRM is greater than the threshold value BL2, on the other hand, the program checks the value of the charging execution flag Fbi at step S128. When the charging execution flag Fbi is equal to zero, the program determines that charging the battery 94 is not required at this moment and proceeds to step S124 to execute the process with neither charging nor discharging the battery 94 as discussed above. When the charging execution flag Fbi is equal to one, on the contrary, the program determines that the battery 94 is now being charged and the charging procedure has not been completed yet and proceeds to step S130. As discussed above, the two threshold values BL1 and BL2 are set to be compared with the remaining charge BRM of the battery 94 as the criterion of determining whether charging the battery 94 is required. This effectively prevents frequent start and stop of the process of charging the battery 94.

Figure 17:
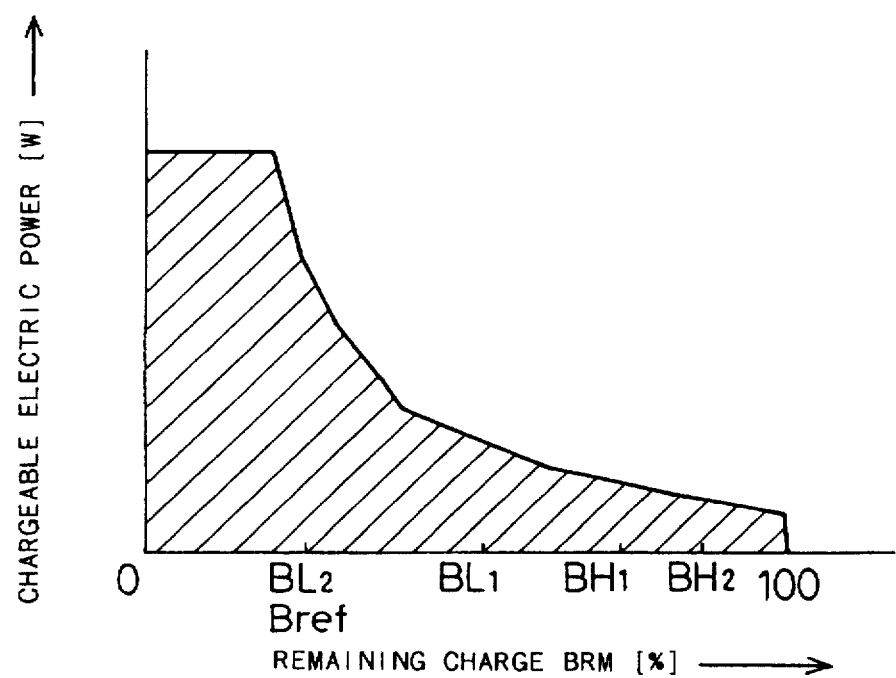
FIG. 17 is a graph showing the chargeable electric power plotted against the remaining charge BRM of the battery 94.

At step S130, the control CPU 90 sets a charging energy Pbi based on the remaining charge BRM of the battery 94, since the chargeable electric power (energy) of the battery 94 as well as appropriate charging voltage and current vary with a variation in remaining charge BRM. FIG. 17 is a graph showing the chargeable electric power plotted against the remaining charge BRM of the battery 94. In the embodiment, appropriate values of charging energy Pbi are determined experimentally or otherwise for the respective values of remaining charge BRM of the battery 94 and stored in advance as a map (not shown) in the ROM 90b. In accordance with a concrete procedure, at step S130, the charging energy Pbi corresponding to the remaining charge BRM of the battery 94 input at step S120 is read from the map stored in the ROM 90b.

After specifying the charging energy Pbi, the control CPU 90 adds the selected charging energy Pbi to the output energy Pd to set a new value of output energy Pd at step S132. It is then determined at step S134 whether the newly set output energy Pd exceeds a maximum energy Pemax which can be output from the engine 50. When Pd exceeds Pemax, the control CPU 90 restricts the output energy Pd to the maximum energy Pemax at step S136 and sets the charging execution flag Fbi equal to one at step S138 before carrying out the processing of steps S150 through S164 in the flowchart of FIG. 8. In this case, at step S150 in FIG. 8, the target torque Te* and the target revolving speed Ne* of the engine 50 are determined with the output energy Pd set by the processing of steps S132 through S136.

The processing discussed above enables the residual energy obtained by subtracting the charging energy Pbi from the output energy Pd of the engine 50 to be converted by the clutch motor 30 and the assist motor 40 and eventually supplied to the drive shaft 22, while the battery 94 is charged with the charging energy Pbi. The acting state of the torque applied by the clutch motor 30 and the assist motor 40 and the charging state of the battery 94 as well as the state of torque conversion is described below under the opposite conditions, that is, when the target revolving speed Ne* of the engine 50 is set to be greater than the revolving speed Nd of the drive shaft 22 and when the target engine speed Ne* is set to be less than the revolving speed Nd.

Figure 18:
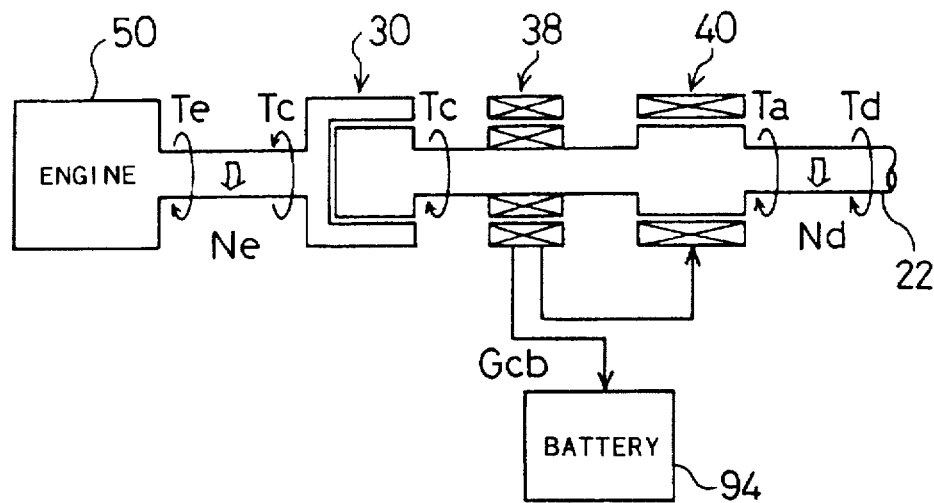
FIG. 18 illustrates the acting state of torque and the charging state of the battery 94 when the revolving speed Ne is greater than the revolving speed Nd.
Figure 19:
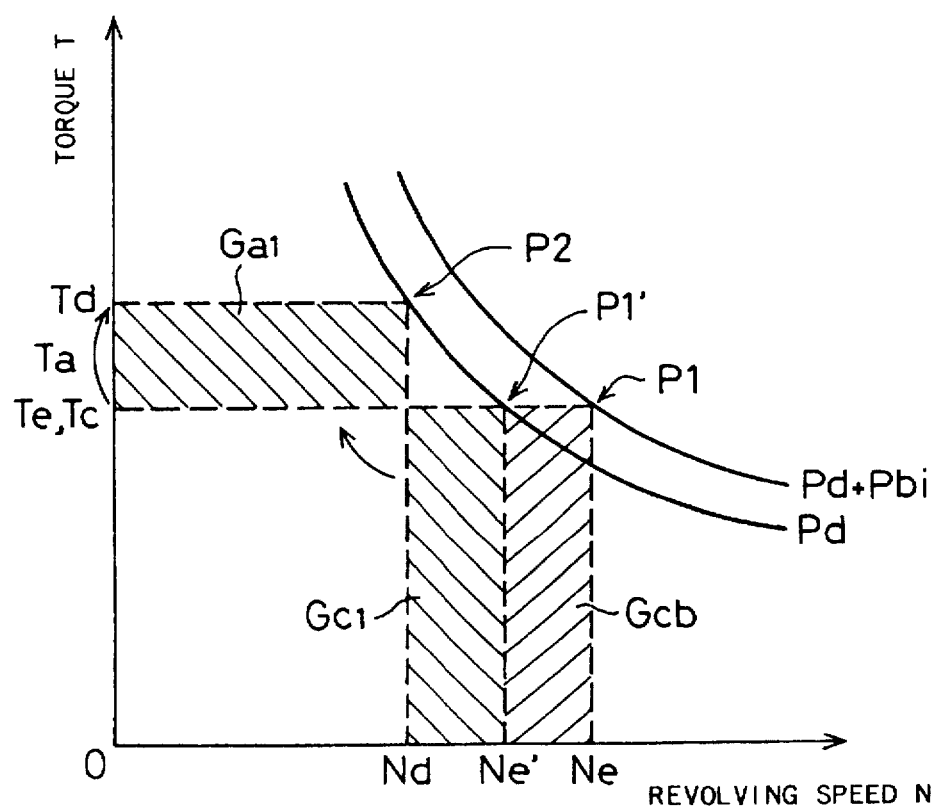
FIG. 19 is a graph showing the state of torque conversion under the condition of FIG. 18.

When the target revolving speed Ne* of the engine 50 is set to be greater than the revolving speed Nd of the drive shaft 22, the battery 94 is charged while the torque of the clutch motor 30 and the assist motor 40 under a stationary driving condition act in the manner shown in FIG. 18, where the revolving speed Ne of the engine 50 is greater than the revolving speed Nd of the drive shaft 22. FIG. 19 shows the state of torque conversion under such conditions. It is assumed that the output energy Pd is set at step S106 in the flowchart of FIG. 5 and not updated by adding the charging energy Pbi. Referring to FIG. 19, the engine 50 is driven at a driving point P1' (torque Te and revolving speed Ne') upon this assumption. Like the state shown in FIGS. 11 and 12 discussed above, energy is converted from the driving point P1' of the engine 50 to a driving point P2 of the drive shaft 22, wherein the driving points P1' and P2 exist on an identical energy curve (Pd=constant). Energy of an area Gc1 is thus regenerated by the clutch motor 30, supplied to the assist motor 40, and eventually given by the assist motor 40 to the drive shaft 22 as energy of an area Ga1.

In the actual control procedure, however, the output energy Pd is updated at step S132 in the flowchart of FIG. 7 by adding the charging energy Pbi to the output energy Pd set at step S106 in the flowchart of FIG. 5. The engine 50 is accordingly driven at a driving point P1 having a revolving speed Ne greater than the revolving speed Ne', and the clutch motor 30 carries out the regenerative operation to regenerate energy defined by the sum of the area Gc1 and another area Gcb. Since the drive shaft 22 is driven at the driving point P2, the required amount of energy to be given by the assist motor 40 to the drive shaft 22 is equal to energy of an area Ga1, as discussed in the state of FIG. 12. The energy of the area Ga1 can be supplied by the energy of the area Gc1 among the whole energy regenerated by the clutch motor 30. This leaves the energy of the area Gcb non-required by the assist motor 40, and the battery 94 is thus charged with the energy of the area Gcb.

The energy of the area Gcb is identical with the charging energy Pbi when the efficiency Ksc of the regenerative operation of the clutch motor 30 is assumed to be 100%. In the actual state, however, the efficiency Ksc is lower than 100% and the energy of the area Ga1 is determined by multiplying the energy of the area Gc1 by the efficiency Ksc as discussed previously. The energy of the area Gcb is obtained by multiplying the charging energy Pbi by the efficiency Ksc and is thus smaller than the charging energy Pbi. The concrete procedure of determining the energy of the area Ga1 by multiplying the energy of the area Gc1 by the efficiency Ksc and supplying the energy of the area Ga1 to the drive shaft 22 via the assist motor 40 has already been described with Equation (5) given above. The control by taking into account the efficiency Ksc of the regenerative operation of the clutch motor 30 is also applicable to the description below and is thus not specifically referred to.

Figure 20:
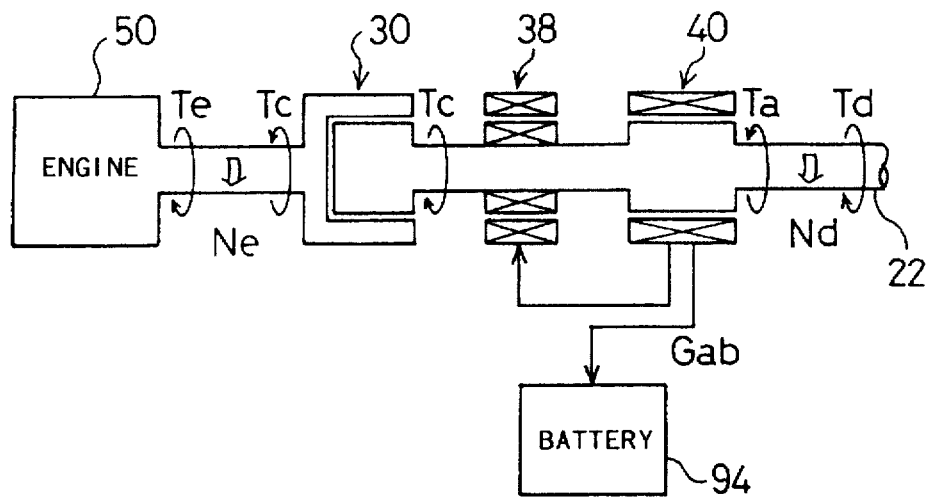
FIG. 20 illustrates the acting state of torque and the charging state of the battery 94 when the revolving speed Ne is less than the revolving speed Nd.
Figure 21:
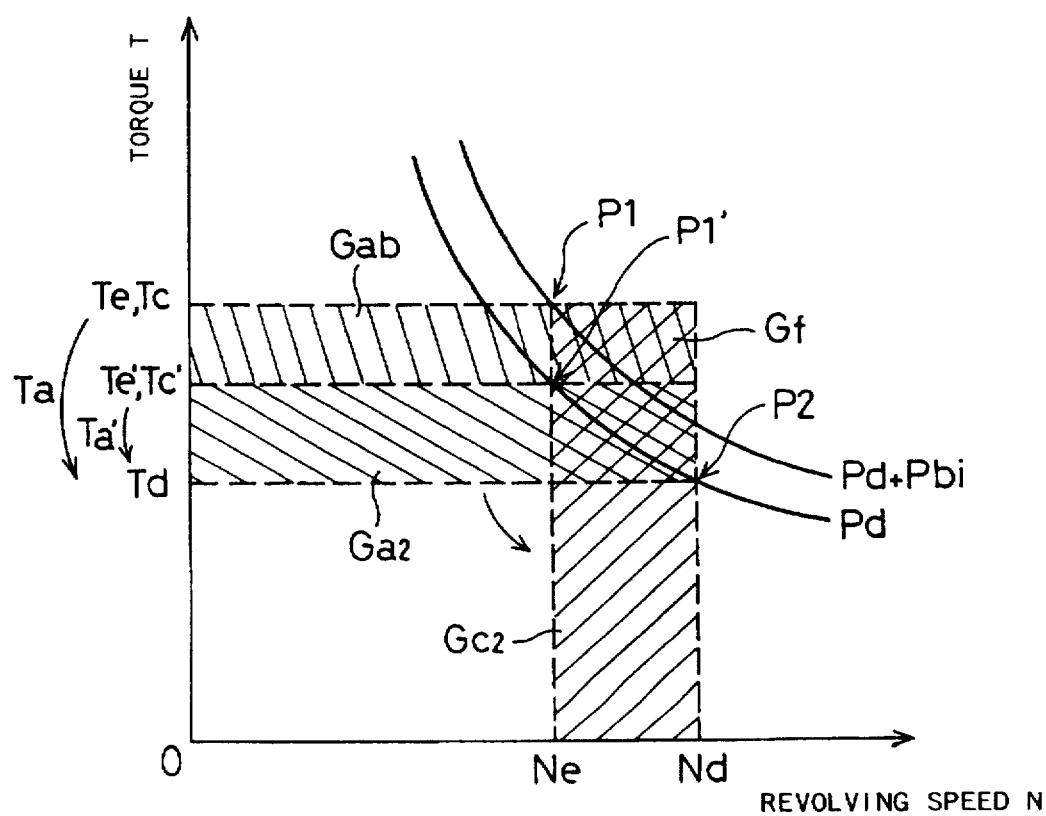
FIG. 21 is a graph showing the state of torque conversion under the condition of FIG. 20.

When the target revolving speed Ne* of the engine 50 is set to be less than the revolving speed Nd of the drive shaft 22, the battery 94 is charged while the torque of the clutch motor 30 and the assist motor 40 under a stationary driving condition act in the manner shown in FIG. 20, where the revolving speed Ne of the engine 50 is lower than the revolving speed Nd of the drive shaft 22. FIG. 21 shows the state of torque conversion under such conditions. It is assumed that the output energy Pd is set at step S106 in the flowchart of FIG. 5 and not updated by adding the charging energy Pbi. Referring to FIG. 21, the engine 50 is driven at a driving point P1' (torque Te' and revolving speed Ne) upon this assumption. Like the state shown in FIGS. 13 and 14 discussed above, energy is converted from the driving point P1' of the engine 50 to a driving point P2 of the drive shaft 22, wherein the driving points P1' and P2 exist on an identical energy curve (Pd=constant). Energy of an area Gc2 to be given by the clutch motor 30 to the drive shaft 22 is thus supplied by energy of an area Ga2 regenerated by the assist motor 40.

In the actual control procedure, however, the output energy Pd is updated by adding the charging energy Pbi to the output energy Pd set at step S106 of FIG. 5. The engine 50 is accordingly driven at a driving point P1 having a torque Te greater than the torque Te', and the assist motor 40 carries out the regenerative operation to regenerate energy defined by the sum of the area Ga2 and other areas Gab and Gf. The required amount of energy to be given by the clutch motor 30 to the drive shaft 22 is equal to the sum of the energy of the area Gc2, as discussed in the state of FIG. 14, and the energy of the area Gf, which is required because the engine 50 is driven at the torque Te. The energy of the area Gc2 can be supplied by the energy of the area Ga2 among the whole energy regenerated by the assist motor 40. This leaves the energy of the area Gab non-required by the clutch motor 30, and the battery 94 is thus charged with the energy of the area Gab.

The energy of the area Gab is identical with the charging energy Pbi when the efficiency Ksa of the regenerative operation of the assist motor 40 is assumed to be 100%. In the actual state, however, the efficiency Ksa is lower than 100% and the energy of the area Ga2 is determined by dividing the energy of the area Gc2 by the efficiency Ksa. The energy of the area Gab is obtained by subtracting the energy computed by the expression (Ga2/Ksa–Ga2) from the charging energy Pbi and is thus smaller than the charging energy Pbi. The control by taking into account the efficiency Ksa of the regenerative operation of the assist motor 40 is also applicable to the description below and is thus not specifically referred to.

The transient states exist in the process of charging the battery 94, other than the two states discussed above (that is, when the target revolving speed Ne* of the engine 50 is set to be greater than the revolving speed Nd of the drive shaft 22 and when the target revolving speed Ne* is set to be less than the revolving speed Nd). The transient states include the state when the target revolving speed Ne* is temporarily set to be greater than the revolving speed Nd while the target torque Te* is set to coincide with the output torque command value Td*, that when the target revolving speed Ne* is set to be greater than the revolving speed Nd while the target torque Te* is set to be greater than the output torque command value Td*, and that when the target revolving speed Ne* is set to be coincident with the revolving speed Nd. The following briefly describes these three transient states.

Figure 22:
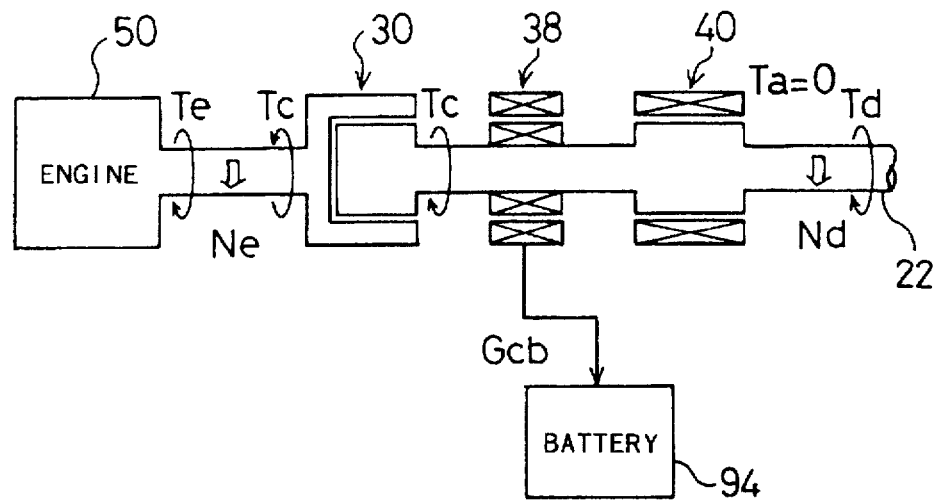
FIG. 22 illustrates the acting state of torque and the charging state of the battery 94 when the revolving speed Ne is greater than the revolving speed Nd and the torque Te is equal to the output torque Td.
Figure 23:
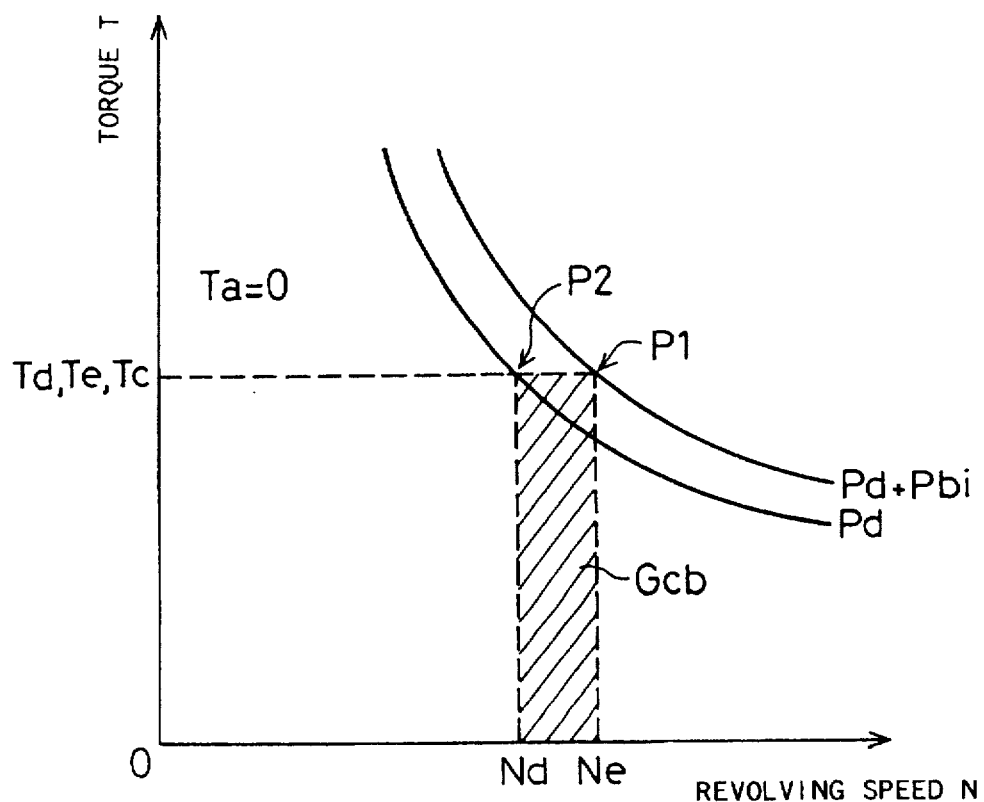
FIG. 23 is a graph showing the state of torque conversion under the condition of FIG. 22.

When the target revolving speed Ne* of the engine 50 is set to be greater than the revolving speed Nd of the drive shaft 22 and the target torque Te* of the engine 50 is set to coincide with the output torque command value Td*, the battery 94 is charged while the torque of the clutch motor 30 and the assist motor 40 act in the manner shown in FIG. 22, where the revolving speed Ne of the engine 50 is greater than the revolving speed Nd of the drive shaft 22 and the torque Te of the engine 50 coincides with the output torque Td. FIG. 23 shows the state of torque conversion under such conditions. In this case, since the torque Te of the engine 50 coincides with the output torque Td of the drive shaft 22 as shown in FIG. 23, the first driving circuit 91 is controlled to make the torque Tc of the clutch motor 30 identical with the torque Te of the engine 50 and to enable the torque Te of the engine 50 to be transmitted to the drive shaft 22, whereas the torque Ta of the assist motor 40 is equal to zero. There is a positive revolving speed difference Nc (=Ne–Nd) between the revolving speed Ne of the engine 50 and the revolving speed Nd of the drive shaft. Such control enables the clutch motor 30 to carry out the regenerative operation and regenerate energy of an area Gcb corresponding to the revolving speed difference Nc. The battery 94 is thus charged with the energy of the area Gcb regenerated by the clutch motor 30. The control procedure of the assist motor 40 under the condition that the torque Ta is equal to zero is identical with that executed in the state of FIGS. 15 and 16 without charging or discharging the battery 94.

Figure 24:
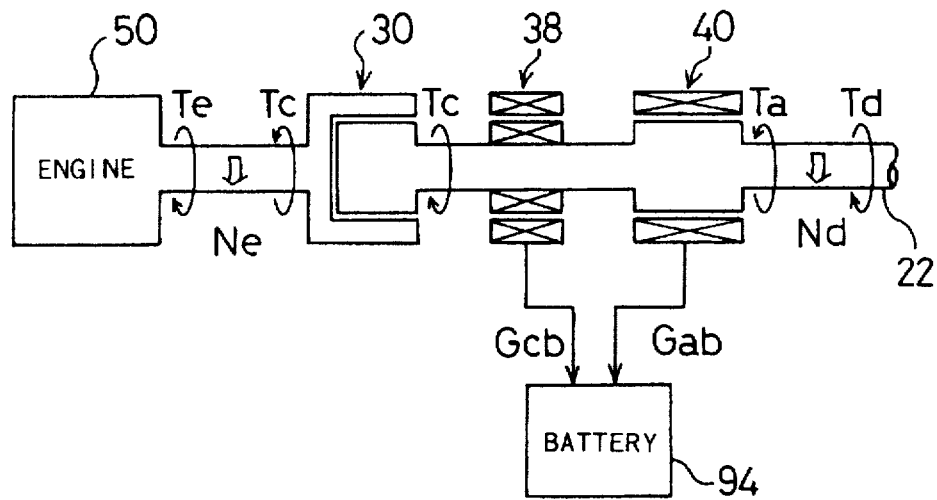
FIG. 24 illustrates the acting state of torque and the charging state of the battery 94 when the revolving speed Ne is greater than the revolving speed Nd and the torque Te is greater than the output torque Td.
Figure 25:
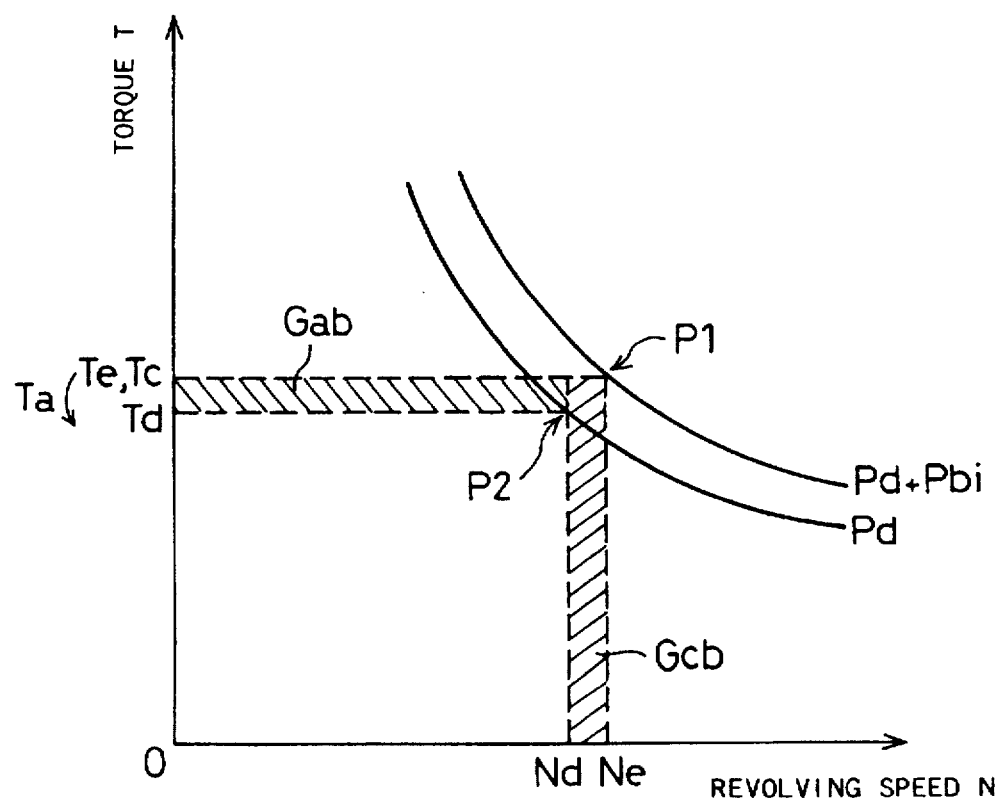
FIG. 25 is a graph showing the state of torque conversion under the condition of FIG. 24.

When the target revolving speed Ne* of the engine 50 is set to be greater than the revolving speed Nd of the drive shaft 22 and the target torque Te* of the engine 50 is also set to be greater than the output torque command value Td*, the battery 94 is charged while the torque of the clutch motor 30 and the assist motor 40 act in the manner shown in FIG. 24, where the revolving speed Ne of the engine 50 is greater than the revolving speed Nd of the drive shaft 22 and the torque Te of the engine 50 is larger than the output torque Td. FIG. 25 shows the state of torque conversion under such conditions. There is a positive revolving speed difference Nc (=Ne–Nd) between the revolving speed Ne of the engine 50 and the revolving speed Nd of the drive shaft 22 as shown in FIG. 25, so that the clutch motor 30 carries out the regenerative operation to regenerate energy of an area Gcb corresponding to the revolving speed difference Nc as shown in FIG. 25. The assist motor 40 is, on the other hand, driven at a negative torque Ta, which is the difference between the output torque Td and the torque Tc of the clutch motor 30, and thereby carries out the regenerative operation to regenerate energy of an area Gab corresponding to the torque Ta. The battery 94 is accordingly charged with the energy of the area Gcb regenerated by the clutch motor 30 and the energy of the area Gab regenerated by the assist motor 40.

Figure 26:
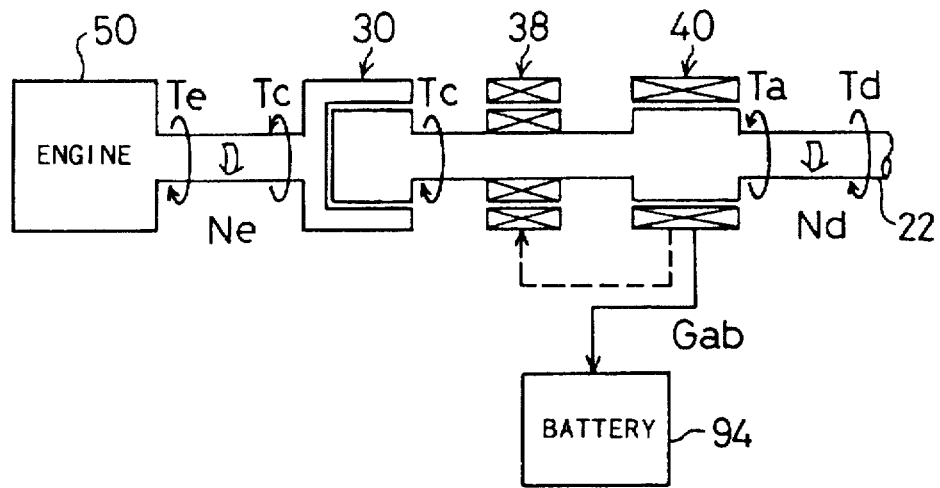
FIG. 26 illustrates the acting state of torque and the charging state of the battery 94 when the revolving speed Ne is equal to the revolving speed Nd.
Figure 27:
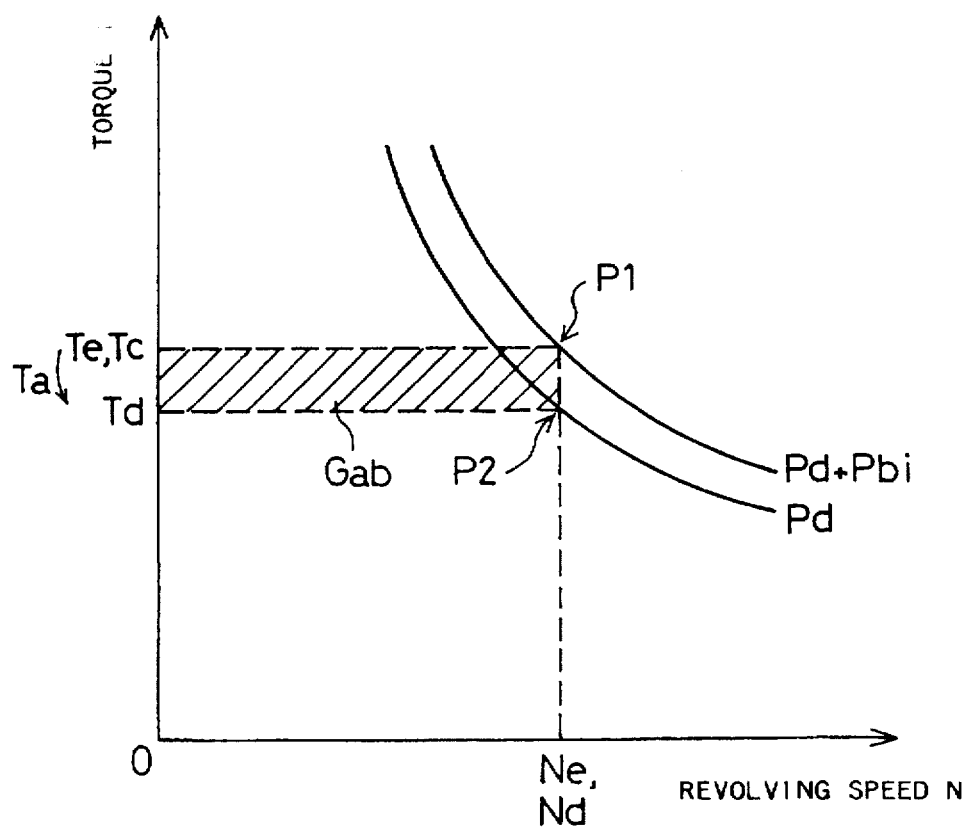
FIG. 27 is a graph showing the state of torque conversion under the condition of FIG. 26.

When the target revolving speed Ne* of the engine 50 is set to coincide with the revolving speed Nd of the drive shaft 22, the battery 94 is charged while the torque of the clutch motor 30 and the assist motor 40 act in the manner shown in FIG. 26, where the revolving speed Ne of the engine 50 is identical with the revolving speed Nd of the drive shaft 22. FIG. 27 shows the state of torque conversion under such conditions. In this case, the revolving speed Ne of the engine 50 coincides with the revolving speed Nd of the drive shaft 22 as shown in FIG. 27, so that the clutch motor 30 transmits the torque Te and the revolving speed Ne of the engine 50 directly to the drive shaft 22. The assist motor 40 is, on the other hand, driven at a negative torque Ta, which is the difference between the output torque Td and the torque Tc of the clutch motor 30, and carries out the regenerative operation to regenerate energy of an area Gab corresponding to the torque Ta. The battery 94 is accordingly charged with the energy of the area Gab regenerated by the assist motor 40. The control procedure of the clutch motor 30 under the condition that the revolving speed Ne of the engine 50 coincides with the revolving speed Nd of the drive shaft 22 is identical with that executed in the state of FIGS. 15 and 16 without charging or discharging the battery 94.

(3) Process of Discharging the Battery 94

The following describes the processing executed when it is determined that the remaining charge BRM of the battery 94 is equal to or greater than the threshold value BH1 at step S122 in the flowchart of FIG. 7 (that is, the process of discharging the battery 94). When the remaining charge BRM of the battery 94 is determined to be not less than the threshold value BH1, the program proceeds to step S140, at which the remaining charge BRM of the battery 94 is compared with the threshold value BH2. When the remaining charge BRM is equal to or greater than the threshold value BH2, the program determines that discharging the battery 94 is required and proceeds to step S144. When the remaining charge BRM is less than the threshold value BH2, on the other hand, the program checks the value of the discharging execution flag Fbo at step S142. When the discharging execution flag Fbo is equal to zero, the program determines that discharging the battery 94 is not required at this moment and proceeds to step S124 to execute the process with neither charging nor discharging the battery 94 as discussed above. When the discharging execution flag Fbo is equal to one, on the contrary, the program determines that the battery 94 is now being discharged and the discharging procedure has not been completed yet and proceeds to step S144. As discussed above, the two threshold values BH1 and BH2 are set to be compared with the remaining charge BRM of the battery 94 as the criterion of determining whether discharging the battery 94 is required. This effectively prevents frequent start and stop of the process of discharging the battery 94.

At step S144, the control CPU 90 sets a discharging energy Pbo based on the remaining charge BRM of the battery 94, since the dischargeable electric power (energy) of the battery 94 may be varied with a variation in remaining charge BRM. In the embodiment, appropriate values of discharging energy Pbo are determined experimentally or otherwise for the respective values of remaining charge BRM of the battery 94 and stored in advance as a map (not shown) in the ROM 90b. In accordance with a concrete procedure, at step S144, the discharging energy Pbo corresponding to the remaining charge BRM of the battery 94 input at step S120 is read from the map stored in the ROM 90b.

After specifying the discharging energy Pbo, the control CPU 90 subtracts the selected discharging energy Pbo from the output energy Pd to set a new value of output energy Pd at step S146, and sets the discharging execution flag Fbo equal to one at step S148 before carrying out the processing of steps S150 through S164 in the flowchart of FIG. 8. In this case, at step S150 in FIG. 8, the target torque Te* and the target revolving speed Ne* of the engine 50 are determined with the output energy Pd set by the processing of step S146.

The processing discussed above enables the total energy obtained by adding the discharging energy Pbo released from the battery 94 to the output energy Pd of the engine 50 to be converted by the clutch motor 30 and the assist motor 40 and eventually supplied to the drive shaft 22. The acting state of the torque applied by the clutch motor 30 and the assist motor 40 and the discharging state of the battery 94 as well as the state of torque conversion is described below under the opposite conditions, that is, when the target revolving speed Ne* of the engine 50 is set to be greater than the revolving speed Nd of the drive shaft 22 and when the target engine speed Ne* is set to be less than the revolving speed Nd.

Figure 28:
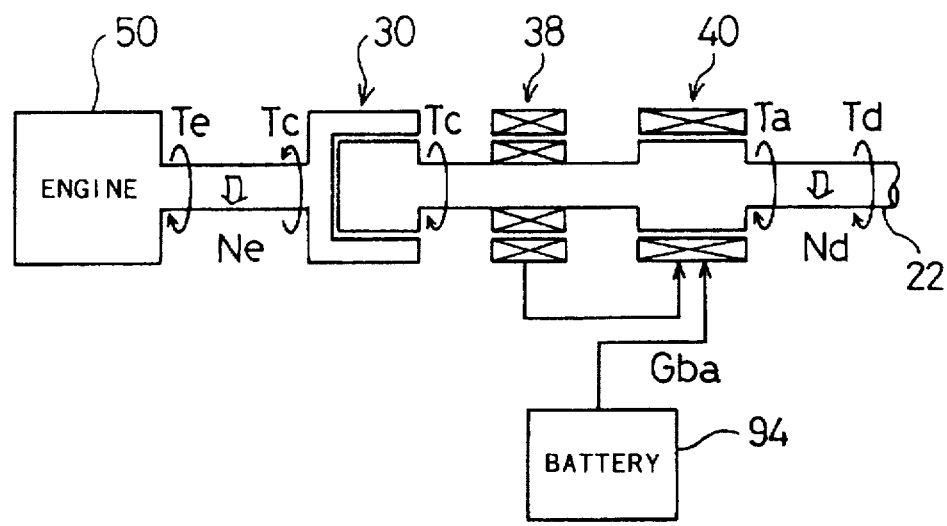
FIG. 28 illustrates the acting state of torque and the discharging state of the battery 94 when the revolving speed Ne is greater than the revolving speed Nd.
Figure 29:
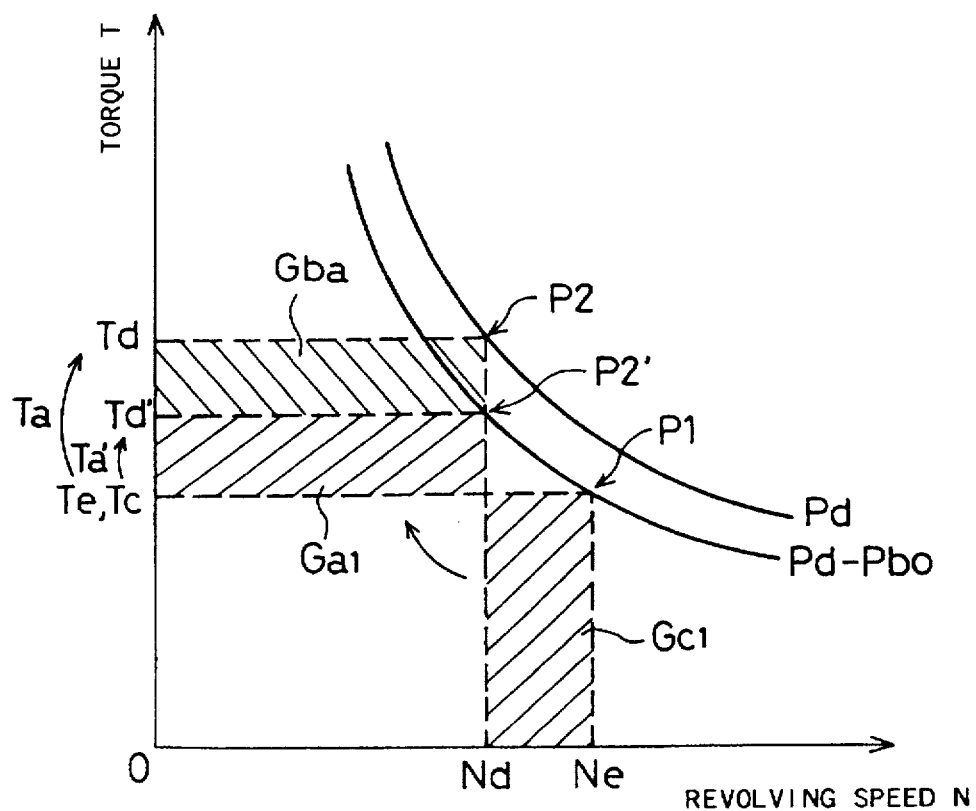
FIG. 29 is a graph showing the state of torque conversion under the condition of FIG. 28.

When the target revolving speed Ne* of the engine 50 is set to be greater than the revolving speed Nd of the drive shaft 22, the battery 94 is discharged while the torque of the clutch motor 30 and the assist motor 40 under a stationary driving condition act in the manner shown in FIG. 28, where the revolving speed Ne of the engine 50 is greater than the revolving speed Nd of the drive shaft 22. FIG. 29 shows the state of torque conversion under such conditions. It is assumed that the output torque Td of the drive shaft 22 is equal to a torque Td'. Referring to FIG. 29, the drive shaft 22 is driven at a driving point P2' (torque Td' and revolving speed Nd) upon this assumption. Like the state shown in FIGS. 11 and 12 discussed above, energy is converted from a driving point P1 of the engine 50 to the driving point P2' of the drive shaft 22, wherein the driving points P1 and P2' exist on an identical energy curve (Pd–Pbo=constant). Energy of an area Gc1 corresponding to a positive revolving speed difference Nc (=Ne–Nd) is thus regenerated by the clutch motor 30, supplied to the assist motor 40, and eventually given by the assist motor 40 to the drive shaft 22 as energy of an area Ga1 corresponding to a torque Ta', which is the difference between the output torque Td' and the torque Te of the engine 50.

In the actual state, however, the drive shaft 22 is driven at a driving point P2 having a revolving speed Nd and a torque Td, which is larger than the torque Td'. The assist motor 40 is accordingly driven at a positive torque Ta, which is greater than the torque Ta' and defined as the difference between the output torque Td and the torque Te. It is thus required to supply energy corresponding to the torque Ta (the sum of energy of the area Ga1 and energy of another area Gba) to the assist motor 40. Among the required energy corresponding to the torque Ta, the energy of the area Ga1 can be supplied by the energy of the area Gc1 regenerated by the clutch motor 30, while the energy of the area Gba is in short supply. The battery 94 is thus discharged to release the electric power stored therein and supplement the insufficient energy of the area Gba.

Figure 30:
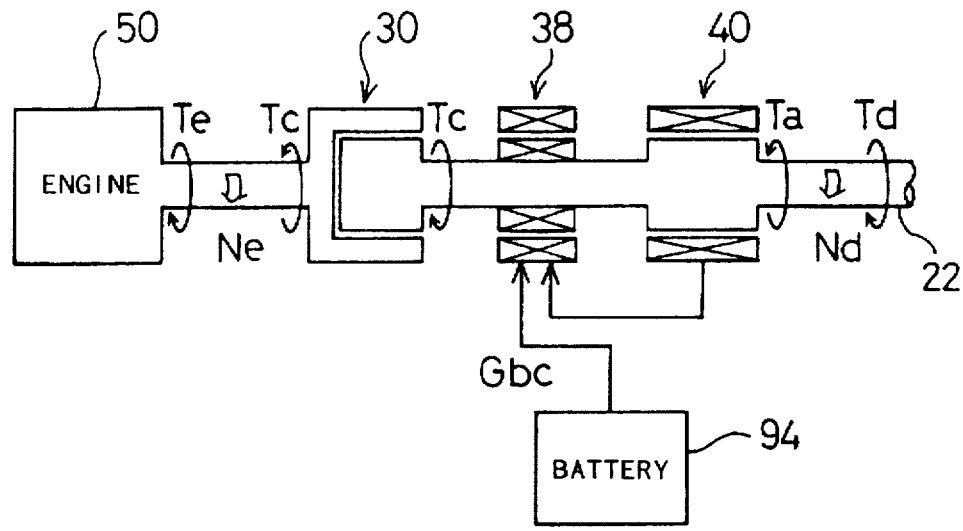
FIG. 30 illustrates the acting state of torque and the discharging state of the battery 94 when the revolving speed Ne is less than the revolving speed Nd.
Figure 31:
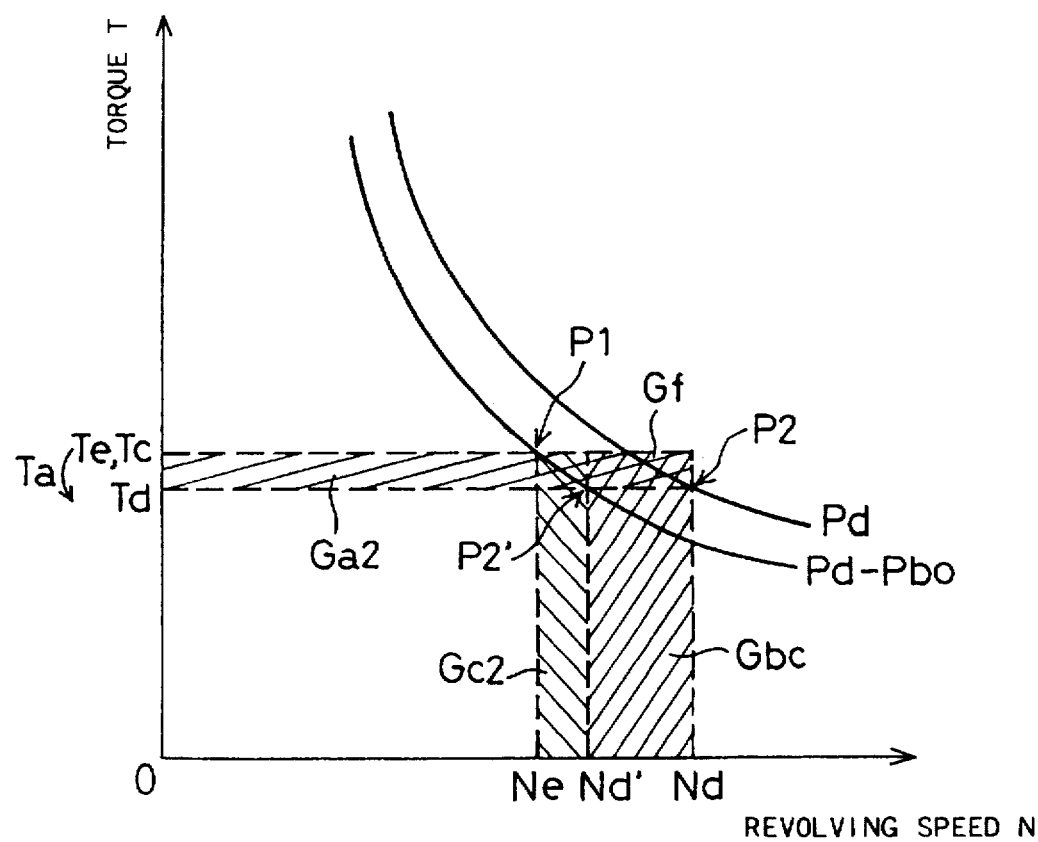
FIG. 31 is a graph showing the state of torque conversion under the condition of FIG. 30.

When the target revolving speed Ne* of the engine 50 is set to be less than the revolving speed Nd of the drive shaft 22, the battery 94 is discharged while the torque of the clutch motor 30 and the assist motor 40 under a stationary driving condition act in the manner shown in FIG. 30, where the revolving speed Ne of the engine 50 is lower than the revolving speed Nd of the drive shaft 22. FIG. 31 shows the state of torque conversion under such conditions. It is assumed that the revolving speed Nd of the drive shaft 22 is equal to a revolving speed Nd'. Referring to FIG. 31, the drive shaft 22 is driven at a driving point P2' (torque Td and revolving speed Nd') upon this assumption. Like the state shown in FIGS. 13 and 14 discussed above, energy is converted from a driving point P1 of the engine 50 to the driving point P2' of the drive shaft 22, wherein the driving points P1 and P2' exist on an identical energy curve (Pd–Pbo=constant). Energy of an area Gc2 corresponding to a negative revolving speed difference Nc' (=Ne–Nd'), which is to be given by the clutch motor 30 to the drive shaft 22, is thus supplied by energy of an area Ga2 corresponding to a torque Ta regenerated by the assist motor 40.

In the actual state, however, the drive shaft 22 is driven at a driving point P2 having a torque Td and a revolving speed Nd, which is greater than the revolving speed Nd'. The clutch motor 30 is accordingly driven corresponding to a negative revolving speed difference Nc between the revolving speed Ne of the engine 50 and the revolving speed Nd of the drive shaft 22. The absolute value of the revolving speed difference Nc is greater than the absolute value of the revolving speed difference Nc' between the revolving speed Ne and the revolving speed Nd'. It is thus required to supply energy, which corresponds to the revolving speed difference Nc and is defined by the sum of the area Gc2 and other areas Gbc and Gf, to the drive shaft 22. Among the required energy corresponding to the revolving speed difference Nc, the energy of the area Gc2 can be supplied by the energy of the area Ga2 regenerated by the assist motor 40, while the energy of the area Gbc is in short supply. The battery 94 is thus discharged to release the electric power stored therein and supplement the insufficient energy of the area Gbc. The clutch motor 30 also requires the energy of the area Gf, which can be supplied by the energy regenerated by the assist motor 40 when the drive shaft 22 is rotated at the revolving speed Nd.

The transient states exist in the process of discharging the battery 94, other than the two states discussed above (that is, when the target revolving speed Ne* of the engine 50 is set to be greater than the revolving speed Nd of the drive shaft 22 and when the target revolving speed Ne* is set to be less than the revolving speed Nd). The transient states include the state when the target revolving speed Ne* is temporarily set to coincide with the revolving speed Nd, that when the target revolving speed Ne* is set to be less than the revolving speed Nd while the target torque Te* is set to be smaller than the output torque command value Td*, and that when the target revolving speed Ne* is set to be less than the revolving speed Nd while the target torque Te* is set to coincide with the output torque command value Td*. The following briefly describes these three transient states.

Figure 32:
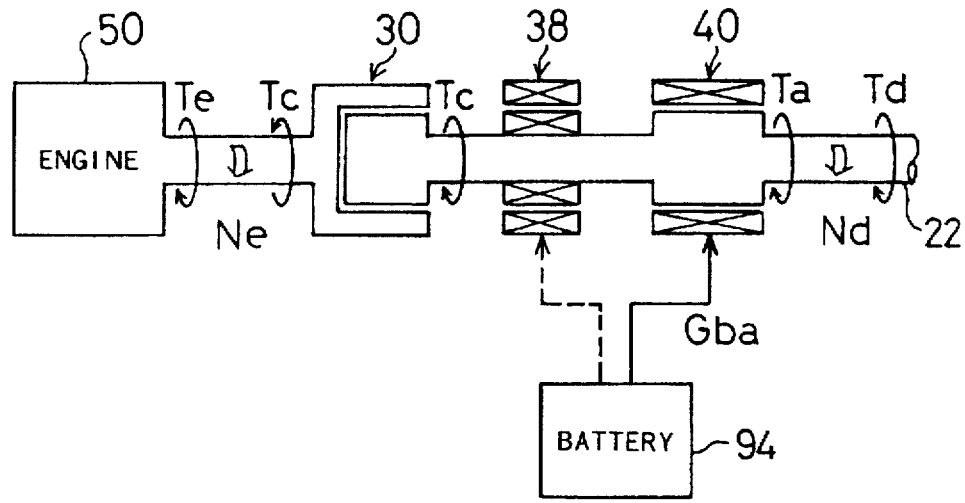
FIG. 32 illustrates the acting state of torque and the discharging state of the battery 94 when the revolving speed Ne is equal to the revolving speed Nd.
Figure 33:
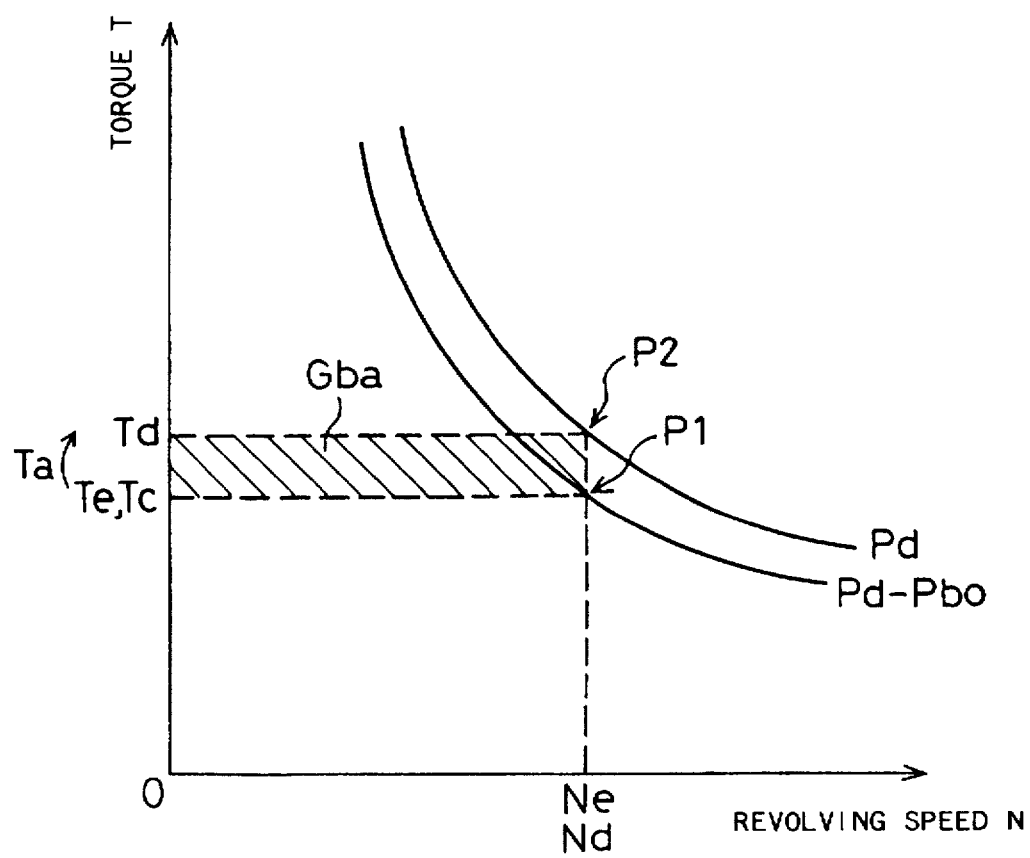
FIG. 33 is a graph showing the state of torque conversion under the condition of FIG. 32.

When the target revolving speed Ne* of the engine 50 is set to coincide with the revolving speed Nd of the drive shaft 22, the battery 94 is discharged while the torque of the clutch motor 30 and the assist motor 40 act in the manner shown in FIG. 32, where the revolving speed Ne of the engine 50 is identical with the revolving speed Nd of the drive shaft 22. FIG. 33 shows the state of torque conversion under such conditions. In this case, since the revolving speed Ne of the engine 50 coincides with the revolving speed Nd of the drive shaft 22 as shown in FIG. 33, the first driving circuit 92 is controlled to make the torque Tc of the clutch motor 30 identical with the torque Te of the engine 50 and to enable the torque Te of the engine 50 to be transmitted to the drive shaft 22. The assist motor 40 is, on the other hand, driven at a positive torque Ta, which is the difference between the output torque Td and the torque Tc of the clutch motor 30. Under such conditions, energy of an area Gba corresponding to the torque Ta is in short supply, and the battery 94 is thus discharged to release the electric power stored therein and supplement the insufficient energy of the area Gba.

Figure 34:
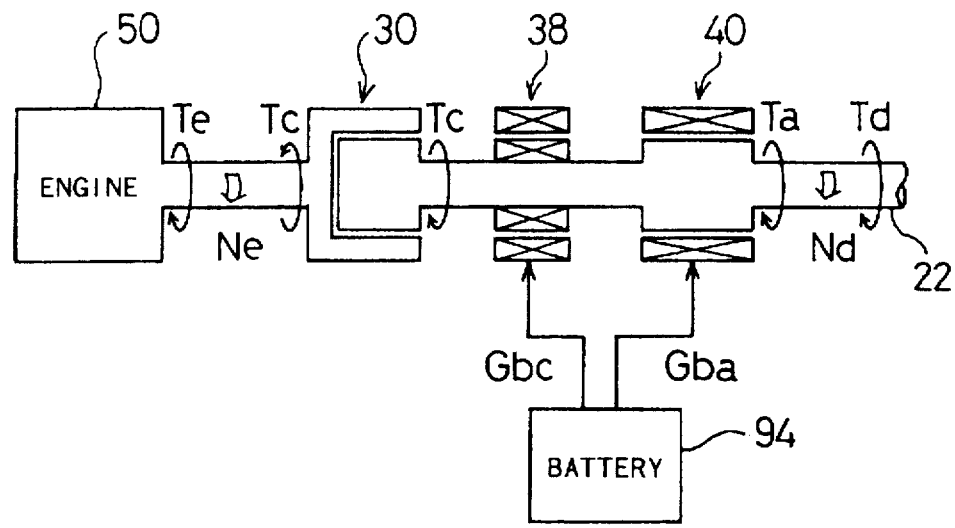
FIG. 34 illustrates the acting state of torque and the discharging state of the battery 94 when the revolving speed Ne is less than the revolving speed Nd and the torque Te is less than the output torque Td.
Figure 35:
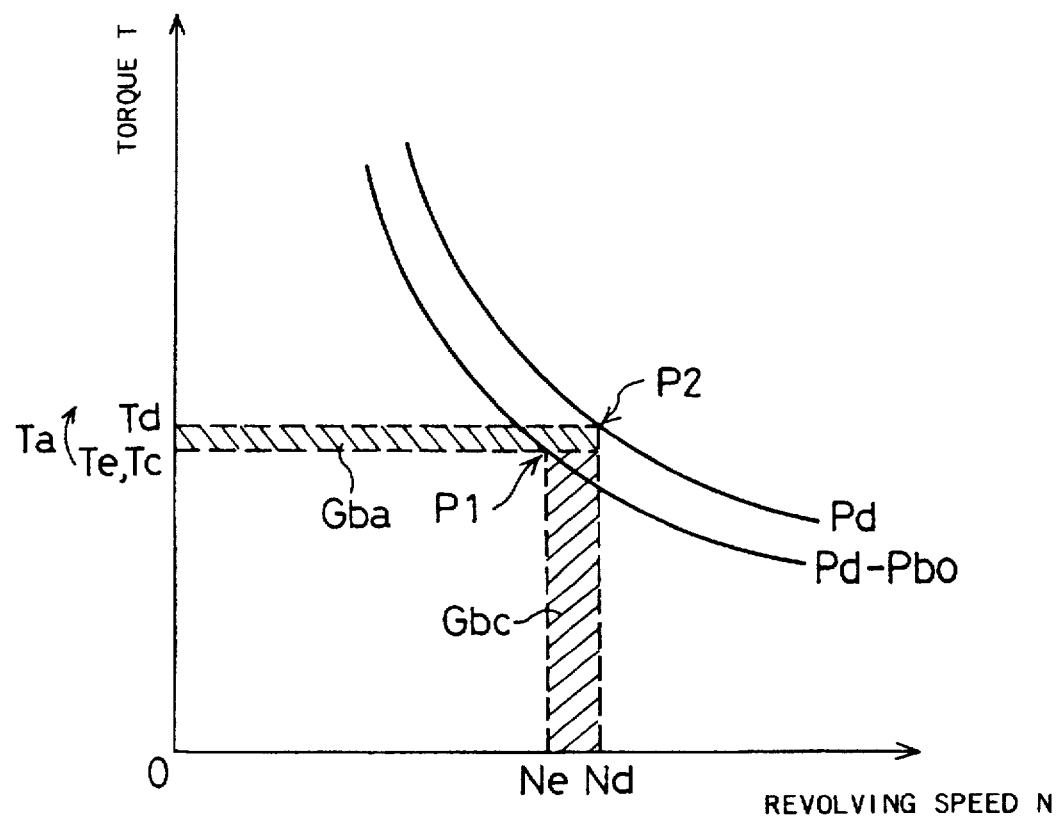
FIG. 35 is a graph showing the state of torque conversion under the condition of FIG. 34.

When the target revolving speed Ne* of the engine 50 is set to be less than the revolving speed Nd of the drive shaft 22 and the target torque Te* of the engine 50 is also set to be smaller than the output torque command value Td*, the battery 94 is discharged while the torque of the clutch motor 30 and the assist motor 40 act in the manner shown in FIG. 34, where the revolving speed Ne of the engine 50 is lower than the revolving speed Nd of the drive shaft 22 and the torque Te of the engine 50 is smaller than the output torque Td. FIG. 35 shows the state of torque conversion under such conditions. There is a negative revolving speed difference Nc (=Ne–Nd) between the revolving speed Ne of the engine 50 and the revolving speed Nd of the drive shaft 22 as shown in FIG. 35, so that the clutch motor 30 carries out the power operation to rotate relative to the crankshaft 56 in the direction of rotation of the engine 50 at a revolving speed defined by the absolute value of the revolving speed difference Nc and supply energy of an area Gbc corresponding to the revolving speed difference Nc to the drive shaft 22. The assist motor 40 is, on the other hand, driven at a positive torque Ta, which is the difference between the output torque Td and the torque Tc of the clutch motor 30, and supplies energy of an area Gba corresponding to the torque Ta to the drive shaft 22. The battery 94 is discharged to release the electric power stored therein and supplement the energy to be given by the clutch motor 30 and the assist motor 40 to the drive shaft 22 (that is, the sum of the energy of the area Gbc and the energy of the area Gba).

Figure 36:
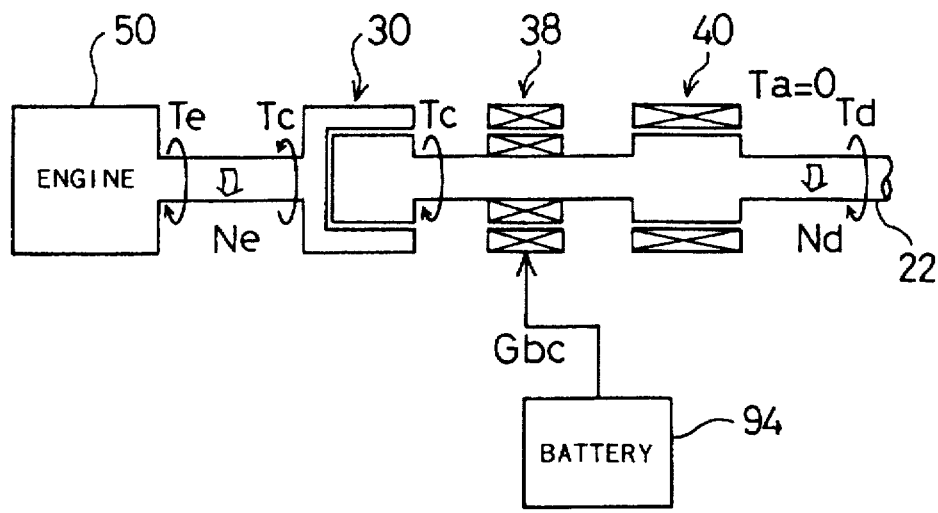
FIG. 36 illustrates the acting state of torque and the discharging state of the battery 94 when the revolving speed Ne is less than the revolving speed Nd and the torque Te is equal to the output torque Td.
Figure 37:
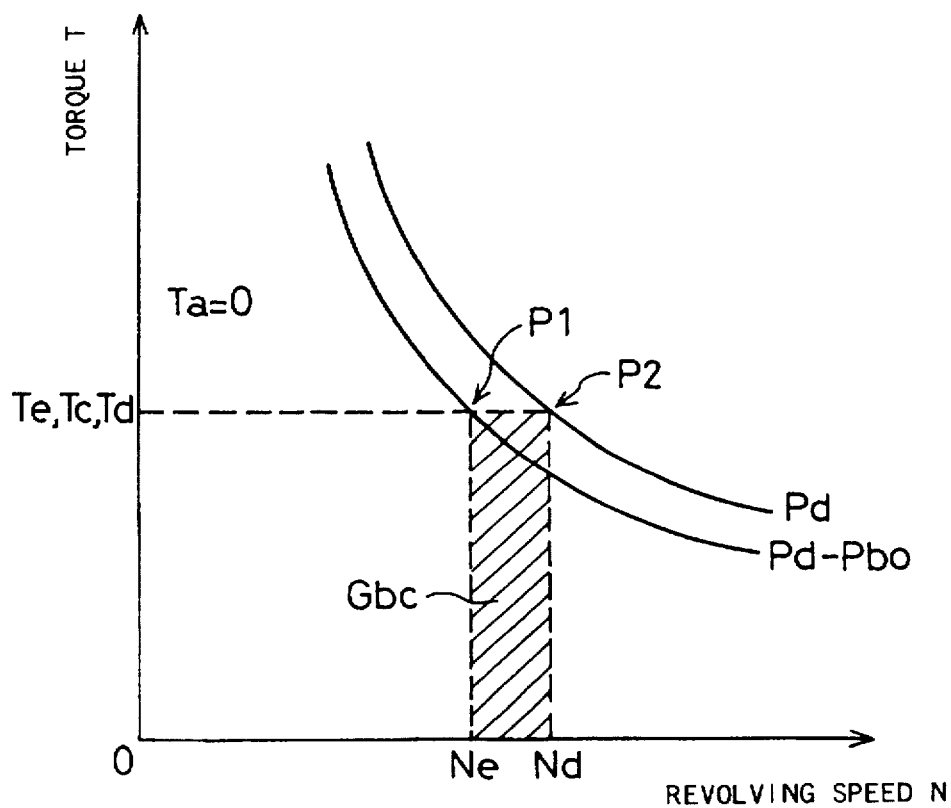
FIG. 37 is a graph showing the state of torque conversion under the condition of FIG. 36.

When the target revolving speed Ne* of the engine 50 is set to be less than the revolving speed Nd of the drive shaft 22 and the target torque Te* of the engine 50 is set to coincide with the output torque command value Td*, the battery 94 is discharged while the torque of the clutch motor 30 and the assist motor 40 act in the manner shown in FIG. 36, where the revolving speed Ne of the engine 50 is lower than the revolving speed Nd of the drive shaft 22 and the torque Te of the engine 50 coincides with the output torque Td. FIG. 37 shows the state of torque conversion under such conditions. In this state, since the torque Te of the engine 50 coincides with the output torque Td of the drive shaft 22, the first driving circuit 91 is controlled to make the torque Tc of the clutch motor 30 identical with the torque Te of the engine 50 and to enable the torque Te to be transmitted to the drive shaft 22. The torque Ta of the assist motor 40 is, on the other hand, equal to zero since the output torque Td coincides with the torque Tc of the clutch motor 30. There is a negative revolving speed difference Nc (=Ne–Nd) between the revolving speed Ne of the engine 50 and the revolving speed Nd of the drive shaft 22, so that the clutch motor 30 carries out the power operation to rotate relative to the crankshaft 56 in the direction of rotation of the engine 50 at a revolving speed defined by the absolute value of the revolving speed difference Nc. The battery 94 is discharged to release the electric power stored therein and supplement energy of an area Gbc corresponding to the revolving speed difference Nc.

B. Power Assist Control Routine

Figure 38:
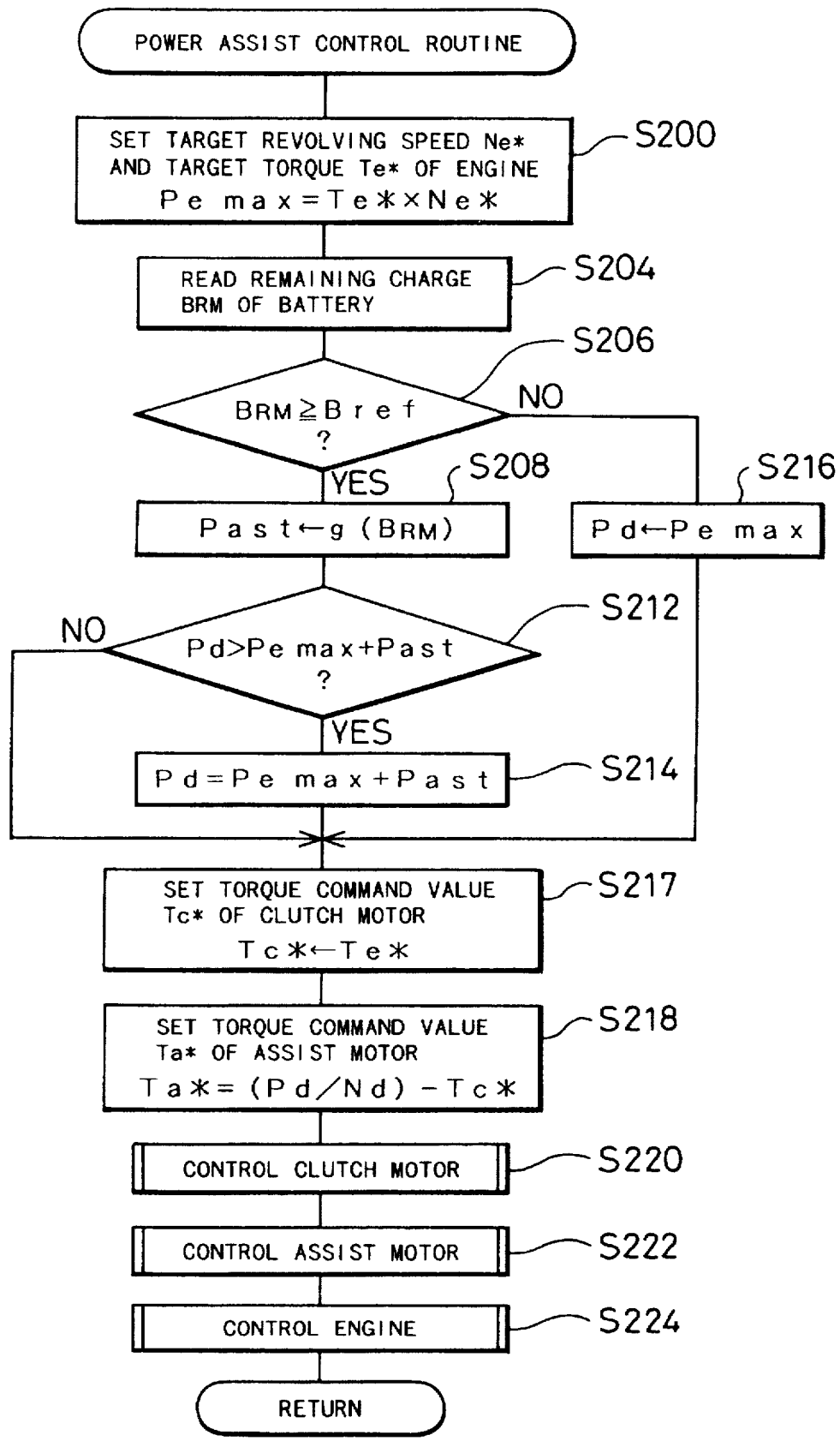
FIG. 38 is a flowchart showing a power assist control routine executed at step S112 in the flowchart of FIG. 5 by the control CPU 90 of the controller 80.

FIG. 38 is a flowchart showing details of the power assist control executed at step S112 in the flowchart of FIG. 5. When the program enters the power assist control routine, the control CPU 90 first specifies the target torque Te* and the target revolving speed Ne* of the engine 50 based on the maximum energy Pemax at step S200. In other words, the control CPU 90 sets the target torque Te* and the target revolving speed Ne* equal to the torque Te and the revolving speed Ne, at which the engine 50 attains its maximum output. The control CPU 90 then reads data of remaining charge BRM of the battery 94 at step S204 and compares the input remaining charge BRM of the battery 94 with a threshold value Bref at step S206. The threshold value Bref is set as a remaining charge, which meets a dischargeable electric power of the battery 94 when the power output apparatus 20 outputs the maximum possible energy to the drive shaft 22 for a predetermined time period, and depends upon the capacity and characteristics of the battery 94.

When the remaining charge BRM of the battery 94 is less than the threshold value Bref at step S206, the program proceeds to step S216, at which the maximum energy Pemax is set as a new output energy Pd, and goes to step S217.

When the remaining charge BRM of the battery 94 is equal to or greater than the threshold value Bref, on the other hand, the program proceeds to step S208, at which an assist energy Past is specified corresponding to the remaining charge BRM of the battery 94. The assist energy Past is set as a maximum energy which can be output from the battery 94 of each remaining charge and depends upon the characteristics of the battery 94. In this embodiment, values of maximum possible energy output from the battery 94 of the respective remaining charges are determined experimentally or otherwise and stored in advance as a map (not shown) in the ROM 90b. In accordance with a concrete procedure, at step S208, the assist energy Past corresponding to the input remaining charge BRM is read from the map stored in the ROM 90b. The output energy Pd is then compared with the sum of the maximum energy Pemax and the specified assist energy Past at step S212. When the output energy Pd is greater than the energy sum, the program determines that the output energy Pd exceeds the maximum possible energy output from the power output apparatus 20 when the battery 94 has the remaining charge BRM (that is, the sum of the maximum energy Pemax and the assist energy Past) and sets the energy sum (Pemax+Past) as a new output energy Pd at step S214 before proceeding to step S217. When the output energy Pd is not greater than the energy sum, on the other hand, the program determines that the output energy Pd does not exceed the maximum possible energy and directly goes to step S217.

After the processing of step S216 or the processing of steps S208 through S214, the program goes to step S217, at which the control CPU 90 sets the torque command value Tc* of the clutch motor 30 based on the target engine torque Te* specified at step S200. The control CPU 90 then computes the torque command value Ta* of the assist motor 40 at step S218 by subtracting the torque command value Tc* of the clutch motor 30 from the quotient of the output energy Pd divided by the revolving speed Nd according to Equation (7) given below:

$$Ta^* = (Pd/Nd) - Tc^* \quad (7)$$

After setting the torque command value Tc* of the clutch motor 30, the torque command value Ta* of the assist motor 40, and the target torque Te* and the target revolving speed Ne* of the engine 50, the program proceeds to steps S220, S222, and S224 to control the clutch motor 30, the assist motor 40, and the engine 50, respectively. The control procedures of steps S220 through S224 are identical with those of steps S160 through S164 discussed above with the flowchart of FIG. 8 and accordingly not described here. As discussed previously, although the control operations of the clutch motor 30, the assist motor 40, and the engine 50 are shown as separate steps as a matter of convenience of illustration, these control operations are carried out concurrently in the actual state.

In the power assist control, electric charge is released from the battery 94 when the remaining charge BRM of the battery 94 is not less than the threshold value Bref. The acting state of the torque applied by the clutch motor 30 and the assist motor 40 and the discharging state of the battery 94 under such condition are identical with those explained above in the process of discharging the battery 94, except that the energy curve Pd−Pbo=constant in FIGS. 29, 31, 33, 35, and 37 is replaced by the energy curve Pemax=constant.

When the remaining charge BRM of the battery 94 is less than the threshold value Bref, on the other hand, no electric charge is released from the battery 94. The acting state of the torque applied by the clutch motor 30 and the assist motor 40 under such condition is identical with that explained above in the process with neither charging nor discharging the battery 94.

As discussed above, the power output apparatus 20 of the embodiment allows the remaining charge BRM of the battery 94 to be controlled to a predetermined range (that is, the range defined by the threshold values BL2 and BH2). When the battery 94 is charged, the engine 50 is controlled to output the sum of the output energy Pd based on the operation of the accelerator pedal 64 and the charging energy Pbi required for charging the battery 94. This enables the battery 94 to be charged with the charging energy Pbi while the output energy Pd based on the operation of the accelerator pedal 64 is transmitted to the drive shaft 22. When the battery 94 is discharged, on the other hand, the engine 50 is controlled to output the energy obtained by subtracting the discharging energy Pbo released from the battery 94 from the output energy Pd based on the operation of the accelerator pedal 64. This enables the output energy Pd, which is based on the operation of the accelerator pedal 64 and consists of the energy output from the engine 50 and the energy discharged from the battery 94, to be transmitted to the drive shaft 22. Energy based on the operation of the accelerator pedal 64 can consequently be transmitted to the drive shaft 22 irrespective of charging or discharging the battery 94. The driver accordingly does not feel any significant variation in output energy due to the charge or discharge of the battery 94.

In the power output apparatus 20 of the embodiment, the charging energy Pbi is determined according to the remaining charge BRM of the battery 94. This allows the battery 94 to be charged not with an excessive electric power but with an appropriate amount of electric current and voltage corresponding to the state of the battery 94. The discharging energy Pbo is also determined according to the remaining charge BRM of the battery 94, so that not an excess amount but a required amount of electric power can be released from the battery 94 corresponding to the state of the battery 94. This effectively prevents the life of the battery 94 from being shortened undesirably.

In the power output apparatus 20 of the embodiment, the engine 50 can be driven at an arbitrary driving point as long as the driving point generates the output energy Pd (that is, the driving point having the torque Te and the revolving speed Ne satisfying the equation Pd=Te×Ne). The engine 50 can thus be driven at a favorable driving point having the highest possible energy efficiency on a curve of output energy Pd=constant. This structure can desirably improve the energy efficiency. Even when the driving point of the engine 50 is set arbitrarily, the battery 94 can be charged according to one of the five charging patterns showing the relationship to the drive shaft 22 as described above with the drawings of FIGS. 18 through 27, and electric charge can be released from the battery 94 according to one of the five discharging patterns showing the relationship to the drive shaft 22 as described above with the drawings of FIGS. 28 through 37.

Upon condition that the output energy Pd is equal to or greater than the maximum possible energy Pemax output from the engine 50, even when the remaining charge BRM of the battery 94 is less than the threshold value BL2, the power output apparatus 20 of the embodiment does not carry out the process of charging the battery 94 but executes the power assist control. An appropriate output reflecting the desire of the driver can thus be transmitted to the drive shaft 22.

Although the charging energy Pbi is determined according to the remaining charge BRM of the battery 94 in the power output apparatus 20 of the embodiment, any predetermined value may be used instead. The discharging energy Pbo may also be set equal to any predetermined value.

The power output apparatus 20 of the embodiment adds the charging energy Pbi to the original output energy Pd to set a new output energy Pd and controls the engine 50 to output the new output energy Pd while charging the battery 94 with the charging energy Pbi. In accordance with another possible procedure, however, the engine 50 may be controlled to output the original output energy Pd without adding the charging energy Pbi, while the battery 94 being charged with energy corresponding to a positive difference between the output torque command value Td* and the sum of the torque command value Tc* of the clutch motor 30 and the torque command value Ta* of the assist motor 40. In the latter case, the torque actually output to the drive shaft 22 becomes smaller than the output torque Td, which the driver requires. No significant problem, however, arises, since a decrease in torque due to charging can be depressed by setting a small energy for charging the battery 94.

In a similar manner, the engine 50 may be controlled to output the original output energy Pd without subtracting the discharging energy Pbo, while electrical energy corresponding to a negative difference between the output torque command value Td* and the sum of the torque command value Tc* of the clutch motor 30 and the torque command value Ta* of the assist motor 40 being released from the battery 94. In this case, the torque actually output to the drive shaft 22 becomes larger than the output torque Td, which the driver requires. No significant problem, however, arises, since an increase in torque due to discharging can be depressed by setting a small electric power to be released from the battery 94.

In the power output apparatus 20 of the embodiment, the threshold value BL1 for stopping the charging process is set to be different from the threshold value BH1 for stopping the discharging process. These threshold values BL1 and BH1 may, however, be an identical value. The start and stop of charging the battery 94 is determined by comparing the remaining charge BRM of the battery 94 with the two threshold values BL2 and BL1 in the power output apparatus 20 of the embodiment. An alternative structure, however, starts charging the battery 94 when the remaining charge BRM becomes equal to or less than the threshold value BL2 and continues charging for a predetermined time period without setting the threshold value BL1 for stopping the charge. In a similar manner, when the remaining charge BRM becomes equal to or greater than the threshold value BH2, discharging the battery 94 may be started and continued for a predetermined time period without using the threshold value BH1 for stopping the discharge.

In the power output apparatus 20 of the embodiment, the engine 50 can be driven at an arbitrary driving point as long as the driving point generates the output energy Pd (that is, the driving point having the torque Te and the revolving speed Ne satisfying the equation Pd=Te×Ne). In accordance with another possible structure, however, the engine 50 may be driven at specific driving points previously set for the time of charging the battery 94 and the time of discharging the battery 94. In the latter structure, an appropriate charging pattern or discharging pattern of the battery 94 can be selected according to the relationship between the preset driving points and the drive shaft 22.

The discussion above relates to the operation of the power output apparatus 20 executed when the drive shaft 22 rotates in the direction of rotation of the crankshaft 56 (that is, when the vehicle moves forward). The principle of the embodiment is also applicable to the operation of the power output apparatus 20 executed when the drive shaft 22 rotates in reverse of the rotation of the crankshaft 56 (that is, when the vehicle moves in reverse). In the latter case, the revolving speed Nd of the drive shaft 22 takes a negative value. The following describes the operation of the power output apparatus 20 carried out when the vehicle moves back.

Figure 39:
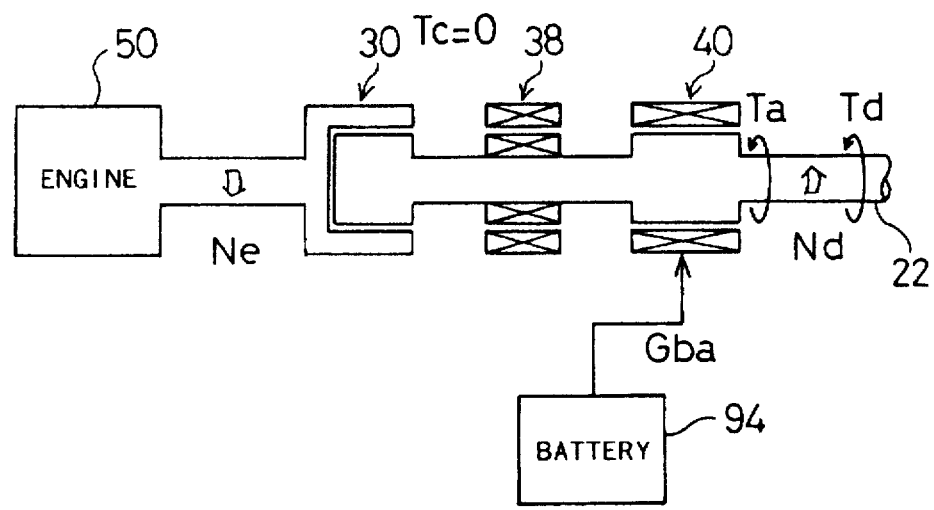
FIG. 39 illustrates the acting state of torque when the vehicle moves back with electric power released from the battery 94.
Figure 40:
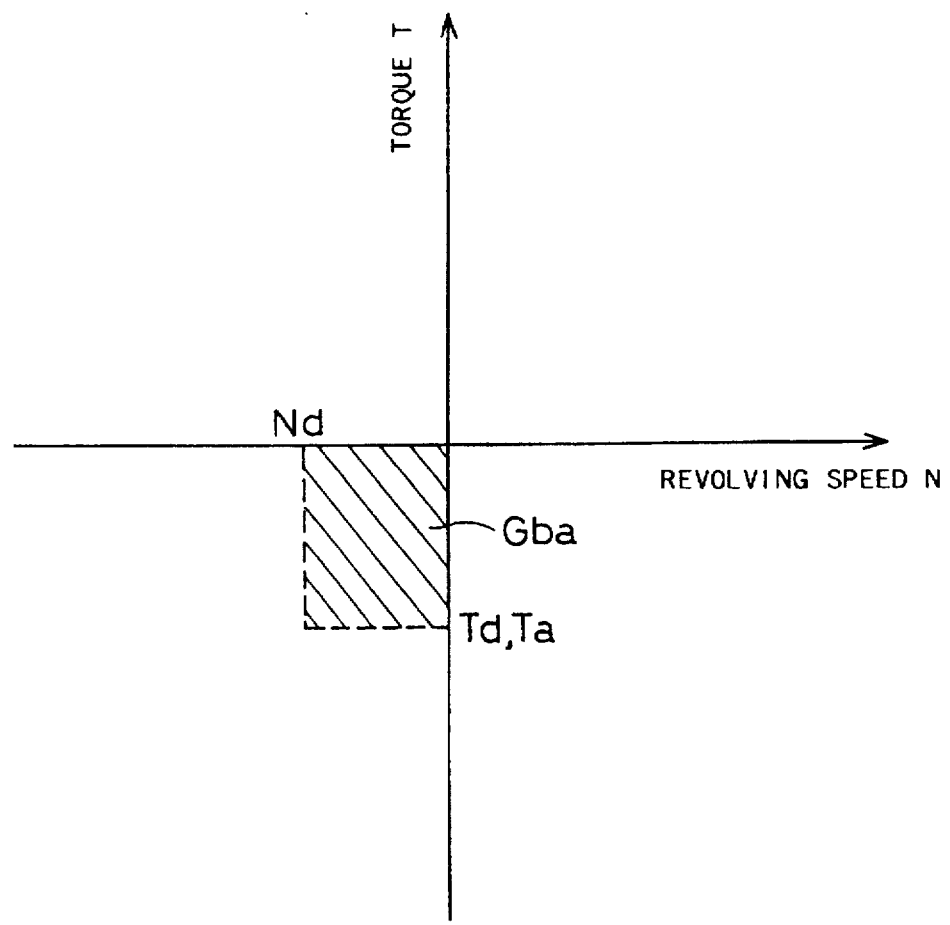
FIG. 40 is a graph showing the state of torque conversion under the condition of FIG. 39.

FIG. 39 shows the acting state of the torque when the vehicle moves back with electric power released from the battery 94, and FIG. 40 shows the state of torque conversion under such conditions. The vehicle moves back while the electric power stored in the battery 94 is applied to the assist motor 40 as shown in FIGS. 39 and 40. In accordance with a concrete procedure, the transistors Tr1 through Tr6 in the first driving circuit 91 are controlled and switched off to make the torque Tc of the clutch motor 30 equal to zero, whereas the torque command value Ta* of the assist motor 40 is set equal to the output torque command value Td* specified according to the operation of the accelerator pedal 64 and the assist motor control routine shown in FIG. 10 is executed. In this state, since the torque Tc of the clutch motor 30 is equal to zero, no output energy from the engine 50 is transmitted to the drive shaft 22.

Figure 41:
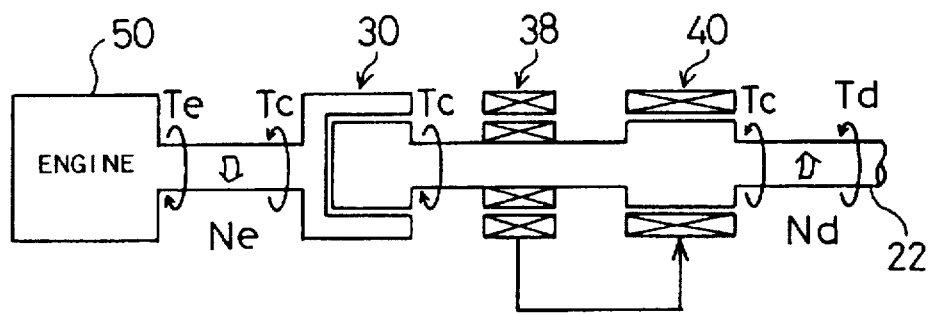
FIG. 41 illustrates the acting state of torque when the drive shaft 22 is rotated in a reverse direction by the energy output from the engine 50.
Figure 42:
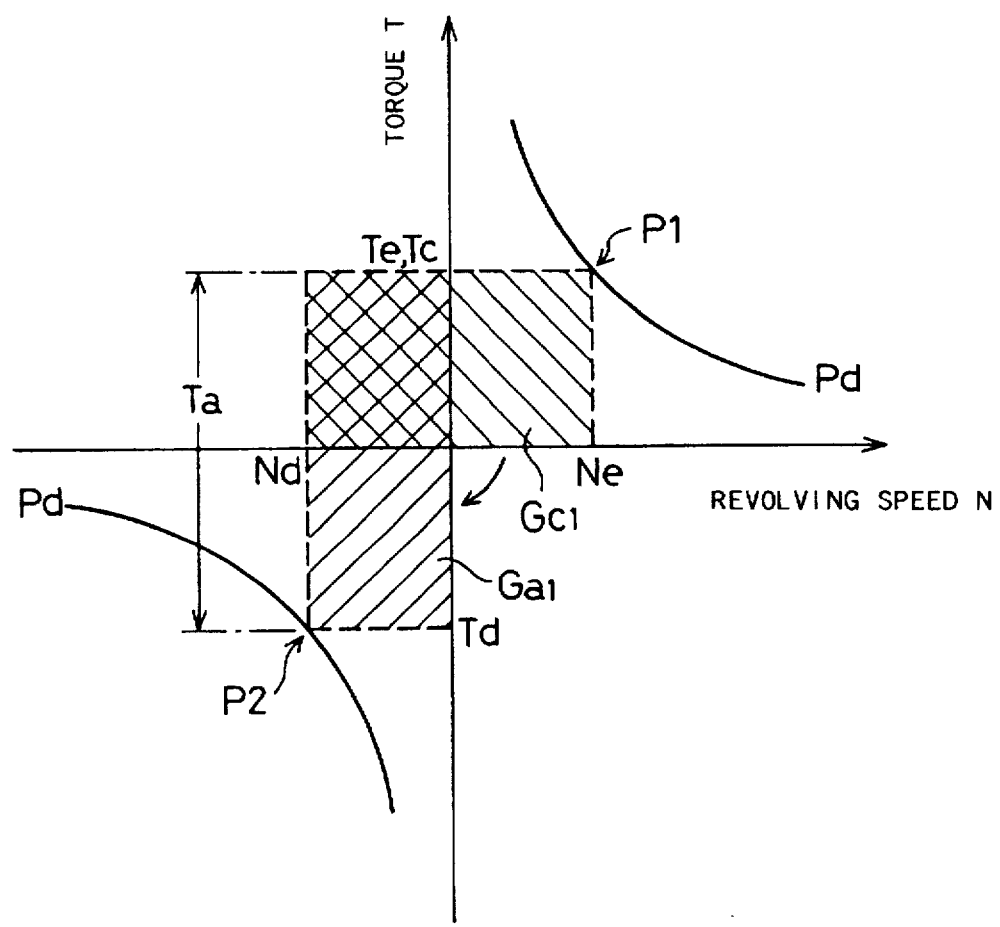
FIG. 42 is a graph showing the state of torque conversion under the condition of FIG. 41.

When the remaining charge BRM of the battery 94 is not sufficient to supply the electric power required for moving the vehicle back or when the vehicle moves back without consuming the electric power stored in the battery 94, energy output from the engine 50 is converted by the clutch motor 30 and the assist motor 40 and given as a torque to rotate the drive shaft 22 in a reverse direction and move the vehicle back. FIG. 41 shows the acting state of the torque applied by the clutch motor 30 and the assist motor 40 when the drive shaft 22 is rotated in a reverse direction by the energy output from the engine 50, and FIG. 42 shows the state of torque conversion under such conditions. In this case, there exists a positive revolving speed difference Nc (=Ne−Nd) between the revolving speed Ne of the engine 50 and the revolving speed Nd of the drive shaft 22 as shown in FIG. 42, so that the clutch motor 30 carries out the regenerative operation to regenerate energy of an area Gc1 corresponding to the revolving speed difference Nc. The assist motor 40 is, on the other hand, driven at a negative torque Ta, which is the difference between the output torque Td and the torque Tc of the clutch motor 30 (=torque Te) and supplies energy of an area Ga1 corresponding to the torque Ta to the drive shaft 22. The assist motor 40 carries out the power operation even when the torque Ta is a negative value, since the revolving speed Nd of the drive shaft 22 takes a negative value. This means that the assist motor 40 carries out the power operation when the sign of the torque Ta is coincident with the sign of the revolving speed Nd of the drive shaft 22 and carries out the regenerative operation when the signs are different from each other.

In this state, energy is converted from a driving point P1 of the engine 50 existing on an energy curve Pd=constant in the first quadrant to a driving point P2 of the drive shaft 22 existing on the energy curve Pd=constant in the third quadrant as shown in FIG. 42. In other words, the energy of the area Gc1 regenerated by the clutch motor 30 corresponding to the revolving speed difference Nc is supplied to the assist motor 40 as the energy of the area Ga1 corresponding to the torque Ta. The assist motor 40 eventually gives the energy of the area Ga1 to the drive shaft 22.

Figure 43:
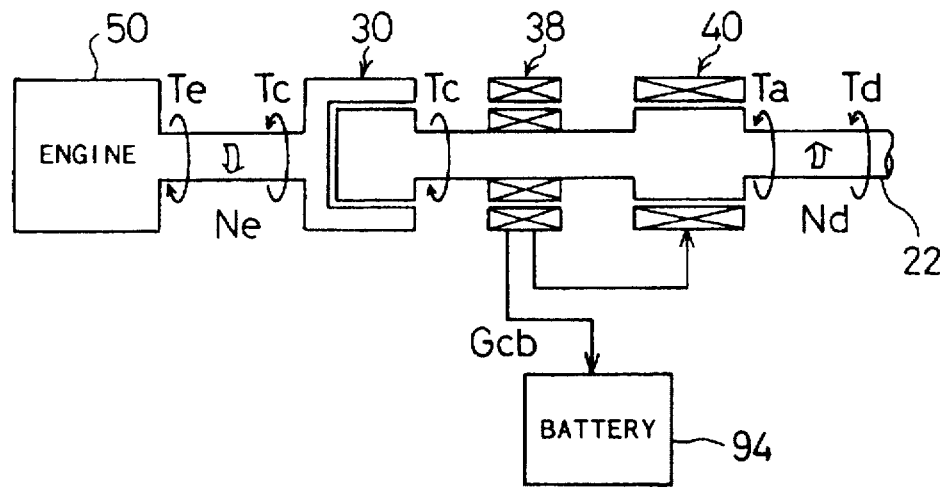
FIG. 43 illustrates the acting state of torque and the charging state of the battery 94 when the drive shaft 22 is rotated in a reverse direction by the energy output from the engine 50.
Figure 44:
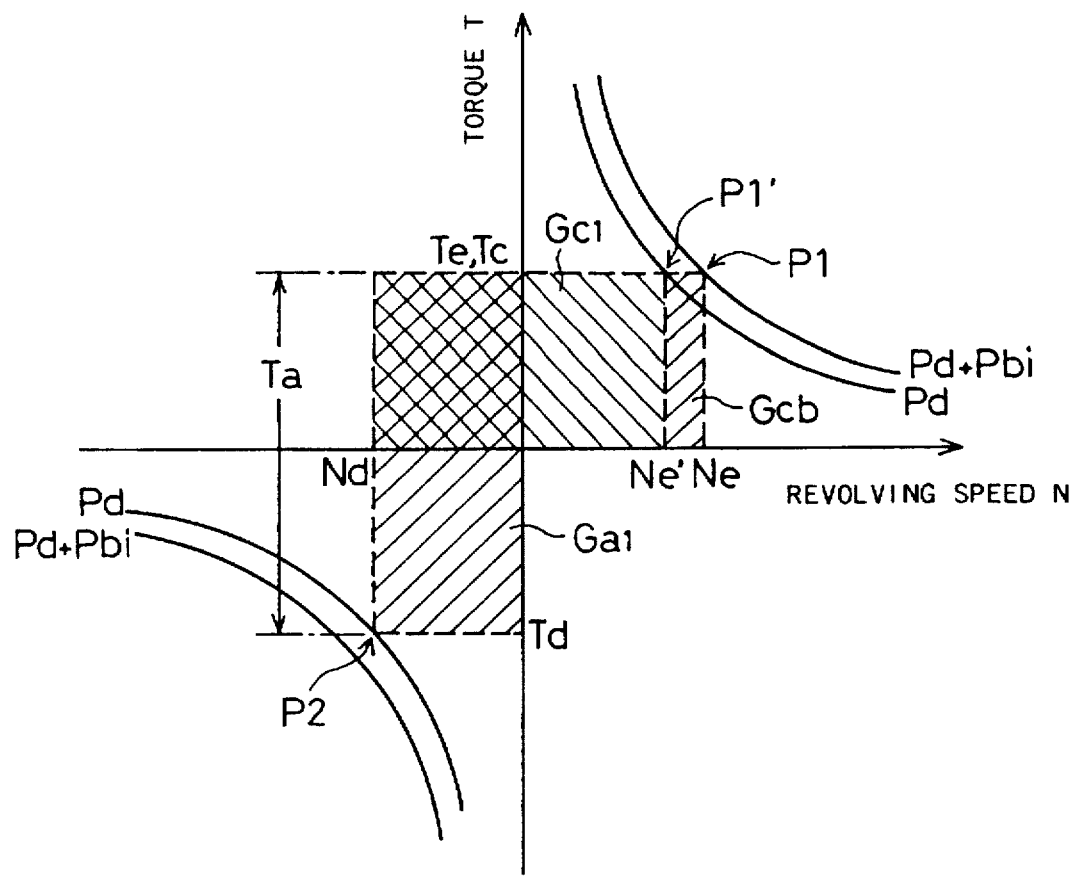
FIG. 44 is a graph showing the state of torque conversion under the condition of FIG. 43.

The battery 94 can be charged or discharged similarly in the process of torque conversion implemented while the vehicle moves back. When the process of charging the battery 94 in the charge/discharge torque control routine discussed above with the flowcharts of FIGS. 7 and 8 (that is, the processing of steps S126 through S138 in FIG. 7 and that of steps S150 through S164 in FIG. 8) is carried out in the reverse movement of the vehicle, the battery 94 is charged while the torque of the clutch motor 30 and the assist motor 40 act in the manner shown in FIG. 43. FIG. 44 shows the state of torque conversion under such conditions. Energy conversion from a driving point P1' of the engine 50 to a driving point P2 of the drive shaft 22 gives the same results as those in FIGS. 41 and 42. In this state, however, the engine 50 is driven by the output energy Pd updated by adding the charging energy Pbi, so that energy is actually converted from a driving point P1 of the engine 50 to the driving point P2 of the drive shaft 22 as shown in FIG. 43. This causes the clutch motor 30 to carry out the regenerative operation and regenerate energy of an area Gcb as excess energy. The battery 94 is accordingly charged with the energy of the area Gcb.

Figure 45:
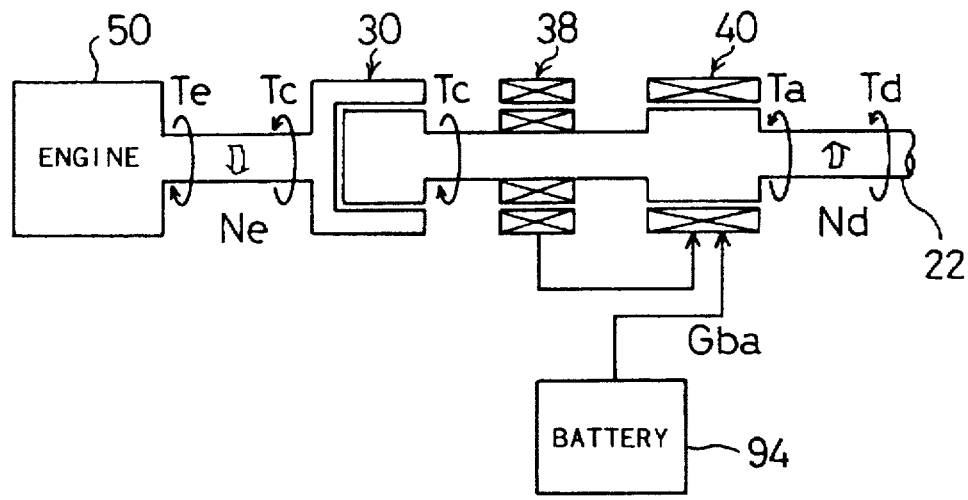
FIG. 45 illustrates the acting state of torque and the discharging state of the battery 94 when the drive shaft 22 is rotated in a reverse direction by the energy output from the engine 50.
Figure 46:
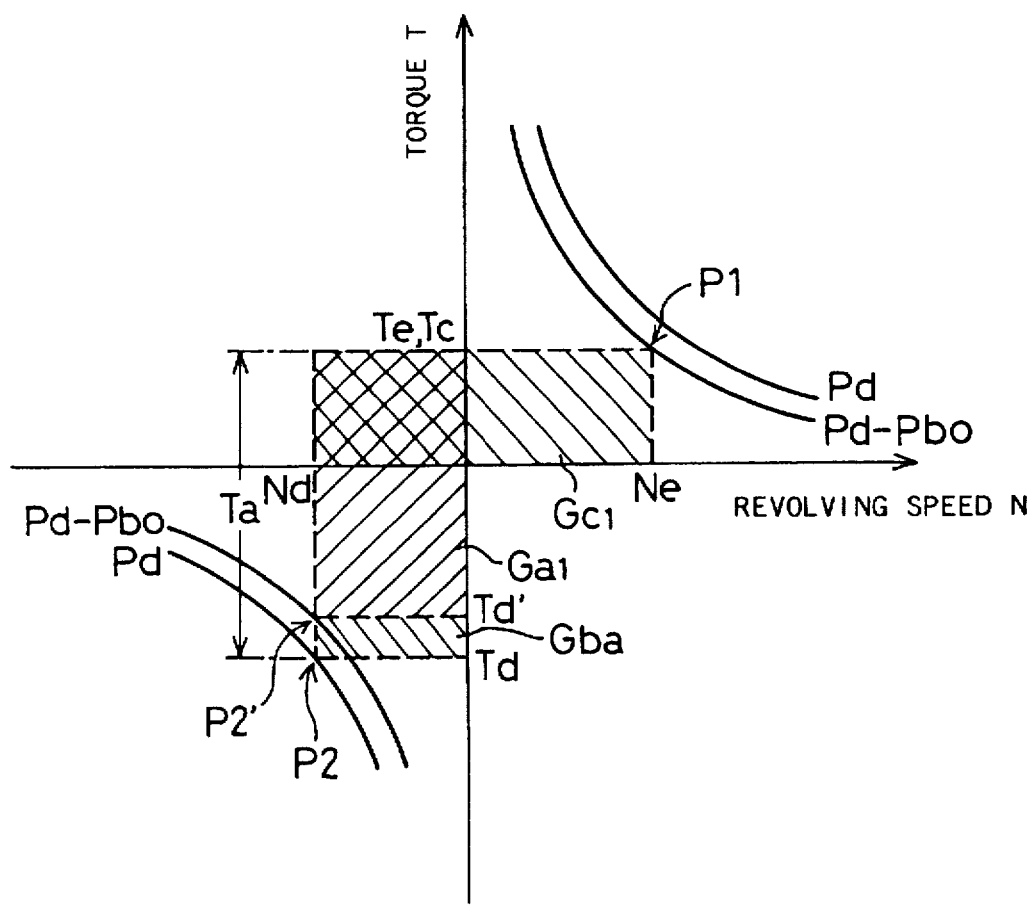
FIG. 46 is a graph showing the state of torque conversion under the condition of FIG. 45.

When the process of discharging the battery 94 in the charge/discharge torque control routine discussed above with the flowcharts of FIGS. 7 and 8 (that is, the processing of steps S140 through S148 in FIG. 7 and that of steps S150 through S164 in FIG. 8) is carried out in the reverse movement of the vehicle, the battery 94 is discharged while the torque of the clutch motor 30 and the assist motor 40 act in the manner shown in FIG. 45. FIG. 46 shows the state of torque conversion under such conditions. Energy conversion from a driving point P1 of the engine 50 to a driving point P2' of the drive shaft 22 gives the same results as those in FIGS. 41 and 42. In this state, however, the drive shaft 22 is driven at a driving point P2 having an output torque Td, whose absolute value is greater than the absolute value of a torque Td' of the driving point P2', so that energy is actually converted from the driving point P1 of the engine 50 to the driving point P2 of the drive shaft 22 as shown in FIG. 45. Energy of an area Gba is thus in short supply. The battery 94 is then discharged to release the electric power stored therein and supplement the insufficient energy of the area Gba.

As discussed above, the power output apparatus 20 of the embodiment allows the remaining charge BRM of the battery 94 to be controlled to a predetermined range (that is, the range defined by the threshold values BL2 and BH2) when the drive shaft 22 rotates in reverse of the rotation of the crankshaft 56, that is, when the vehicle moves back. At the time of reverse movement of the vehicle, the power output apparatus 20 exerts the same effects as those discussed above for the forward movement of the vehicle.

The following gives other possible charging and discharging patterns of the battery 94 in the power output apparatus 20 of the embodiment:

(1) Driving Only With Electric Power Released From the Battery 94

Figure 47:
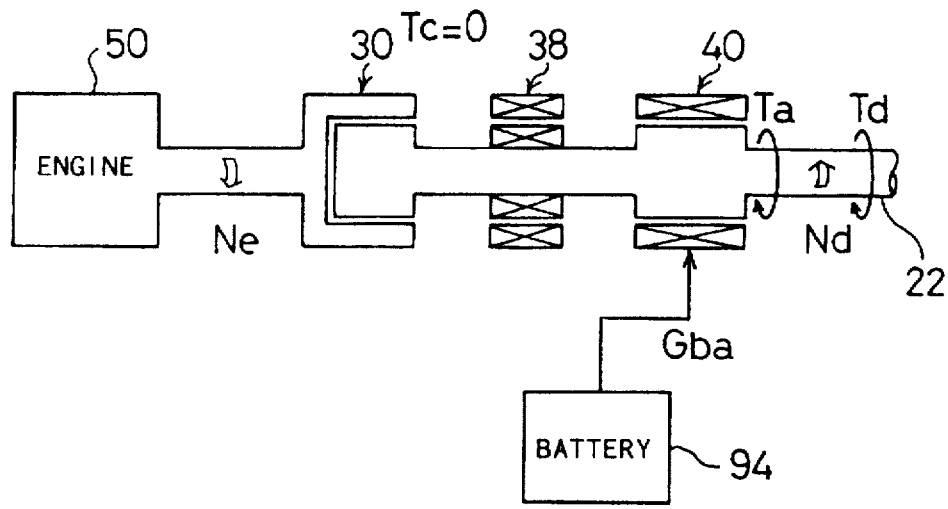
FIG. 47 illustrates the acting state of torque and the discharging state of the battery 94 when the vehicle is driven only with the electric power released from the battery 94.
Figure 48:
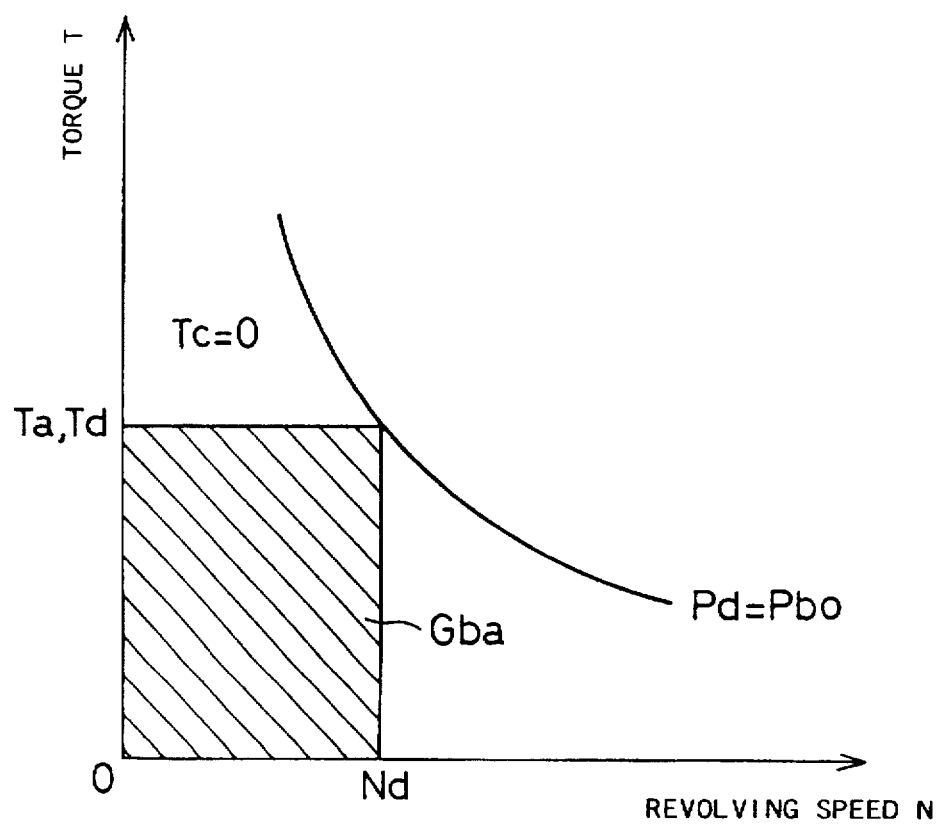
FIG. 48 is a graph showing the state of torque conversion under the condition of FIG. 47.

In this case, the torque of the clutch motor 30 and the assist motor 40 act in the manner shown in FIG. 47 while the battery 94 is discharged. FIG. 48 shows the state of torque conversion under such conditions. In the same manner as that shown in FIGS. 39 and 40, when the vehicle moves back only with the electric power discharged from the battery 94, the torque Tc of the clutch motor 30 is made equal to zero and the torque command value Ta* of the assist motor 40 is set equal to the output torque command value Td* specified according to the operation of the accelerator pedal 64.

(2) Charging While the Clutch Motor 30 is in Lock-Up State

Figure 49:
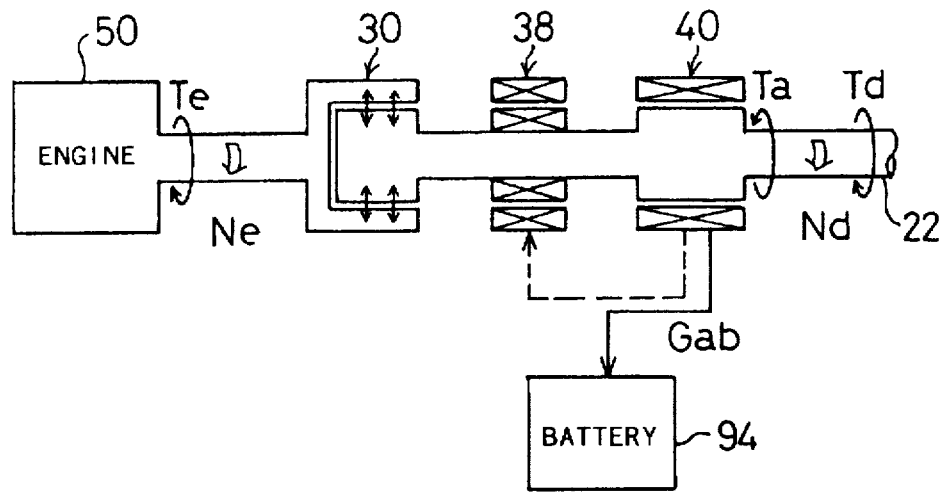
FIG. 49 illustrates the acting state of torque and the charging state of the battery 94 when the clutch motor 30 is in lock-up state.
Figure 50:
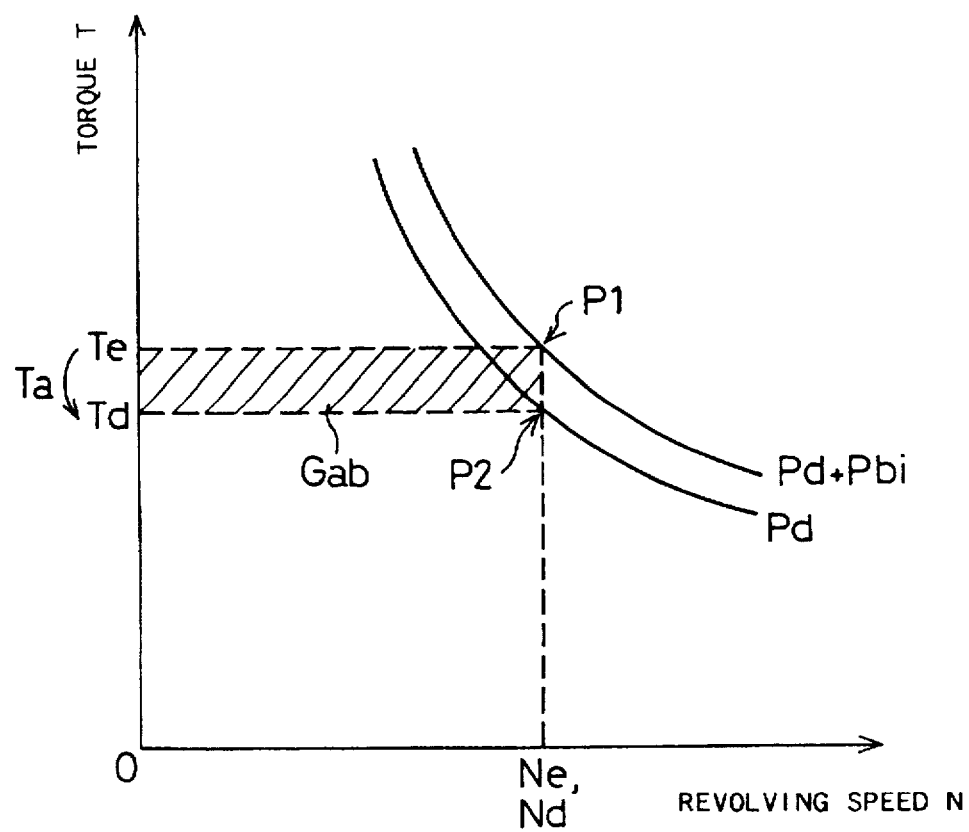
FIG. 50 is a graph showing the state of torque conversion under the condition of FIG. 49.

In this case, the torque of the clutch motor 30 and the assist motor 40 act in the manner shown in FIG. 49 while the battery 94 is charged. FIG. 50 shows the state of torque conversion under such conditions. This state is substantially similar to the acting state of the torque and the charging state of the battery 94 shown in FIGS. 26 and 27, when the revolving speed Ne of the engine 50 coincides with the revolving speed Nd of the drive shaft 22, discussed as the transient state between the state of FIGS. 18 and 19 and that of FIGS. 20 and 21 in the process of charging the battery 94. The only difference from the state of FIGS. 26 and 27 is that a constant current required for rotating the crankshaft 56 and transmitting the torque to the drive shaft 22 is made to flow through the three-phase coils 36 of the clutch motor 30 irrespective of any variation in driving point of the engine 50.

(3) Discharging While the Clutch Motor 30 is in Lock-Up State

Figure 51:
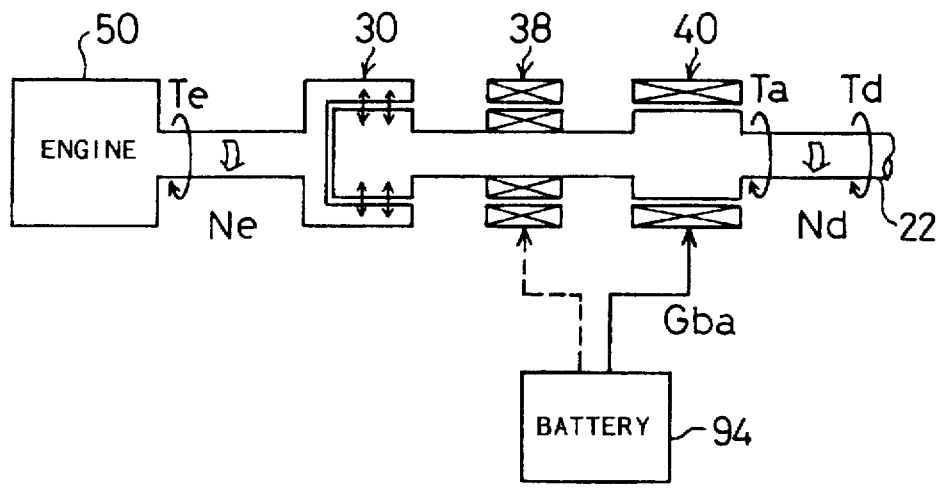
FIG. 51 illustrates the acting state of torque and the discharging state of the battery 94 when the clutch motor 30 is in lock-up state.
Figure 52:
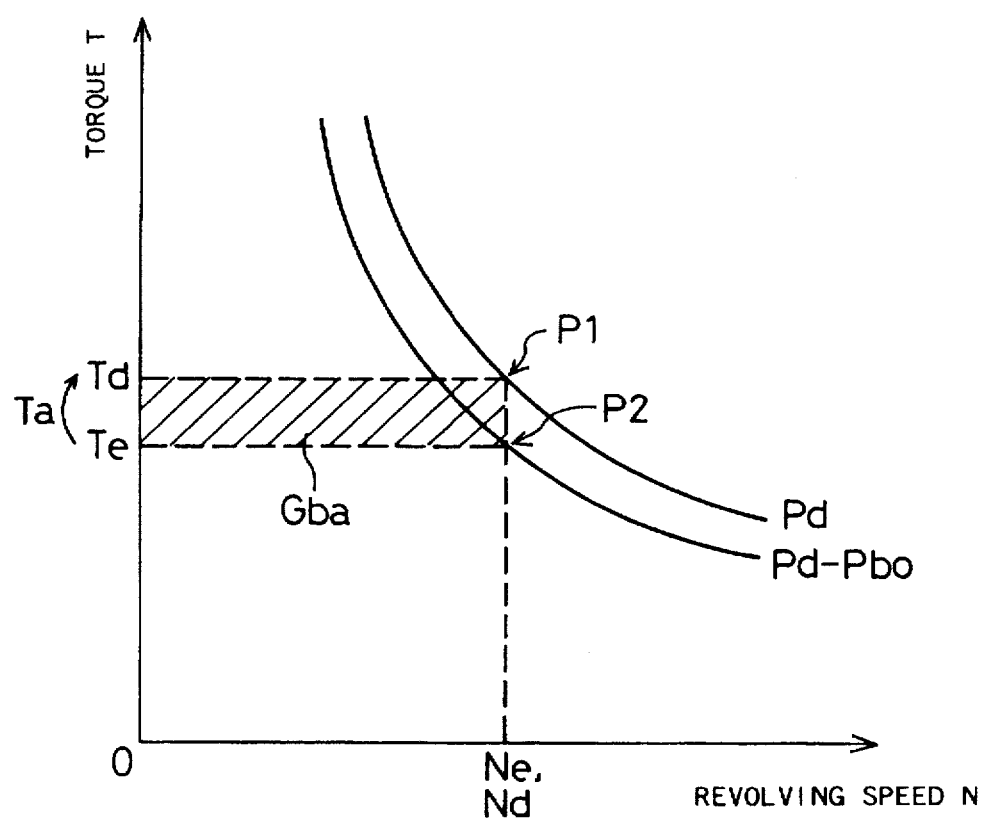
FIG. 52 is a graph showing the state of torque conversion under the condition of FIG. 51.

In this case, the torque of the clutch motor 30 and the assist motor 40 act in the manner shown in FIG. 51 while the battery 94 is discharged. FIG. 52 shows the state of torque conversion under such conditions. This state is substantially similar to the acting state of the torque and the discharging state of the battery 94 shown in FIGS. 32 and 33, when the revolving speed Ne of the engine 50 coincides with the revolving speed Nd of the drive shaft 22, discussed as the transient state between the state of FIGS. 28 and 29 and that of FIGS. 30 and 31 in the process of discharging the battery 94. Like the above pattern (2), the only difference from the state of FIGS. 32 and 33 is that a constant current required for rotating the crankshaft 56 and transmitting the torque to the drive shaft 22 is made to flow through the three-phase coils 36 of the clutch motor 30 irrespective of any variation in driving point of the engine 50.

In the power output apparatus 20 of the embodiment discussed above, the clutch motor 30 includes the outer rotor 32 linked with the crankshaft 56 and the inner rotor 34 connected with the drive shaft 22. The clutch motor 30 may, however, alternatively include the inner rotor 34 linked with the crankshaft 56 and the outer rotor 32 connected with the drive shaft 22. Although the permanent magnets 35 are mounted on the outer rotor 32 linked with the crankshaft 56 and the three-phase coils 36 are attached to the inner rotor 34 linked with the drive shaft 22 in the power output apparatus 20 of the embodiment, three-phase coils may be attached to a rotor linked with the crankshaft 56 while permanent magnets being mounted on a rotor connecting to the drive shaft 22. In this case, the rotor linked with the crankshaft 56 may be either the outer rotor or the inner rotor. When the three-phase coils are attached to the rotor linked with the crankshaft 56, the rotary transformer 38 should be disposed on the crankshaft 56.

In the structure of the power output apparatus 20 shown in FIG. 1, the clutch motor 30 and the assist motor 40 are separately attached to the different positions of the drive shaft 22. Like a power output apparatus 20A illustrated in FIG. 53 which illustrates a modification of the power output apparatus 20 of the above embodiment, however, the clutch motor and the assist motor may be joined integrally with each other. A clutch motor 30A of the power output apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as the rotor of the assist motor 40A. Since the three-phase coils 36A are mounted on the inner rotor 34A linked with the crankshaft 56, the rotary transformer 38 for supplying electric power to the three-phase coils 36A of the clutch motor 30A is attached to the crankshaft 56.

In the power output apparatus 20A, the voltage applied to the three-phase coils 36A on the inner rotor 34A is controlled against the inner-surface magnetic pole of the permanent magnets 35A set on the outer rotor 32A. This enables the clutch motor 30A to work in the same manner as the clutch motor 30 of the power output apparatus 20 of the above embodiment having the clutch motor 30 and the assist motor 40 separately attached to the drive shaft 22. The voltage applied to the three-phase coils 44 on the stator 43 is controlled against the outer-surface magnetic pole of the permanent magnets 35A set on the outer rotor 32A. This enables the assist motor 40A to work in the same manner as the assist motor 40 of the power output apparatus 20. All the operations of the power output apparatus 20 discussed above are accordingly applicable to the power output apparatus 20A of modified structure.

The outer rotor 32A functions concurrently as one of the rotors in the clutch motor 30A and as the rotor of the assist motor 40A, thereby effectively reducing the size and weight of the power output apparatus 20A.

Figure 54:
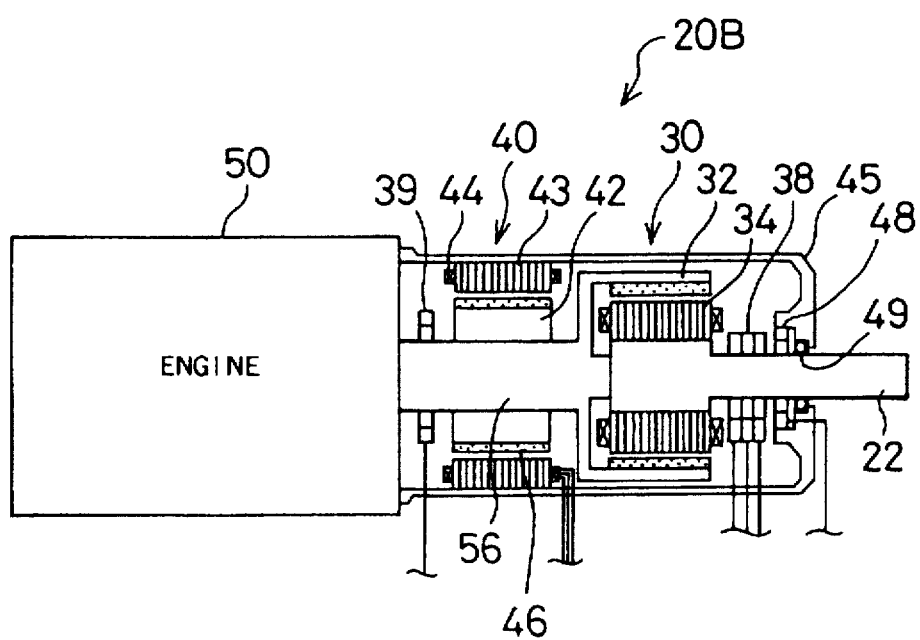
FIG. 54 illustrates structure of another power output apparatus 20B as a second embodiment according to the present invention.

FIG. 54 schematically illustrates an essential part of another power output apparatus 20B as a second embodiment of the present invention. Referring to FIG. 54, the power output apparatus 20B of the second embodiment has a similar structure to that of the power output apparatus 20 of the first embodiment, except that the assist motor 40 is attached to the crankshaft 56 placed between the engine 50 and the clutch motor 30. Like numerals accordingly denote like elements in the description below. The symbols used in the following description have like meanings unless otherwise specified.

Like the power output apparatus 20 of the first embodiment, the power output apparatus 20B of the second embodiment can execute the torque control shown in the flowchart of FIGS. 5, the charge/discharge torque control shown in the flowcharts of FIGS. 7 and 8, and the power assist control shown in the flowchart of FIG. 38. In the second embodiment, however, the charge/discharge torque control routine of FIGS. 7 and 8 is replaced by another charge/discharge torque control routine of FIGS. 7 and 55. Since the power output apparatus 20B carries out the torque control routine of FIG. 5 and the first half of the charge/discharge torque control routine shown in FIG. 7 in the same manner as the power output apparatus 20 of the first embodiment, description on such parts is omitted here. The following describes the second half of the charge/discharge torque control routine shown in FIG. 55 and typical states of torque conversion in the power output apparatus 20B of the second embodiment.

Figure 55:
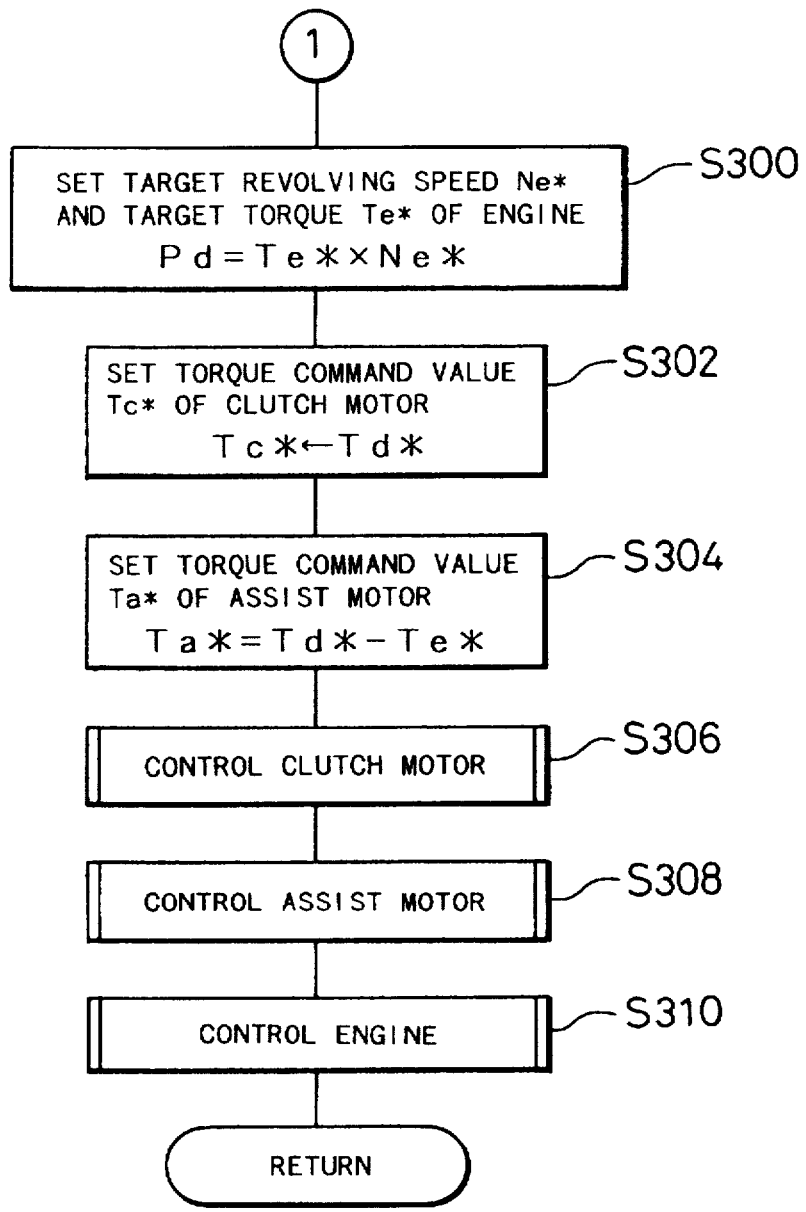
FIG. 55 is a flowchart showing the latter half of the charge/discharge torque control routine executed in the second embodiment by the control CPU 90 of the controller 80.

At step S300 in the flowchart of FIG. 55, the control CPU 90 sets the target torque Te* and the target revolving speed Ne* of the engine 50, based on the output energy Pd computed at step S106 in the torque control routine of FIG. 5, the output energy Pd obtained by the processing of steps S132 through S136 in the flowchart of FIG. 7, or the output energy Pd computed at step S146 in FIG. 7. As long as the product of the target torque Te* and the target revolving speed Ne* represents the output energy Pd, any combination of the target torque Te* and the target revolving speed Ne* can be selected satisfactorily as discussed above in the power output apparatus 20 of the first embodiment.

At step S302, the torque command value Tc* of the clutch motor 30 is set equal to the output torque command value Td* computed at step S104 in the flowchart of FIG. 5. The output torque command value Td* is set for the torque command value Tc* of the clutch motor 30 since only the clutch motor 30 can directly apply the torque to the drive shaft 22 in the structure of the power output apparatus 20B of the second embodiment.

The program then proceeds to step S304, at which the torque command value Ta* of the assist motor 40 is computed by subtracting the target torque Te* of the engine 50 from the output torque command value Td*. In order to allow the clutch motor 30 to transmit the torque defined by the torque command value Tc* set equal to the output torque command value Td* to the drive shaft 22, it is required to make the torque of the crankshaft 56 equal to the value Tc* (that is, the value Td*). This is why the torque command value Ta* of the assist motor 40 is set by subtracting the target torque Te* of the engine 50 from the output torque command value Td*.

After setting the torque command value Tc* of the clutch motor 30, the torque command value Ta* of the assist motor 40, and the target torque Te* and the target revolving speed Ne* of the engine 50, the program proceeds to steps S306, S308, and S310 to control the clutch motor 30, the assist motor 40, and the engine 50, respectively. The control procedures of steps S306 through S310 are identical with those of steps S160 through S164 discussed above with the flowchart of FIG. 8 and accordingly not described here. As discussed previously, although the control operations of the clutch motor 30, the assist motor 40, and the engine 50 are shown as separate steps as a matter of convenience of illustration, these control operations are carried out concurrently in the actual state.

The process with neither charging nor discharging the battery 94 executed at step S124 in the flowchart of FIG. 7 can be divided into three different acting states of the torque applied by the clutch motor 30 and the assist motor 40; that is, the state when the target revolving speed Ne* of the engine 50 is set to be greater than the revolving speed Nd of the drive shaft 22, the state when the target revolving speed Ne* is set to be less than the revolving speed Nd, and the transient state between these two states. The following describes the first two states, whereas the transient state can be readily understandable from the following description of these two states and the description of FIGS. 15 and 16 with respect to the power output apparatus 20 of the first embodiment and is thus not explained here.

Figure 56:
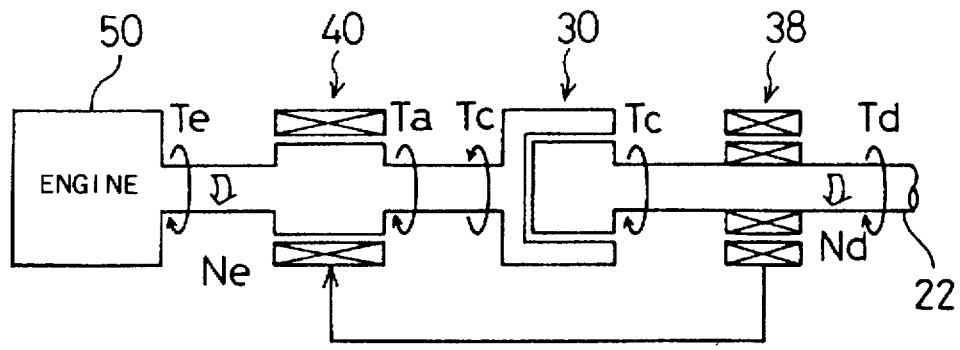
FIG. 56 illustrates the acting state of torque when the revolving speed Ne is greater than the revolving speed Nd in the process with neither charging nor discharging the battery 94 in the power output apparatus 20B of the second embodiment.
Figure 57:
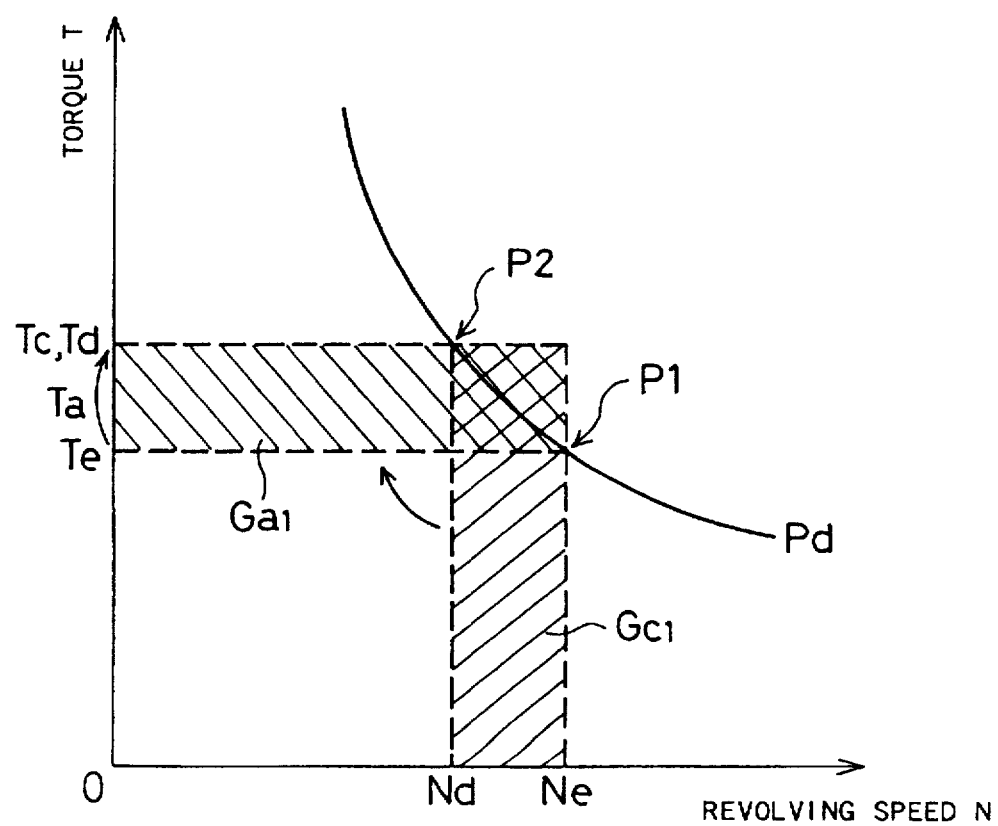
FIG. 57 is a graph showing the state of torque conversion under the condition of FIG. 56.

When the target revolving speed Ne* of the engine 50 is set to be greater than the revolving speed Nd of the drive shaft 22, the torque of the clutch motor 30 and the assist motor 40 under a stationary driving condition act in the manner shown in FIG. 56, where the revolving speed Ne of the engine 50 is greater than the revolving speed Nd of the drive shaft 22. FIG. 57 shows the state of torque conversion under such conditions. In this state, energy is converted from a driving point P1 of the engine 50 to a driving point P2 of the drive shaft 22, where the driving points P1 and P2 exist on an identical energy curve Pd=constant. The assist motor 40 is driven by a positive torque Ta, which is the difference between the output torque Td (torque Tc of the clutch motor 30) and the torque Te of the engine 50, and thereby supplies energy of an area Ga1 corresponding to the positive torque Ta to the crankshaft 56. There exists a positive revolving difference Nc (=Ne−Nd) between the revolving speed Ne of the engine 50 and the revolving speed Nd of the drive shaft 22, so that the clutch motor 30 carries out the regenerative operation to regenerate energy of an area Gc1 corresponding to the revolving speed difference Nc. The energy of the area Ga1 given by the assist motor 40 to the crankshaft 56 is accordingly supplied by the energy of the area Gc1 regenerated by the clutch motor 30. As discussed above for the power output apparatus 20 of the first embodiment, since the efficiency Ksc of the clutch motor 30 is assumed to be 100% in the graph of FIG. 57, the energy of the area Gc1 becomes identical with the energy of the area Ga1. In the actual state, however, the efficiency Ksc is lower than 100%. The energy of the area Ga1 actually given to the crankshaft 56, which is computed by multiplying the energy of the area Gc1 by the efficiency Ksc, is thus a little less than the energy of the area Gc1. The actual output torque Td accordingly becomes a little smaller than the value shown in FIG. 57.

Figure 58:
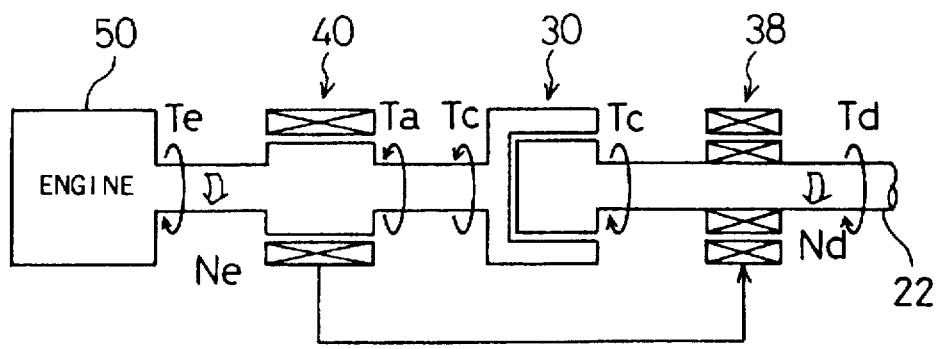
FIG. 58 illustrates the acting state of torque when the revolving speed Ne is less than the revolving speed Nd in the process with neither charging nor discharging the battery 94 in the power output apparatus 20B the second embodiment.
Figure 59:
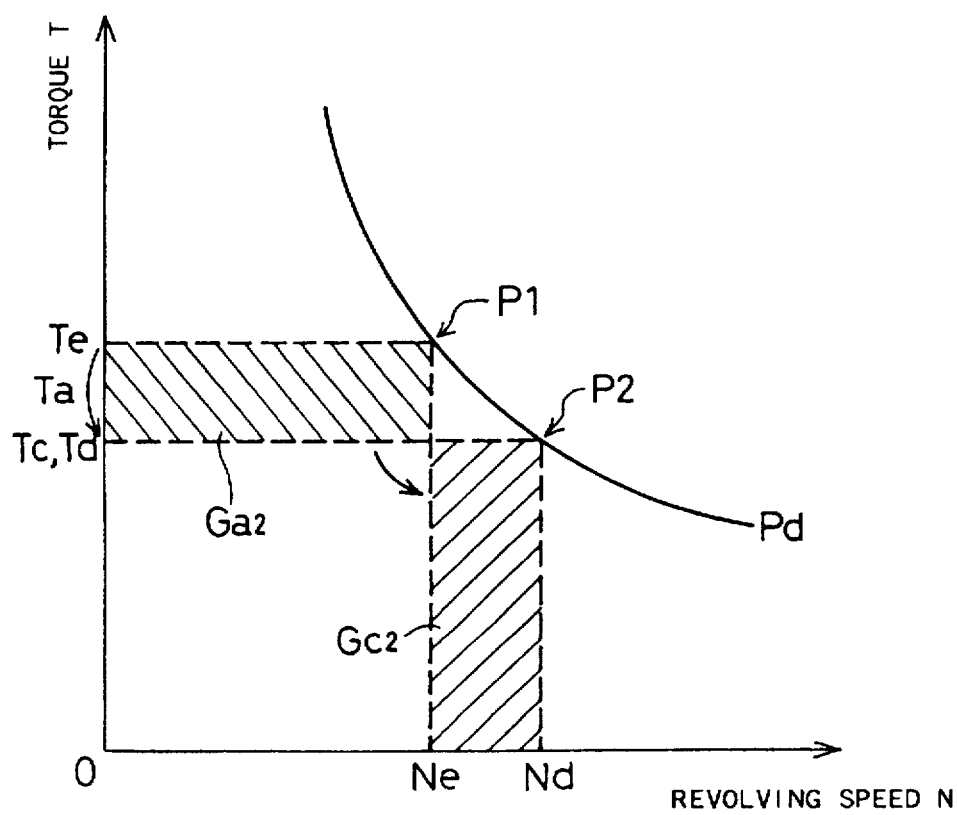
FIG. 59 is a graph showing the state of torque conversion under the condition FIG. 58.

When the target revolving speed Ne* of the engine 50 is set to be less than the revolving speed Nd of the drive shaft 22, on the other hand, the torque of the clutch motor 30 and the assist motor 40 under a stationary driving condition act in the manner shown in FIG. 58, where the revolving speed Ne of the engine 50 is lower than the revolving speed Nd of the drive shaft 22. FIG. 59 shows the state of torque conversion under such conditions. Referring to FIG. 59, the energy is converted from a driving point P1 of the engine 50 to a driving point P2 of the drive shaft 22 in this state, where the driving points P1 and P2 exist on an identical energy curve Pd=constant. The assist motor 40 is driven by a negative torque Ta, which is the difference between the output torque Td (torque Tc of the clutch motor 30) and the torque Te of the engine 50, and thereby carries out the regenerative operation to regenerate energy of an area Ga2 corresponding to the negative torque Ta from the crankshaft 56. There exists a negative revolving speed difference Nc (=Ne−Nd) between the revolving speed Ne of the engine 50 and the revolving speed Nd of the drive shaft 22 in this state, so that the clutch motor 30 is driven to rotate relative to the crankshaft 56 in the direction of rotation of the engine 50 at a revolving speed defined by the absolute value of the revolving speed difference Nc, and supplies energy of an area Gc2 corresponding to the revolving speed difference Nc to the drive shaft 22. The energy of the area Gc2 given by the clutch motor 30 to the drive shaft 22 is accordingly supplied by the energy of the area Ga2 regenerated by the assist motor 40. As discussed above for the power output apparatus 20 of the first embodiment, since the efficiency Ksa of the assist motor 40 is assumed to be 100% in the graph of FIG. 59, the energy of the area Gc2 becomes identical with the energy of the area Ga2. In the actual state, however, the efficiency Ksa is lower than 100%. The energy of the area Ga2, which is computed by dividing the energy of the area Gc2 by the efficiency Ksa, is thus a little greater than the energy of the area Gc2. The actual output torque Td accordingly becomes a little smaller than the value shown in FIG. 59.

The following describes the acting states of the torque while the battery 94 is charged according to the processing of steps S126 through S138 in the charge/discharge torque control routine of FIG. 7. The process of charging the battery 94 can also be divided into three different acting states of the torque applied by the clutch motor 30 and the assist motor 40; that is, the state when the target revolving speed Ne* of the engine 50 is set to be greater than the revolving speed Nd of the drive shaft 22, the state when the target revolving speed Ne* is set to be less than the revolving speed Nd, and the transient state between these two states. The following description regards the first two states, whereas the transient state can be readily understandable from the following description of these two states and the description of FIGS. 22 through 27 with respect to the power output apparatus 20 of the first embodiment and is thus not explained here.

Figure 60:
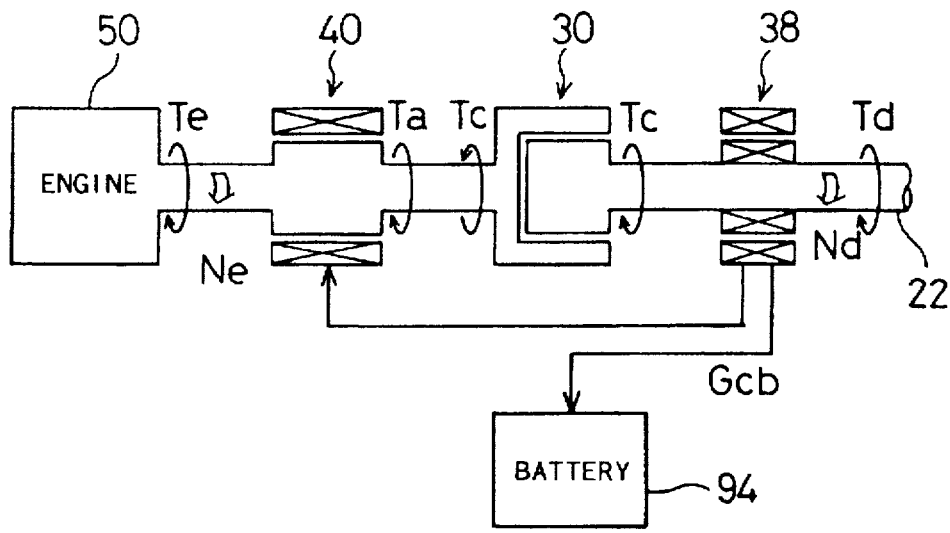
FIG. 60 illustrates the acting state of torque and the charging state of the battery 94 when the revolving speed Ne is greater than the revolving speed Nd in the power output apparatus 20B of the second embodiment.
Figure 61:
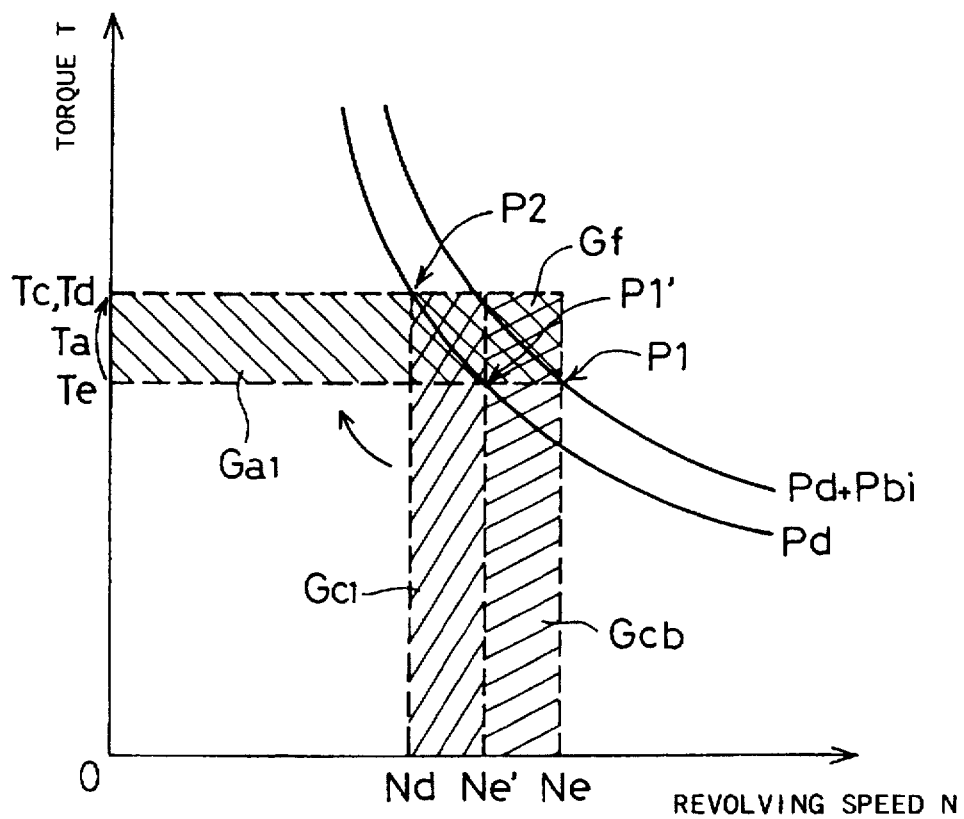
FIG. 61 is a graph showing the state of torque conversion under the condition of FIG. 60.

When the target revolving speed Ne* of the engine 50 is set to be greater than the revolving speed Nd of the drive shaft 22, the battery 94 is charged while the torque of the clutch motor 30 and the assist motor 40 under a stationary driving condition act in the manner shown in FIG. 60, where the revolving speed Ne of the engine 50 is greater than the revolving speed Nd of the drive shaft 22. FIG. 61 shows the state of torque conversion under such conditions. It is assumed that the output energy Pd is set at step S106 in the flowchart of FIG. 5 and not updated by adding the charging energy Pbi. Referring to FIG. 61, the engine 50 is driven at a driving point P1' (torque Te and revolving speed Ne') upon this assumption. Like the state shown in FIGS. 56 and 57 discussed above, energy is converted from the driving point P1' of the engine 50 to a driving point P2 of the drive shaft 22, wherein the driving points P1' and P2 exist on an identical energy curve (Pd=constant).

In the actual control procedure, however, the output energy Pd is updated at step S132 in the flowchart of FIG. 7 by adding the charging energy Pbi to the output energy Pd set at step S106 in the flowchart of FIG. 5. The engine 50 is accordingly driven at a driving point P1 having a revolving speed Ne greater than the revolving speed Ne', and the clutch motor 30 carries out the regenerative operation to regenerate energy defined by the sum of an area Gc1 and other areas Gcb and Gf. Since the drive shaft 22 is driven at the driving point P2, the required amount of energy to be given by the assist motor 40 to the crankshaft 56 is equal to the sum of energy of an area Ga1, as discussed in the state of FIG. 57, and the energy of the area Gf, which is required because the engine 50 is rotated at the revolving speed Ne greater than the revolving speed Ne'. The energy of the area Ga1 can be supplied by the energy of the area Gc1 among the whole energy regenerated by the clutch motor 30. This leaves the energy of the area Gcb non-required by the assist motor 40, and the battery 94 is thus charged with the energy of the area Gcb.

When the target revolving speed Ne* of the engine 50 is set to be less than the revolving speed Nd of the drive shaft 22, the battery 94 is charged while the torque of the clutch motor 30 and the assist motor 40 under a stationary driving condition act in the manner shown in FIG. 62, where the revolving speed Ne of the engine 50 is lower than the revolving speed Nd of the drive shaft 22. FIG. 63 shows the state of torque conversion under such conditions. It is assumed that the output energy Pd is set at step S106 in the flowchart of FIG. 5 and not updated by adding the charging energy Pbi. Referring to FIG. 63, the engine 50 is driven at a driving point P1' (torque Te' and revolving speed Ne) upon this assumption. Like the state shown in FIGS. 58 and 59 discussed above, energy is converted from the driving point P1' of the engine 50 to a driving point P2 of the drive shaft 22, wherein the driving points P1' and P2 exist on an identical energy curve (Pd=constant).

In the actual control procedure, however, the output energy Pd is updated by adding the charging energy Pbi to the output energy Pd set at step S106 of FIG. 5. The engine 50 is accordingly driven at a driving point P1 having a torque Te greater than the torque Te', and the assist motor 40 carries out the regenerative operation to regenerate energy defined by the sum of an area Ga2 and another area Gab. The required amount of energy to be given by the clutch motor 30 to the drive shaft 22 is equal to energy of an area Gc2, as discussed in the state of FIG. 59. The energy of the area Gc2 can be supplied by the energy of the area Ga2 among the whole energy regenerated by the assist motor 40. This leaves the energy of the area Gab non-required by the clutch motor 30, and the battery 94 is thus charged with the energy of the area Gab.

The following describes the acting states of the torque while the battery 94 is discharged according to the processing of steps S140 through S148 in the charge/discharge torque control routine of FIG. 7. The process of discharging the battery 94 can also be divided into three different acting states of the torque applied by the clutch motor 30 and the assist motor 40; that is, the state when the target revolving speed Ne* of the engine 50 is set to be greater than the revolving speed Nd of the drive shaft 22, the state when the target revolving speed Ne* is set to be less than the revolving speed Nd, and the transient state between these two states. The following description regards the first two states, whereas the transient state can be readily understandable from the following description of these two states and the description of FIGS. 32 through 37 with respect to the power output apparatus 20 of the first embodiment and is thus not explained here.

When the target revolving speed Ne* of the engine 50 is set to be greater than the revolving speed Nd of the drive shaft 22, the battery 94 is discharged while the torque of the clutch motor 30 and the assist motor 40 under a stationary driving condition act in the manner shown in FIG. 64, where the revolving speed Ne of the engine 50 is greater than the revolving speed Nd of the drive shaft 22. FIG. 65 shows the state of torque conversion under such conditions. It is assumed that the output torque Td of the drive shaft 22 is equal to a torque Td'. Referring to FIG. 65, the drive shaft 22 is driven at a driving point P2' (torque Td' and revolving speed Nd) upon this assumption. Like the state shown in FIGS. 56 and 57 discussed above, energy is converted from a driving point P1 of the engine 50 to the driving point P2' of the drive shaft 22, wherein the driving points P1 and P2' exist on an identical energy curve (Pd–Pbo=constant).

In the actual state, however, the drive shaft 22 is driven at a driving point P2 having a revolving speed Nd and a torque Td, which is larger than the torque Td'. The assist motor 40 is accordingly driven at a positive torque Ta, which is greater than a torque Ta' and defined as the difference between the output torque Td and the torque Te. It is thus required to supply energy corresponding to the torque Ta (that is, the sum of energy of an area Ga1 and energy of other areas Gba and Gf) to the assist motor 40. Among the required energy corresponding to the torque Ta, the energy of the area Ga1 and the energy of the area Gf can be supplied by energy of an area Gc1 and the energy of the area Gf regenerated by the clutch motor 30, while the energy of the area Gba is in short supply. The battery 94 is thus discharged to release the electric power stored therein and supplement the insufficient energy of the area Gba.

When the target revolving speed Ne* of the engine 50 is set to be less than the revolving speed Nd of the drive shaft 22, the battery 94 is discharged while the torque of the clutch motor 30 and the assist motor 40 under a stationary driving condition act in the manner shown in FIG. 66, where the revolving speed Ne of the engine 50 is lower than the revolving speed Nd of the drive shaft 22. FIG. 67 shows the state of torque conversion under such conditions. It is assumed that the revolving speed Nd of the drive shaft 22 is equal to a revolving speed Nd'. Referring to FIG. 67, the drive shaft 22 is driven at a driving point P2' (torque Td and revolving speed Nd') upon this assumption. Like the state shown in FIGS. 58 and 59 discussed above, energy is converted from a driving point P1 of the engine 50 to the driving point P2' of the drive shaft 22, wherein the driving points P1 and P2' exist on an identical energy curve (Pd–Pbo=constant).

In the actual state, however, the drive shaft 22 is driven at a driving point P2 having a torque Td and a revolving speed Nd, which is greater than the revolving speed Nd'. The clutch motor 30 is accordingly driven corresponding to a negative revolving speed difference Nc between the revolving speed Ne of the engine 50 and the revolving speed Nd of the drive shaft 22. The absolute value of the revolving speed difference Nc is greater than the absolute value of the revolving speed difference Nc' between the revolving speed Ne and the revolving speed Nd'. It is thus required to supply energy, which corresponds to the revolving speed difference Nc and is defined by the sum of an area Gc2 and another area Gbc, to the drive shaft 22. Among the required energy corresponding to the revolving speed difference Nc, the energy of the area Gc2 can be supplied by energy of an area Ga2 regenerated by the assist motor 40, while the energy of the area Gbc is in short supply. The battery 94 is thus discharged to release the electric power stored therein and supplement the insufficient energy of the area Gbc.

The power output apparatus 20B of the second embodiment carries out a power assist control, which is slightly different from the power assist control executed by the power output apparatus 20 of the first embodiment as described below. The power output apparatus 20B of the second embodiment also executes the power assist control routine shown in the flowchart of FIG. 38, except that steps S217 and S218 for setting the torque command value Tc* of the clutch motor 30 and the torque command value Ta* of the assist motor 40 are replaced by steps S317 and S318 in the flowchart of FIG. 68. At step S317, the torque command value Tc* of the clutch motor 30 is computed by dividing the output energy Pd computed at step S106 in the flowchart of FIG. 5, the output energy Pd computed at step S214 in the flowchart of FIG. 38, or the output energy set at step S216 in FIG. 38 by the revolving speed Nd of the drive shaft 22. The torque command value Ta* of the assist motor 40 is then calculated at step S318 by subtracting the target engine torque Te* from the torque command value Tc* thus determined. The torque command value Tc* is calculated in the above manner since only the clutch motor 30 can directly apply a torque to the drive shaft 22. The above calculation of the torque command value Ta* enables the torque of the crankshaft 56 to be coincident with the torque transmitted by the clutch motor 30 to the drive shaft 22 (that is, the torque command value Tc*).

In the power assist control executed by the power output apparatus 20B of the second embodiment, the battery 94 is discharged to release electric power when the remaining charge BRM of the battery 94 is equal to or greater than the threshold value Bref. The acting state of the torque applied by the clutch motor 30 and the assist motor 40 and the discharging state of the battery 94 under such a condition are similar to those in the process of discharging the battery 94 discussed above with the drawings of FIGS. 64 through 67, except that the energy curve of Pd–Pbo=constant in FIGS. 65 and 67 is replaced by an energy curve of Pemax=constant.

When the remaining charge BRM of the battery 94 is less than the threshold value Bref, on the other hand, no electric power is discharged from the battery 94. The acting state of the torque applied by the clutch motor 30 and the assist motor 40 under such a condition is similar to that in the process with neither charging nor discharging the battery 94 discussed above with the drawings of FIGS. 56 through 59.

As discussed above, the power output apparatus 20B of the second embodiment allows the remaining charge BRM of the battery 94 to be controlled to a predetermined range (that is, the range defined by the threshold values BL2 and BH2). The battery 94 can be charged with the charging energy Pbi while the output energy Pd based on the operation of the accelerator pedal 64 is transmitted to the drive shaft 22. When the battery 94 is discharged, the output energy Pd, which is based on the operation of the accelerator pedal 64 and consists of the energy output from the engine 50 and the energy discharged from the battery 94, can be transmitted to the drive shaft 22. Energy based on the operation of the accelerator pedal 64 can consequently be transmitted to the drive shaft 22 irrespective of charging or discharging the battery 94. The driver accordingly does not feel any significant variation in output energy due to the charge or discharge of the battery 94. The power output apparatus 20B of the second embodiment exerts the same effects as those of the power output apparatus 20 of the first embodiment discussed above.

The procedures carried out by the power output apparatus 20 of the first embodiment in the process of charging or discharging the battery 94 when the drive shaft 22 rotates in reverse of the rotation of the crankshaft 56 (that is, when the vehicle moves back), in the process of driving the vehicle only with the electric power released from the battery 94, and in the process of charging or discharging the battery 94 when the clutch motor 30 is electromagnetically in lock-up state are also applicable to the power output apparatus 20B of the second embodiment. The concrete procedures of the power output apparatus 20B in these states are readily understandable from the description of the operations of the power output apparatus 20 of the first embodiment and the power output apparatus 20B of the second embodiment and are not described here.

In the power output apparatus 20B of the second embodiment shown in FIG. 54, the assist motor 40 is attached to the crankshaft 56 placed between the engine 50 and the clutch motor 30. Like another power output apparatus 20C illustrated in FIG. 69, however, the engine 50 may be interposed between the clutch motor 30 and the assist motor 40, both of which are linked with the crankshaft 56.

FIG. 70 illustrates still another power output apparatus 20D given as a modification of the power output apparatus 20B of the second embodiment, in which a clutch motor 30D and an assist motor 40D are integrally joined with each other. The clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. The assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30 of the power output apparatus 20B shown in FIG. 54. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40 of the power output apparatus 20B. The power output apparatus 20D accordingly carries out the same operations and exerts the same effects as those in the power output apparatus 20B of the second embodiment discussed above.

Figure 53:
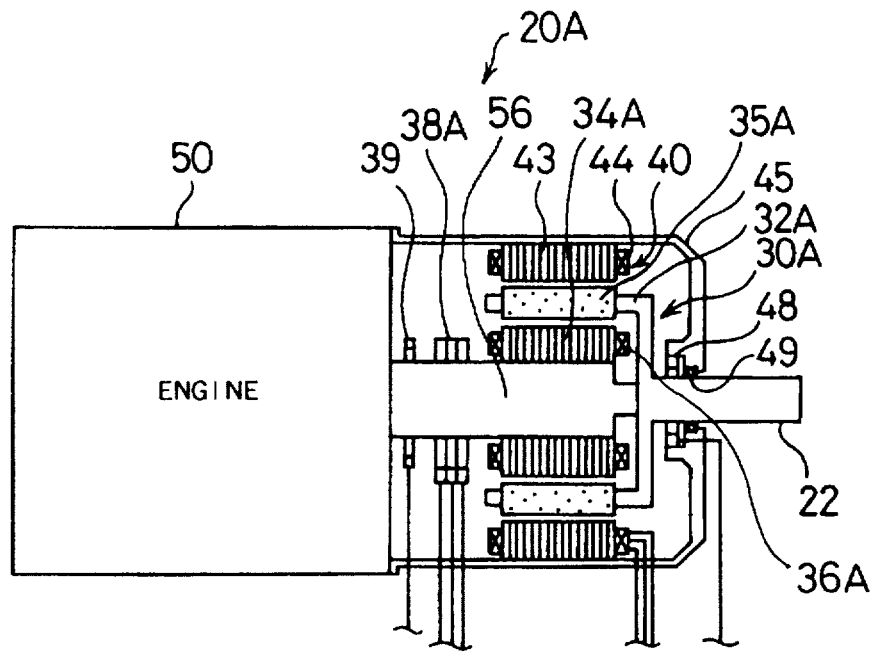
FIG. 53 shows structure of another power output apparatus 20A given as s modified example of the power output apparatus 20 of the first embodiment.

Like the power output apparatus 20A of FIG. 53 which is a modification of the first embodiment, in the power output apparatus 20D of FIG. 70 which is a modification of the power output apparatus 20B of the second embodiment, the outer rotor 32D functions concurrently as one of the rotors in the clutch motor 30D and as the rotor of the assist motor 40D, thereby effectively reducing the size and weight of the whole power output apparatus 20D.

There may be many other modifications, alternations, and changes without departing from the scope or spirit of essential characteristics of the invention. It is thus clearly understood that the above embodiments are only illustrative and not restrictive in any sense.

By way of example, the power output apparatus 20 of FIG. 1 is applicable to the vehicle with a four-wheel drive (4WD) as shown in FIG. 71. In the structure of FIG. 71, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28. The control procedures of the first embodiment are also applicable to the structure of FIG. 71.

The gasoline engine driven by means of gasoline is used as the engine 50 in the above power output apparatuses given as the embodiments of the present invention. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the embodiments described above. Other motors such as variable reluctance (VR)-type synchronous motors, vernier motors, d.c. motors, induction motors, superconducting motors, and stepping motors may be used for the regenerative operation and the power operation.

The rotary transformer 38 used in the above embodiments as means for transmitting electric power to the clutch motor 30 may be replaced by a slip ring-brush contact, a slip ring-mercury contact, a semiconductor coupling of magnetic energy, or the like.

In the above embodiments, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said drive shaft;

a second motor-driving circuit for driving and controlling said second motor;

storage battery means being charged with electric power regenerated by said first motor via said first motor-driving circuit, being charged with electric power regenerated by said second motor via said second motor-driving circuit, being discharged to release electric power required to drive said first motor via said first motor-driving circuit, and being discharged to release electric power required to drive said second motor via said second motor-driving circuit;

remaining charge measuring means for measuring a remaining charge of said storage battery means; and control means for controlling said first and said second motors via said first and second motor-driving circuits based on the remaining charge of said storage battery means measured by said remaining charge measuring means, in order to set the remaining charge of said storage battery means within a predetermined range.

2. A power output apparatus in accordance with claim 1, wherein said control means further comprises charging-process control means for controlling said first and second motors via said first and second motor-driving circuits, in order to enable said storage battery means to be charged with at least part of electric power regenerated by at least one of said first motor and said second motor, when the remaining charge of said storage battery means measured by said remaining charge measuring means is less than the predetermined range.

3. A power output apparatus in accordance with claim 1, wherein said control means further comprises discharging-process control means for controlling said first and second motors via said first and second motor-driving circuits, in order to enable at least part of electric power consumed by at least one of said first motor and said second motor to be supplied by electric power released from said storage battery means, when the remaining charge of said storage battery means measured by said remaining charge measuring means is greater than the predetermined range.

4. A power output apparatus in accordance with claim 1, said power output apparatus further comprising:

driving state measuring means for measuring driving states of said engine and said drive shaft, wherein said control means further comprises means for controlling said first motor and second motors based on the driving states measured by said driving state measuring means.

5. A power output apparatus in accordance with claim 4, wherein said driving state measuring means further comprises:

engine speed measuring means for measuring a revolving speed of said output shaft of said engine; and driving shaft speed measuring means for measuring a revolving speed of said drive shaft.

6. A power output apparatus in accordance with claim 5, wherein said control means further comprises means for controlling said first and second motors via said first and second motor-driving circuits, in order to enable said storage battery means to be charged with at least part of electric power regenerated by at least one of said first motor and said second motor, when the revolving speed of said output shaft of said engine measured by said engine speed measuring means is greater than the revolving speed of said drive shaft measured by said driving shaft speed measuring means.

7. A power output apparatus in accordance with claim 5, wherein said control means further comprises means for controlling said second motor via said second motor-driving circuit, in order to enable said storage battery means to be charged with at least part of electric power regenerated by said second motor, when the revolving speed of said output shaft of said engine measured by said engine speed measuring means is equal to or less than the revolving speed of said drive shaft measured by said driving shaft speed measuring means.

8. A power output apparatus in accordance with claim 5, wherein said control means further comprises means for controlling said second motor via said second motor-driving circuit, in order to enable at least part of electric power consumed by said second motor to be supplied by electric power released from said storage battery means, when the revolving speed of said output shaft of said engine measured by said engine speed measuring means is equal to or greater than the revolving speed of said drive shaft measured by said driving shaft speed measuring means.

9. A power output apparatus in accordance with claim 5, wherein said control means further comprises means for controlling said first motor and said second motor via said first motor-driving circuit and said second motor-driving circuit, in order to enable at least part of electric power consumed by at least one of said first motor and said second motor to be supplied by electric power released from said storage battery means, when the revolving speed of said output shaft of said engine measured by said engine speed measuring means is less than the revolving speed of said drive shaft measured by said driving shaft speed measuring means.

10. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said second rotor, said first and second rotors constituting a first motor, whereby power is transmitted between said output shaft of said engine and said drive shaft via an electromagnetic coupling of said first rotor with said second rotor, while said second rotor and said stator constituting a second motor for transmitting and receiving power to and from said drive shaft;

a first motor-driving circuit for driving and controlling said first motor in said complex motor;

a second motor-driving circuit for driving and controlling said second motor in said complex motor;

storage battery means being charged with electric power regenerated by said first motor of said complex motor via said first motor-driving circuit, being charged with electric power regenerated by said second motor of said complex motor via said second motor-driving circuit, being discharged to release electric power required to drive said first motor of said complex motor via said first motor-driving circuit, and being discharged to release electric power required to drive said second motor of said complex motor via said second motor-driving circuit;

remaining charge measuring means for measuring a remaining charge of said storage battery means; and control means for controlling said first and second motors of said complex motor via said first and second motor-driving circuits based on the remaining charge of said storage battery means measured by said remaining charge measuring means, in order to set the remaining charge of said storage battery means within a predetermined range.

11. A power output apparatus in accordance with claim 10, wherein said control means further comprises charging-process control means for controlling said first and second motors via said first and second motor-driving circuits, in order to enable said storage battery means to be charged with at least part of electric power regenerated by at least one of said first motor and said second motor, when the remaining charge of said storage battery means measured by said remaining charge measuring means is less than the predetermined range.

12. A power output apparatus in accordance with claim 10, wherein said control means further comprises discharging-process control means for controlling said first and second motors via said first and second motor-driving circuits, in order to enable at least part of electric power consumed by at least one of said first motor and said second motor to be supplied by electric power released from said storage battery means, when the remaining charge of said storage battery means measured by said remaining charge measuring means is greater than the predetermined range.

13. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said output shaft of said engine;

a second motor-driving circuit for driving and controlling said second motor;

storage battery means being charged with electric power regenerated by said first motor via said first motor-driving circuit, being charged with electric power regenerated by said second motor via said second motor-driving circuit, being discharged to release electric power required to drive said first motor via said first motor-driving circuit, and being discharged to release electric power required to drive said second motor via said second motor-driving circuit;

remaining charge measuring means for measuring a remaining charge of said storage battery means; and control means for controlling said first and said second motors via said first and second motor-driving circuits based on the remaining charge of said storage battery means measured by said remaining charge measuring means, in order to set the remaining charge of said storage battery means within a predetermined range.

14. A power output apparatus in accordance with claim 13, wherein said control means further comprises charging-process control means for controlling said first and second motors via said first and second motor-driving circuits, in order to enable said storage battery means to be charged with at least part of electric power regenerated by at least one of said first motor and said second motor, when the remaining charge of said storage battery means measured by said remaining charge measuring means is less than the predetermined range.

15. A power output apparatus in accordance with claim 13, wherein said control means further comprises discharging-process control means for controlling said first and second motors via said first and second motor-driving circuits, in order to enable at least part of electric power consumed by at least one of said first motor and said second motor to be supplied by electric power released from said storage battery means, when the remaining charge of said storage battery means measured by said remaining charge measuring means is greater than the predetermined range.

16. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said second rotor, said first and second rotors constituting a first motor, whereby power is transmitted between said output shaft of said engine and said drive shaft via an electromagnetic coupling of said first rotor with said second rotor, while said first rotor and said stator constituting a second motor for transmitting and receiving power to and from said output shaft of said engine;

a first motor-driving circuit for driving and controlling said first motor in said complex motor;

a second motor-driving circuit for driving and controlling said second motor in said complex motor;

storage battery means being charged with electric power regenerated by said first motor of said complex motor via said first motor-driving circuit, being charged with electric power regenerated by said second motor of said complex motor via said second motor-driving circuit, being discharged to release electric power required to drive said first motor of said complex motor via said first motor-driving circuit, and being discharged to release electric power required to drive said second motor of said complex motor via said second motor-driving circuit;

remaining charge measuring means for measuring a remaining charge of said storage battery means; and control means for controlling said first and second motors of said complex motor via said first and second motor-driving circuits based on the remaining charge of said storage battery means measured by said remaining charge measuring means, in order to set the remaining charge of said storage battery means within a predetermined range.

17. A power output apparatus in accordance with claim 16, wherein said control means further comprises charging-process control means for controlling said first and second motors via said first and second motor-driving circuits, in order to enable said storage battery means to be charged with at least part of electric power regenerated by at least one of said first motor and said second motor, when the remaining charge of said storage battery means measured by said remaining charge measuring means is less than the predetermined range.

18. A power output apparatus in accordance with claim 16 wherein said control means further comprises discharging-process control means for controlling said first and second motors via said first and second motor-driving circuits, in order to enable at least part of electric power consumed by at least one of said first motor and said second motor to be supplied by electric power released from said storage battery means, when the remaining charge of said storage battery means measured by said remaining charge measuring means is greater than the predetermined range.

19. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said drive shaft;

a second motor-driving circuit for driving and controlling said second motor;

storage battery means being charged with electric power regenerated by said first motor via said first motor-driving circuit, being charged with electric power regenerated by said second motor via said second motor-driving circuit, being discharged to release electric power required to drive said first motor via said first motor-driving circuit, and being discharged to release electric power required to drive said second motor via said second motor-driving circuit;

remaining charge measuring means for measuring a remaining charge of said storage battery means;

target power specifying means for specifying a target power to be output to said drive shaft, based on an instruction given by an operator; and control means for controlling said first and second motors via said first and second motor-driving circuits as well as for controlling operation of said engine, based on the target power specified by said target power specifying means and the remaining charge of said storage battery means measured by said remaining charge measuring means, in order to set the remaining charge of said storage battery means within a predetermined range and enable the target power to be output to said drive shaft.

20. A power output apparatus in accordance with claim 19, wherein said control means further comprises:

charging-state engine control means for controlling operation of said engine, in order to enable said engine to output a power corresponding to energy which is greater than energy corresponding to the target power, when the remaining charge of said storage battery means measured by said remaining charge measuring means is less than the predetermined range; and charging-state motor control means for controlling said first and second motors, in order to enable part of the power generated by said engine controlled by said charging-state engine control means to undergo energy conversion and to be output as the target power to said drive shaft, as well as to enable said storage battery means to be charged with electric power regenerated from the residual power output from said engine.

21. A power output apparatus in accordance with claim 20, wherein said charging-state engine control means further comprises:

means for specifying a charging energy used for charging said storage battery means, based on the remaining charge of said storage battery means measured by said remaining charge measuring means; and means for controlling operation of said engine, in order to enable said engine to output a power corresponding to the sum of the charging energy thus specified and the energy corresponding to the target power.

22. A power output apparatus in accordance with claim 19, wherein said control means further comprises:

discharging-state engine control means for controlling operation of said engine, in order to enable said engine to output a power corresponding to energy which is smaller than energy corresponding to the target power, when the remaining charge of said storage battery means measured by said remaining charge measuring means is greater than the predetermined range; and discharging-state motor control means for controlling said first and second motors, in order to enable the sum of the power generated by said engine controlled by said discharging-state engine control means and electric power released from said storage battery means to undergo energy conversion and to be output as the target power to said drive shaft.

23. A power output apparatus in accordance with claim 22, wherein said discharging-state engine control means further comprises:

means for specifying a discharging energy released from said storage battery means, based on the remaining charge of said storage battery means measured by said remaining charge measuring means; and means for controlling operation of said engine, in order to enable said engine to output a power corresponding to the difference between the energy corresponding to the target power and the discharging energy thus specified.

24. A power output apparatus in accordance with claim 19, said power output apparatus further comprising:

driving state measuring means for measuring driving states of said engine and said drive shaft, wherein said control means further comprises means for controlling said first motor and second motors based on the driving states measured by said driving state measuring means.

25. A power output apparatus in accordance with claim 24, wherein said driving state measuring means further comprises:

engine speed measuring means for measuring a revolving speed of said output shaft of said engine; and driving shaft speed measuring means for measuring a revolving speed of said drive shaft.

26. A power output apparatus in accordance with claim 25, wherein said control means further comprises means for controlling said first and second motors via said first and second motor-driving circuits, in order to enable said storage battery means to be charged with at least part of electric power regenerated by at least one of said first motor and said second motor, when the revolving speed of said output shaft of said engine measured by said engine speed measuring means is greater than the revolving speed of said drive shaft measured by said driving shaft speed measuring means.

27. A power output apparatus in accordance with claim 25, wherein said control means further comprises means for controlling said second motor via said second motor-driving circuit, in order to enable said storage battery means to be charged with at least part of electric power regenerated by said second motor, when the revolving speed of said output shaft of said engine measured by said engine speed measuring means is equal to or less than the revolving speed of said drive shaft measured by said driving shaft speed measuring means.

28. A power output apparatus in accordance with claim 25, wherein said control means further comprises means for controlling said second motor via said second motor-driving circuit, in order to enable at least part of electric power consumed by said second motor to be supplied by electric power released from said storage battery means, when the revolving speed of said output shaft of said engine measured by said engine speed measuring means is equal to or greater than the revolving speed of said drive shaft measured by said driving shaft speed measuring means.

29. A power output apparatus in accordance with claim 25, wherein said control means further comprises means for controlling said first motor and said second motor via said first motor-driving circuit and said second motor-driving circuit, in order to enable at least part of electric power consumed by at least one of said first motor and said second motor to be supplied by electric power released from said storage battery means, when the revolving speed of said output shaft of said engine measured by said engine speed measuring means is less than the revolving speed of said drive shaft measured by said driving shaft speed measuring means.

30. A power output apparatus in accordance with claim 19, wherein said control means further comprises means for controlling said first and second motors, in order to prevent said storage battery means from being charged by said first and second motors when energy corresponding to the target power specified by said target power specifying means is equal to or greater than a predetermined level, even if the remaining charge of said storage battery means measured by said remaining charge measuring means is less than the predetermined range.

31. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said second rotor, said first and second rotors constituting a first motor, whereby power is transmitted between said output shaft of said engine and said drive shaft via an electromagnetic coupling of said first rotor with said second rotor, while said second rotor and said stator constituting a second motor for transmitting and receiving power to and from said drive shaft;

a first motor-driving circuit for driving and controlling said first motor in said complex motor;

a second motor-driving circuit for driving and controlling said second motor in said complex motor;

storage battery means being charged with electric power regenerated by said first motor of said complex motor via said first motor-driving circuit, being charged with electric power regenerated by said second motor of said complex motor via said second motor-driving circuit, being discharged to release electric power required to drive said first motor of said complex motor via said first motor-driving circuit, and being discharged to release electric power required to drive said second motor of said complex motor via said second motor-driving circuit;

remaining charge measuring means for measuring a remaining charge of said storage battery means;

target power specifying means for specifying a target power to be output to said drive shaft, based on an instruction given by an operator; and control means for controlling said first and second motors of said complex motor via said first and second motor-driving circuits as well as for controlling operation of said engine, based on the target power specified by said target power specifying means and the remaining charge of said storage battery means measured by said remaining charge measuring means, in order to set the remaining charge of said storage battery means within a predetermined range and enable the target power to be output to said drive shaft.

32. A power output apparatus in accordance with claim 31, wherein said control means further comprises:

charging-state engine control means for controlling operation of said engine, in order to enable said engine to output a power corresponding to energy which is greater than energy corresponding to the target power, when the remaining charge of said storage battery means measured by said remaining charge measuring means is less than the predetermined range; and charging-state motor control means for controlling said first and second motors of said complex motor, in order to enable part of the power generated by said engine controlled by said charging-state engine control means to undergo energy conversion and to be output as the target power to said drive shaft, as well as to enable said storage battery means to be charged with electric power regenerated from the residual power output from said engine.

33. A power output apparatus in accordance with claim 31, wherein said control means further comprises:

discharging-state engine control means for controlling operation of said engine, in order to enable said engine to output a power corresponding to energy which is smaller than energy corresponding to the target power, when the remaining charge of said storage battery means measured by said remaining charge measuring means is greater than the predetermined range; and discharging-state motor control means for controlling said first and second motors of said complex motor, in order to enable the sum of the power generated by said engine controlled by said discharging-state engine control means and electric power released from said storage battery means to undergo energy conversion and to be output as the target power to said drive shaft.

34. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor;

a first motor-driving circuit for controlling the degree of electromagnetic coupling of said first rotor with said second rotor in said first motor and regulating the rotation of said second rotor relative to said first rotor;

a second motor connected with said output shaft of said engine;

a second motor-driving circuit for driving and controlling said second motor;

storage battery means being charged with electric power regenerated by said first motor via said first motor-driving circuit, being charged with electric power regenerated by said second motor via said second motor-driving circuit, being discharged to release electric power required to drive said first motor via said first motor-driving circuit, and being discharged to release electric power required to drive said second motor via said second motor-driving circuit;

remaining charge measuring means for measuring a remaining charge of said storage battery means;

target power specifying means for specifying a target power to be output to said drive shaft, based on an instruction given by an operator; and control means for controlling said first and second motors via said first and second motor-driving circuits as well as for controlling operation of said engine, based on the target power specified by said target power specifying means and the remaining charge of said storage battery means measured by said remaining charge measuring means, in order to set the remaining charge of said storage battery means within a predetermined range and enable the target power to be output to said drive shaft.

35. A power output apparatus in accordance with claim 34, wherein said control means further comprises:

charging-state engine control means for controlling operation of said engine, in order to enable said engine to output a power corresponding to energy which is greater than energy corresponding to the target power, when the remaining charge of said storage battery means measured by said remaining charge measuring means is less than the predetermined range; and charging-state motor control means for controlling said first and second motors, in order to enable part of the power generated by said engine controlled by said charging-state engine control means to undergo energy conversion and to be output as the target power to said drive shaft, as well as to enable said storage battery means to be charged with electric power regenerated from the residual power output from said engine.

36. A power output apparatus in accordance with claim 34, wherein said control means further comprises:

discharging-state engine control means for controlling operation of said engine, in order to enable said engine to output a power corresponding to energy which is smaller than energy corresponding to the target power, when the remaining charge of said storage battery means measured by said remaining charge measuring means is greater than the predetermined range; and discharging-state motor control means for controlling said first and second motors, in order to enable the sum of the power generated by said engine controlled by said discharging-state engine control means and electric power released from said storage battery means to undergo energy conversion and to be output as the target power to said drive shaft.

37. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said second rotor, said first and second rotors constituting a first motor, whereby power is transmitted between said output shaft of said engine and said drive shaft via an electromagnetic coupling of said first rotor with said second rotor, while said first rotor and said stator constituting a second motor for transmitting and receiving power to and from said output shaft of said engine;

a first motor-driving circuit for driving and controlling said first motor in said complex motor;

a second motor-driving circuit for driving and controlling said second motor in said complex motor;

storage battery means being charged with electric power regenerated by said first motor of said complex motor via said first motor-driving circuit, being charged with electric power regenerated by said second motor of said complex motor via said second motor-driving circuit, being discharged to release electric power required to drive said first motor of said complex motor via said first motor-driving circuit, and being discharged to release electric power required to drive said second motor of said complex motor via said second motor-driving circuit;

remaining charge measuring means for measuring a remaining charge of said storage battery means;

target power specifying means for specifying a target power to be output to said drive shaft, based on an instruction given by an operator; and control means for controlling said first and second motors of said complex motor via said first and second motor-driving circuits as well as for controlling operation of said engine, based on the target power specified by said target power specifying means and the remaining charge of said storage battery means measured by said remaining charge measuring means, in order to set the remaining charge of said storage battery means within a predetermined range and enable the target power to be output to said drive shaft.

38. A power output apparatus in accordance with claim 37, wherein said control means further comprises:

charging-state engine control means for controlling operation of said engine, in order to enable said engine to output a power corresponding to energy which is greater than energy corresponding to the target power, when the remaining charge of said storage battery means measured by said remaining charge measuring means is less than the predetermined range; and charging-state motor control means for controlling said first and second motors of said complex motor, in order to enable part of the power generated by said engine controlled by said charging-state engine control means to undergo energy conversion and to be output as the target power to said drive shaft, as well as to enable said storage battery means to be charged with electric power regenerated from the residual power output from said engine.

39. A power output apparatus in accordance with claim 37, wherein said control means further comprises:

discharging-state engine control means for controlling operation of said engine, in order to enable said engine to output a power corresponding to energy which is smaller than energy corresponding to the target power, when the remaining charge of said storage battery means measured by said remaining charge measuring means is greater than the predetermined range; and discharging-state motor control means for controlling said first and second motors of said complex motor, in order to enable the sum of the power generated by said engine controlled by said discharging-state engine control means and electric power released from said storage battery means to undergo energy conversion and to be output as the target power to said drive shaft.

40. A method of controlling a power output apparatus for outputting a power to a drive shaft, said method comprising the steps of:

(a) providing an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor; a second motor connected with said drive shaft; storage battery means being charged with electric power regenerated by said first motor, being charged with electric power regenerated by said second motor, being discharged to release electric power required to drive said first motor, and being discharged to release electric power required to drive said second motor;

(b) measuring a remaining charge of said storage battery means; and (c) controlling said first and second motors based on the remaining charge of said storage battery means measured in said step (b), in order to set the remaining charge of said storage battery means within a predetermined range.

41. A method in accordance with claim 40, wherein said step (c) further comprises the step of:

(d) controlling said first and second motors, in order to enable said storage battery means to be charged with at least part of electric power regenerated by at least one of said first motor and said second motor, when the remaining charge of said storage battery means is less than the predetermined range.

42. A method in accordance with claim 40, wherein said step (c) further comprises the step of:

(e) controlling said first and second motors, in order to enable at least part of electric power consumed by at least one of said first motor and said second motor to be supplied by electric power released from said storage battery means, when the remaining charge of said storage battery means is greater than the predetermined range.

43. A method of controlling a power output apparatus for outputting a power to a drive shaft, said method comprising the steps of:

(a) providing an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other, whereby power is transmitted between said output shaft of said engine and said drive shaft via an electromagnetic coupling of said first rotor with said second rotor; a second motor connected with said drive shaft; storage battery means being charged with electric power regenerated by said first motor, being charged with electric power regenerated by said second motor, being discharged to release electric power required to drive said first motor, and being discharged to release electric power required to drive said second motor;

(b) measuring a remaining charge of said storage battery means;

(c) specifying a target power to be output to said drive shaft, based on an instruction given by an operator; and (d) controlling said first and second motors concurrently with controlling operation of said engine, based on the target power specified in said step (c) and the remaining charge of said storage battery means measured in said step (b), in order to set the remaining charge of said storage battery means within a predetermined range and enable the target power to be output to said drive shaft.

44. A method in accordance with claim 43, wherein said step (d) further comprises the steps of:

(e) controlling operation of said engine, in order to enable said engine to output a power corresponding to energy which is greater than energy corresponding to the target power, when the remaining charge of said storage battery means is less than the predetermined range; and (f) controlling said first and second motors, in order to enable part of the power generated by said engine controlled in said step (e) to undergo energy conversion and to be output as the target power to said drive shaft, as well as to enable said storage battery means to be charged with electric power regenerated from the residual power output from said engine.

45. A method in accordance with claim 43, wherein said step (d) further comprises the steps of:

(g) controlling operation of said engine, in order to enable said engine to output a power corresponding to energy which is smaller than energy corresponding to the target power, when the remaining charge of said storage battery means is greater than the predetermined range; and (h) controlling said first and second motors, in order to enable the sum of the power generated by said engine controlled in said step (g) and electric power released from said storage battery means to undergo energy conversion and to be output as the target power to said drive shaft.

* * * * *